US012676991B2

(12) United States Patent
Wang et al.

(10) Patent No.: US 12,676,991 B2
(45) Date of Patent: *Jul. 7, 2026

(54) ENCODING AND DECODING METHOD, BITSTREAM, ENCODER, DECODER, AND COMPUTER STORAGE MEDIUM

(71) Applicant: GUANGDONG OPPO MOBILE TELECOMMUNICATIONS CORP., LTD., Dongguan (CN)

(72) Inventors: Fan Wang, Dongguan (CN); Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,688

(22) Filed: Sep. 23, 2024

(65) Prior Publication Data

US 2025/0016334 A1 Jan. 9, 2025

Related U.S. Application Data

(63) Continuation of application No. 18/513,932, filed on Nov. 20, 2023, now Pat. No. 12,120,318, which is a
(Continued)

(51) Int. Cl.
*H04N 19/167* (2014.01)
*H04N 19/129* (2014.01)
(Continued)

(52) U.S. Cl.
CPC ......... *H04N 19/167* (2014.11); *H04N 19/129* (2014.11); *H04N 19/136* (2014.11);
(Continued)

(58) Field of Classification Search
CPC ................................................... H04N 19/167
See application file for complete search history.

(56) References Cited

U.S. PATENT DOCUMENTS 8,964,849 B2 2/2015 Nguyen
9,215,464 B2 12/2015 Wang
(Continued)

FOREIGN PATENT DOCUMENTS

CN 102752592 A 10/2012
CN 103636224 A 3/2014
(Continued)

OTHER PUBLICATIONS

First Office Action of the Russian application No. 2023128759, issued on Jun. 14, 2024. 12 pages with English translation.
(Continued)

*Primary Examiner* — Jerry T Jean Baptiste
(74) *Attorney, Agent, or Firm* — BAYES PLLC

(57) ABSTRACT

A decoding method, an encoding method, an encoder, and a decoder are provided. The decoding method includes that: determining, by parsing a bitstream, last significant coefficient location reverse identification information of a current slice, and coordinate information of a last significant coefficient of a current block of blocks in the current slice; in response to the last significant coefficient location reverse identification information indicating that last significant coefficient location reverse is applied to the blocks in the current slice, obtaining a location of the last significant coefficient of the current block by performing calculation on the coordinate information of the last significant coefficient; and determining coefficients of the current block by decoding coefficients located above the location of the last significant coefficient in a preset scanning order.

9 Claims, 17 Drawing Sheets

Component identification information of a current slice, and a location of a last significant coefficient of a current block corresponding to a component of the current slice, are determined ⟋ S1101

Coordinate information of the last significant coefficient of the current block is determined according to the component identification information and the location of the last significant coefficient ⟋ S1102

Coefficients located above the location of the last significant coefficient are encoded in a preset scanning order, and bit information obtained through encoding, the component identification information, and the coordinate information of the last significant coefficient are signalled into a bitstream ⟋ S1103

Related U.S. Application Data continuation of application No. PCT/CN2021/103250, filed on Jun. 29, 2021.

(51) Int. Cl.

| | |
|---|---|
| *H04N 19/136* | (2014.01) |
| *H04N 19/174* | (2014.01) |
| *H04N 19/176* | (2014.01) |
| *H04N 19/184* | (2014.01) |
| *H04N 19/186* | (2014.01) |
| *H04N 19/70* | (2014.01) |

(52) U.S. Cl.
CPC ......... *H04N 19/174* (2014.11); *H04N 19/176* (2014.11); *H04N 19/184* (2014.11); *H04N 19/186* (2014.11); *H04N 19/70* (2014.11)

(56) References Cited

U.S. PATENT DOCUMENTS

| | | | |
|---|---|---|---|
| 9,565,435 | B2 | 2/2017 | Fang |
| 9,591,315 | B2 | 3/2017 | Ström |
| 9,794,591 | B2 | 10/2017 | Ström |
| 10,405,000 | B2 | 9/2019 | Kao |
| 10,523,968 | B2 | 12/2019 | He |
| 10,531,102 | B2 | 1/2020 | Piao |
| 10,791,327 | B2 | 9/2020 | Pettersson |
| 10,791,339 | B2 | 9/2020 | He |
| 11,070,843 | B2 | 7/2021 | He |
| 2013/0202026 | A1 | 8/2013 | Fang et al. |
| 2015/0078432 | A1 | 3/2015 | Wang et al. |
| 2015/0281706 | A1 | 10/2015 | Strom et al. |
| 2016/0127732 | A1 | 5/2016 | Mittal |
| 2017/0134751 | A1 | 5/2017 | Strom et al. |
| 2017/0280163 | A1 | 9/2017 | Kao et al. |
| 2018/0205958 | A1 | 7/2018 | Piao et al. |
| 2019/0089984 | A1 | 3/2019 | He |
| 2020/0084474 | A1 | 3/2020 | He |
| 2020/0396486 | A1 | 12/2020 | He |
| 2020/0396488 | A1 | 12/2020 | Koo et al. |
| 2022/0201335 | A1 | 6/2022 | Chiang et al. |
| 2023/0026492 | A1* | 1/2023 | Ikai ...................... H04N 19/184 |
| 2023/0239504 | A1 | 7/2023 | Zhou et al. |
| 2023/0291906 | A1 | 9/2023 | Jhu et al. |
| 2023/0291936 | A1 | 9/2023 | Jhu et al. |
| 2024/0031604 | A1* | 1/2024 | Yoo ........................ H04N 19/46 |

FOREIGN PATENT DOCUMENTS

| | | | |
|---|---|---|---|
| CN | 104093020 | A | 10/2014 |
| CN | 104469378 | A | 3/2015 |
| CN | 104995919 | A | 10/2015 |
| CN | 107211146 | A | 9/2017 |
| CN | 104093020 | B | 11/2017 |
| CN | 108353179 | A | 7/2018 |
| CN | 110622510 | A | 12/2019 |
| CN | 112543338 | A | 3/2021 |
| EP | 2697974 | B1 | 4/2017 |
| JP | 2013545415 | A | 12/2013 |
| RU | 2609750 | C1 | 2/2017 |
| RU | 2714108 | C1 | 2/2020 |
| WO | 2019027200 | A1 | 2/2019 |
| WO | 2019055071 | A1 | 3/2019 |

OTHER PUBLICATIONS

International Search Report in the international application No. PCT/CN2021/086710, mailed on Dec. 28, 2021. 5 pages with English translation.

Written Opinion of the International Search Authority in the international application No. PCT/CN2021/086710, mailed on Dec. 28, 2021. 7 pages with English translation.

Wang et al., AHG8: on coding of last significant coefficient position for high bit depth and high bit rate extensions, Apr. 2021, JVET-V0121-v2 Joint Video Experts Team (JVET) of ITU-T SG 16 WP 3 and ISO/IEC JTC 1/SC 29 22nd Meeting (Year: 2021), pp. 1-7.

Notice of Allowance of the U.S. Appl. No. 18/473,645, issued on Nov. 9, 2023. 30 pages.

International Search Report in the international application No. PCT/CN2021/103250, mailed on Mar. 17, 2022. 5 pages with English translation.

Written Opinion of the International Search Authority in the international application No. PCT/CN2021/103250, mailed on Mar. 17, 2022. 8 pages with English translation.

Non Final Office Action of the U.S. Appl. No. 18/513,932, issued on Feb. 15, 2024. 21 pages.

Notice of Allowance of the U.S. Appl. No. 18/513,932, issued on Jun. 13, 2024. 16 pages.

Corrected Notice of Allowance of the U.S. Appl. No. 18/513,932, issued on Sep. 11, 2024. 6 pages.

First Office Action of the Russian application No. 2024100542, issued on Oct. 3, 2024. 18 pages with English translation.

First Office Action of the Japanese application No. 2023-572244, issued on May 9, 2025. 12 pages with English translation.

First Office Action of the Chinese application No. 202311525745.5, issued on May 15, 2025. 21 pages with English translation.

First Office Action of the Chinese application No. 202410395839.3 issued on May 23, 2025. 17 pages with English translation.

"Versatile video coding; H.266 (08/20)", ITU-T Standard H.266, Internationaltelecommunication Union, Geneva; CH No. H.266 (08/20), Aug. 29, 2020 (Aug. 29, 2020), pp. 1-513, XP044296169, section [7.3.11.11 Residual coding syntax]; p. 93; section [7.4.12.11 Residual coding semantics]; p. 193.

Wang (Oppo) F et al: "AHG8: on coding of last significant coefficient position for high bit depth and high bit rate extensions", 22. JVET Meeting; Apr. 20, 2021-Apr. 28, 2021; Teleconference; (The Joint Video Exploration Team of ISO/IEC JTC1/SC29/WG11 and ITU-T SG.16), No. JVET-V0121-V1; m56536, Apr. 14, 2021 (Apr. 14, 2021), XP030294309, pp. 1-4.

Supplementary European Search Report in the European application No. 21936337.1, mailed on Jan. 30, 2025. 16 pages.

Wang (Oppo) F et al: "CE-1.1: coding of last significant coefficient position for high bit depth and high bit rate extensions", 135. MPEG Meeting; Jul. 12, 2021-Jul. 16, 2021; Online; (Motion Picture Expert Group or ISO/IEC JTC1/SC29/WG11), No. JVET-W0046; m57099; JVET-W0046; m57099, Jun. 26, 2021 (Jun. 26, 2021), XP030296624, the whole document.

Supplementary European Search Report in the European application No. 21947474.9, mailed on Apr. 7, 2025. 9 pages.

First Office Action of the Australian application No. 2021454442, issued on Sep. 16, 2025.

First Office Action of the Taiwanese application No. 111123498, issued on Nov. 28, 2025.

Second Office Action of the Australian application No. 2021454442, issued on Jan. 21, 2026.

Office Action of the Indian application No. 202317078232, issued on Mar. 30, 2026.

First Office Action of the Taiwanese application No. 111108667, issued on Mar. 31, 2026.

Office Action of the Indian application No. 202317069421, issued on Apr. 24, 2026.

* cited by examiner

Region
containing
possible nonzero
coefficients

Zero-out region

FIG. 7

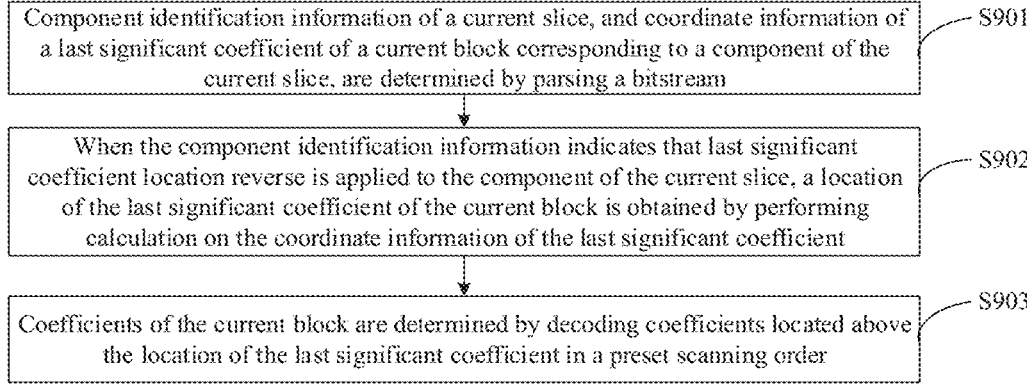

Component identification information of a current slice, and coordinate information of a last significant coefficient of a current block corresponding to a component of the current slice, are determined by parsing a bitstream — S901

When the component identification information indicates that last significant coefficient location reverse is applied to the component of the current slice, a location of the last significant coefficient of the current block is obtained by performing calculation on the coordinate information of the last significant coefficient — S902

Coefficients of the current block are determined by decoding coefficients located above the location of the last significant coefficient in a preset scanning order — S903

FIG. 9

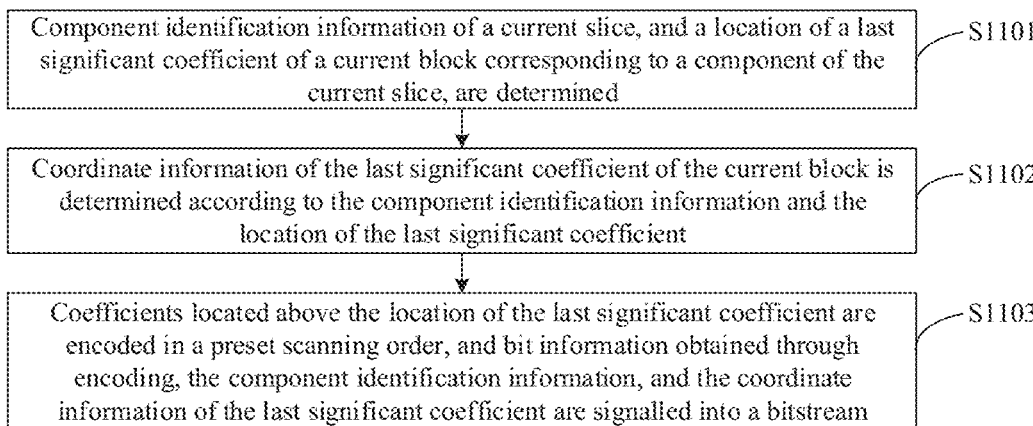

Component identification information of a current slice, and a location of a last significant coefficient of a current block corresponding to a component of the current slice, are determined ⌐S1101

Coordinate information of the last significant coefficient of the current block is determined according to the component identification information and the location of the last significant coefficient ⌐S1102

Coefficients located above the location of the last significant coefficient are encoded in a preset scanning order, and bit information obtained through encoding, the component identification information, and the coordinate information of the last significant coefficient are signalled into a bitstream ⌐S1103

FIG. 11

ENCODING AND DECODING METHOD, BITSTREAM, ENCODER, DECODER, AND COMPUTER STORAGE MEDIUM

CROSS-REFERENCE TO RELATED APPLICATION(S)

This application is a continuation application of U.S. patent application Ser. No. 18/513,932, filed on Nov. 20, 2023, which is a continuation of International Patent Application No. PCT/CN2021/103250 filed on Jun. 29, 2021, the contents of both of which are incorporated herein by reference in their entirety.

BACKGROUND

The field of computer vision has acquired growing attention with an increased requirement on quality of video display. Recently, picture processing technology has been successfully applied in all walks of life. In encoding and decoding of a video picture, at an encoder side, picture data to be coded is subjected to compression coding by an entropy coding unit after being subjected to transform and quantization processing, and a bitstream generated by entropy coding is to be transmitted to a decoder; at an decoder side, the bitstream is parsed, and then the picture data originally input may be recovered by performing inverse quantization and inverse transform.

At present, encoding and decoding of a high bit-depth, high quality, high bit-rate video (triple-high video for short) usually require more coefficients to be encoded and decoded with the coefficients being also greater, than encoding and decoding of a low bit-depth, low quality, low bit-rate video (which may be referred to as conventional video). Accordingly, for triple-high video, an existing related solution may bring a greater overhead in the bitstream, producing waste.

SUMMARY

Embodiments of the disclosure relate to the field of video encoding and decoding technologies, and provide an encoding method, a decoding method, an encoder, and a decoder.

In a first aspect, embodiments of the disclosure provide a decoding method, performed by a decoder. The method includes the following operations.

Component identification information of a current slice, and coordinate information of a last significant coefficient of a current block corresponding to a component of the current slice are determined by parsing a bitstream.

In response to the component identification information indicating that last significant coefficient location reverse is applied to the component of the current slice, a location of the last significant coefficient of the current block is obtained by performing calculation on the coordinate information of the last significant coefficient.

Coefficients of the current block are determined by decoding all coefficients located above the location of the last significant coefficient in a preset scanning order.

In a second aspect, embodiments of the disclosure provide an encoding method, performed by an encoder. The method includes the following operations.

Component identification information of a current slice, and a location of a last significant coefficient of a current block corresponding to a component of the current slice are determined.

Coordinate information of the last significant coefficient of the current block is determined according to the component identification information and the location of the last significant coefficient.

All coefficients located above the location of the last significant coefficient are encoded in a preset scanning order, and bit information obtained through encoding, the component identification information, and the coordinate information of the last significant coefficient are signaled into a bitstream.

In a third aspect, embodiments of the disclosure provide an encoder. The encoder includes a first memory and a first processor.

The first memory is configured to store thereon a computer program executable on the first processor.

The first processor is configured to execute the computer program to perform the encoding method of the second aspect.

In a fourth aspect, embodiments of the disclosure provide a decoder. The decoder includes a second memory and a second processor.

The second memory is configured to store thereon a computer program executable on the second processor.

The second processor is configured to execute the computer program to perform the decoding method of the first aspect.

In an eighth aspect, embodiments of the disclosure provide a computer storage medium. The computer storage medium has stored thereon a computer program. When executed, the computer program implements the method of the first aspect, or the method of the second aspect.

BRIEF DESCRIPTION OF THE DRAWINGS

FIG. 7 is a diagram of a relation between a location of a region containing a possible significant coefficient and a location of a zero-out region in related art.

FIG. 9 is a flowchart of a decoding method according to embodiments of the disclosure.

FIG. 11 is a flowchart of an encoding method according to embodiments of the disclosure.

DETAILED DESCRIPTION

Embodiments of the disclosure are elaborated hereinafter with reference to the drawings to allow a more thorough understanding of a feature and technical content of each embodiment here. The drawings herein are just for reference and explanation, and are not intended to limit embodiments of the disclosure.

Unless otherwise defined, all technical and scientific terms used herein have the same meanings as commonly understood by a person having ordinary skill in the art of the disclosure. Terms used in the specification of the disclosure are for the mere purpose of describing a specific embodiment, and are not intended to limit the disclosure.

In the following description, "some embodiment(s)" describes a subset of all possible embodiments. However, understandably, "some embodiment(s)" may be the same subset of all possible embodiments or different subsets of all possible embodiments, and may be combined with each other as long as no conflict results from the combination. Also note that in embodiments of the disclosure, a term "first\second\third" is just for differentiating similar objects, and does not denote any specific order of the objects. Understandably, when allowed, "first\second\third" in a specific order is interchangeable, to allow embodiments of the disclosure described here to be implemented in an order other than one illustrated or described here.

In a video picture, a coding block (CB) is denoted generally by a first colour component, a second colour component, and a third colour component. The three colour components may be a luma component, a blue chroma component, and a red chroma component, respectively. Specifically, the luma component is denoted in general by Y.

The blue chroma component may be denoted in general by Cb or U. The red chroma component may be denoted in general by Cr or V. Thus, the video picture may be expressed in a YCbCr format or a YUV format.

Before embodiments of the disclosure is further elaborated, names and terms involved in embodiments of the disclosure are explained as follows:

moving picture experts group (MPEG), joint video experts team (JVET), alliance for open media (AOM), next generation video coding standard H.266/versatile video coding (VVC), VVC reference software test platform (VVC test model, VTM), audio video standard (AVS), AVS high-performance test model (high-performance model, HPM), context-based adaptive binary arithmetic coding (CABAC), raw byte sequence payload (RBSP), regular residual coding (RRC), and transform skip residual coding (TSRC).

Figure 1:
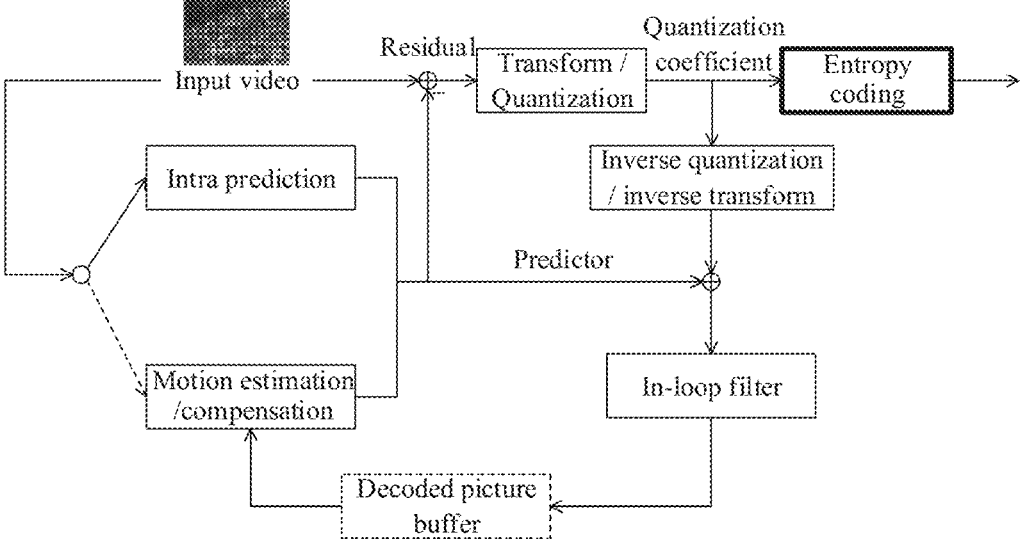
FIG. 1 is an application diagram of a coding framework in related art.

Understandably, at present, the universal video coding standards (such as VVC) all use a hybrid coding framework based on blocks. Each video picture may be partitioned into largest coding units (LCUs) which are squares of the same size, such as 128×128, 64×64, etc. Each LCU may further be partitioned into coding units (CUs) which are rectangles according to a rule. In addition, a CU may further be partitioned into smaller prediction units (PUs), transform units (TUs), etc. Specifically, as shown in FIG. 1, the hybrid coding framework may include modules such as prediction, transform, quantization, entropy coding, in loop filter, etc. The prediction module may include intra prediction and inter prediction. Inter prediction may include motion estimation (ME) and motion compensation (MC). As neighbouring pixels in one video picture correlate with each other strongly, space redundancy among the neighbouring pixels may be eliminated using intra prediction in video coding technology. However, as neighbouring video pictures are highly similar, time redundancy between neighbouring pictures may be eliminated using inter prediction in video coding technology, thereby increasing encoding and decoding efficiency.

A basic flow of a video codec is as follows. In an encoder, a picture may be partitioned into blocks. A prediction block of a current block may be produced by performing intra prediction or inter prediction on the current block. A residual block may be obtained by subtracting the prediction block from a raw block of the current block. A quantization coefficient matrix may be obtained by performing transform and quantization on the residual block. Entropy coding may be performed on the quantization coefficient matrix, and a result obtained through the entropy coding may be signalled into the bitstream. In a decoder, a prediction block of a current block may be produced by performing intra prediction or inter prediction on the current block. On the other hand, a quantization coefficient matrix may be obtained by decoding the bitstream. A residual block may be obtained by performing inverse quantization and inverse transform on the quantization coefficient matrix. A reconstructed block may be obtained by adding the prediction block and the residual block. A reconstructed picture may be composed of reconstructed blocks. A decoded picture may be obtained by performing picture-based or block-based in loop filtering on the reconstructed picture. The encoder also needs to obtain a decoded picture through operations similar to the decoder. The decoded picture may be taken as a reference picture for inter prediction, for a subsequent picture. Block partitioning information, and mode information or parameter information of prediction, transform, quantization, entropy coding, in loop filter, and the like which are determined by the encoder need to be signalled into the bitstream, if necessary. Then, by parsing the bitstream and analyzing existing information, the decoder may determine block partitioning information, and mode information or parameter information of prediction, transform, quantization, entropy coding, in loop filter, and the like which are the same as those determined by the encoder, thereby guaranteeing that the decoded picture obtained by the encoder is the same as the decoded picture obtained by the decoder. The decoded picture obtained by the encoder in general may also be referred to as a reconstructed picture. In prediction, the current block may be partitioned into PUs. In transform, the current block may be partitioned into TUs. PU partitioning and TU partitioning may differ. What described above is a basic flow of a video codec in a hybrid coding framework based on blocks. With development of technology, some modules or some steps of the framework or the flow may be optimized. Embodiments of the disclosure are applicable, but are not limited, to the basic flow of a video codec in a hybrid coding framework based on blocks.

In embodiments of the disclosure, a current block may be a current CU, a current PU, or a current transform block (TU), etc. Block partitioning information, mode and parameter information of prediction, transform, and quantization, and coefficients, and the like may be signalled into the bitstream through entropy coding. Assuming that probabilities of different elements differ. A short codeword may be allocated to an element more likely to occur. A long codeword may be allocated to an element less likely to occur. This increases coding efficiency compared to fixed-length coding. However, there is limited space for compression in entropy coding if probabilities of different elements are close or basically identical. CABAC is commonly used entropy coding.

In each of high efficiency video coding (HEVC), VVC, etc., entropy coding is performed through CABAC. In CABAC, a context model may be used, improving compression efficiency. However, use and update of a context mode also complicates an operation. There may be a bypass mode in CABAC. In the bypass mode, a context model does not need to be used and updated, achieving a higher throughput. In embodiments of the disclosure, a mode in which a context model is to be used and updated in CABAC may be referred to as a context mode.

Figure 2:
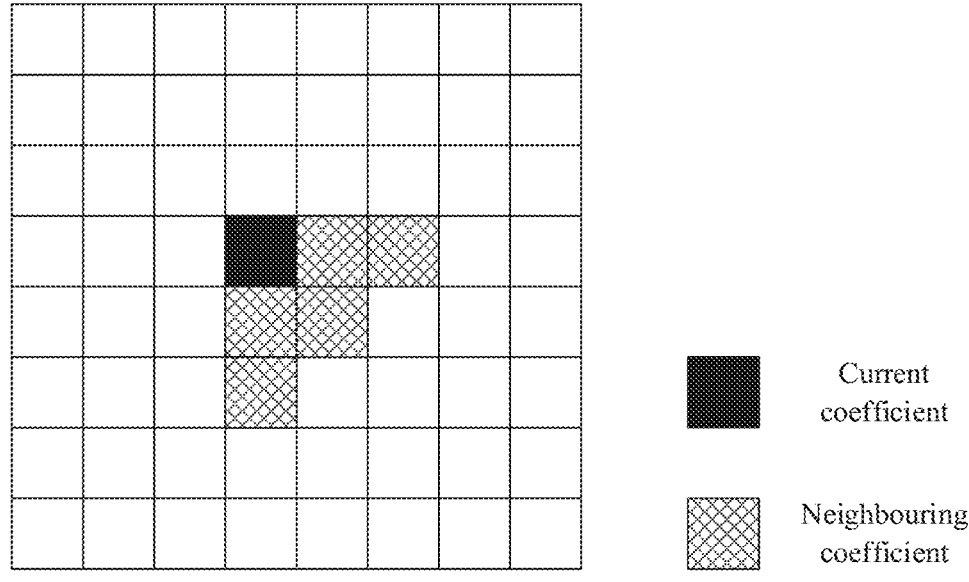
FIG. 2 is a diagram of a relation between a location of a current coefficient and a location of a neighbouring coefficient in related art.

In general, a context model needs to be determined first according to a defined method. A parameter of the context model may be taken as an input when calling a defined process of arithmetic decoding of a binary symbol. The selection of the context model may also depend on neighbouring coefficients. For example, FIG. 2 is a diagram of a relation between a location of a current coefficient and a location of a neighbouring coefficient in related art. In FIG. 2, a block filled with black denotes a current coefficient. A block filled with grid lines denotes a neighbouring coefficient. As shown in FIG. 2, a context model selected for sig_coeff_flag of the current coefficient is to be determined according to information about 5 neighbouring coefficients to the right of the current coefficient, below the current coefficient, and to the lower right of the current coefficient. It may further be seen in FIG. 2 that operation in the context mode is much more complicated than operation in the bypass mode, and further depends on neighbouring coefficients.

To use the context mode, an arithmetic coding engine of CABAC needs to call a defined process of arithmetic decoding of a binary symbol. The process may include a state transition process, i.e., update of the context model. In the process of arithmetic decoding of the binary symbol, a renormalization process of an arithmetic decoding engine may be called. In using the bypass mode, a bypass decoding process needs to be called.

Applying CABAC in VVC is introduced hereinafter as an example.

For the arithmetic coding engine of CABAC, ctxTable, ctxIdx, bypassFlag, as well as state variables ivlCurrRange and ivlOffset of the arithmetic decoding engine, may be input to the arithmetic decoding process. The arithmetic decoding process may output the value of bin.

Herein, ctxTable may be a table used when the context mode is selected, and ctxIdx may be a context model index.

Figure 3:
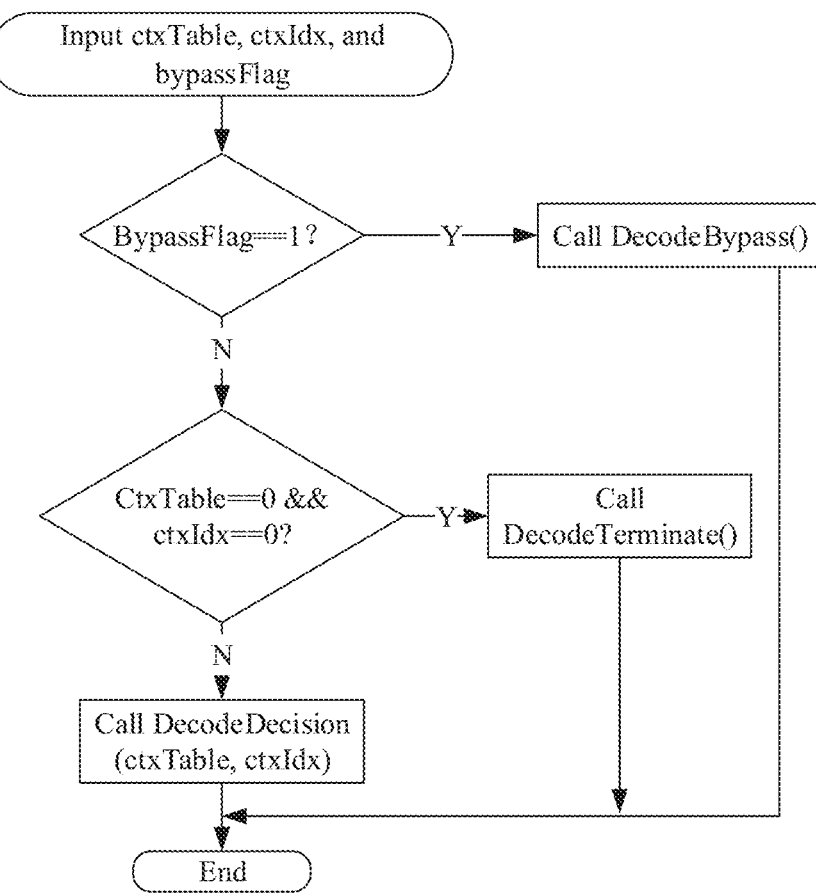
FIG. 3 is a flowchart of an arithmetic decoding process of a bin in related art.

FIG. 3 is a flowchart of an arithmetic decoding process of a bin in related art. As shown in FIG. 3, to obtain the value of bin through decoding, the context index table ctxTable, the context model index ctxIdx, the bypass mode enabled flag bypassFlag may be transmitted and input to the arithmetic decoding process DecodeBin(ctxTable, ctxIdx, bypassFlag), specifically as follows.

The bypass decoding process DecodeBypass( ) may be called if the value of bypassFlag is 1.

Otherwise if the value of bypassFlag is 0, the value of ctxTable is 0, and the value of ctxIdx is 0, a decoding terminating process DecodeTerminate( ) may be called.

Otherwise (if the value of bypassFlag is 0 and the value of ctxTable is not 0), a defined process DecodeDecision (ctxTable, ctxIdx) of arithmetic decoding of a binary symbol may be called.

Further, variables ctxTable, ctxIdx, ivlCurrRange, and ivlOffset may be input to the process of arithmetic decoding of the binary symbol. The process of arithmetic decoding of the binary symbol may output a value binVal obtained through decoding, as well as updated variables ivlCurrRange and ivlOffset.

Figure 4:
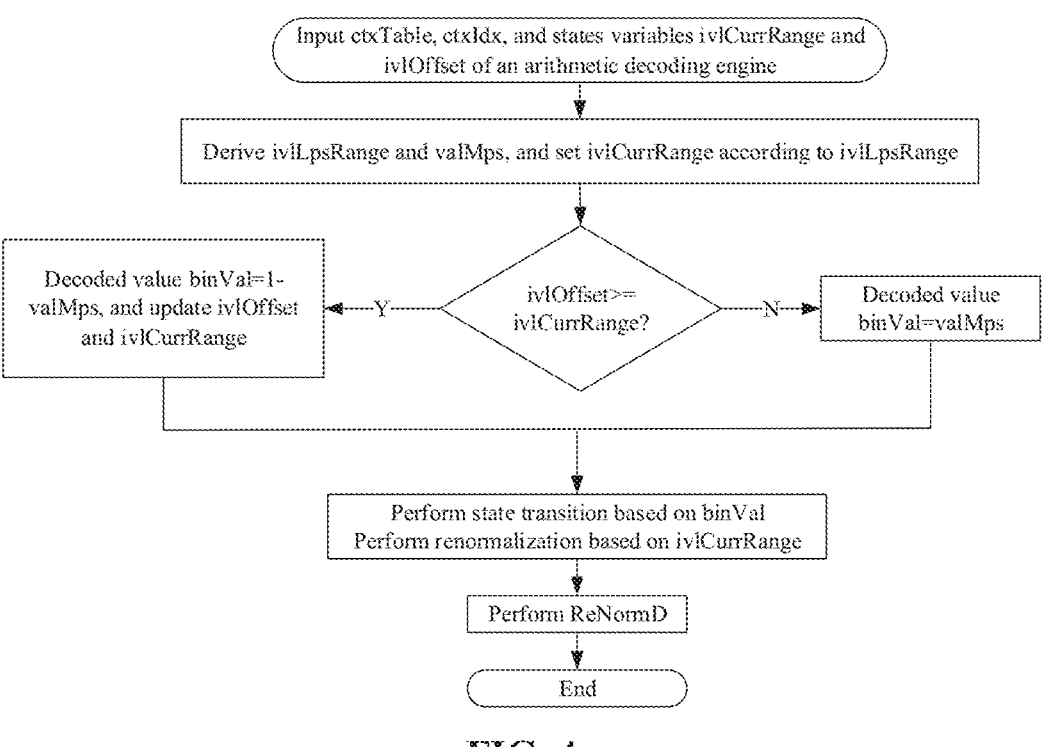
FIG. 4 is a flowchart of an arithmetic decoding process of a binary symbol in related art.

FIG. 4 is a flowchart of an arithmetic decoding process of a binary symbol in related art. As shown in FIG. 4, the context index table ctxTable and the context model index ctxIdx, as well as state variables ivlCurrRange and ivlOffset of the arithmetic decoding engine may be input through DecodeDecision(ctxTable, ctxIdx). Herein, pStateIdx0 and pStateIdx1 may be two present states of the context model.

(1) The value of a variable ivlLpsRange may be derived as follows.

A variable qRangeIdx may be derived as follows, given the current value of ivlCurrRange.

$$qRangeIdx = ivlCurrRange >> 5$$

valMps and ivlLpsRange may be derived as follows, given qRangeIdx and pStateIdx0 and pStateIdx1 corresponding to ctxTable and ctxIdx.

$$pState = pStateIdx1 + 16 \times pStateIdx0;$$
$$valMps = pState >> 14;$$
$$ivlLpsRange = (qRangeIdx \times ((valMps?32767 - pState : pState) >> 9) >> 1) + 4.$$

(2) The value of the variable ivlCurrRange may be set to ivlCurrRange-ivlLpsRange. The following operations may be performed.

If ivlOffset is greater than or equal to ivlCurrRange, the value of the variable binVal may be 1-valMps, and the variables ivlOffset and ivlCurrRange may be updated. Herein, the value of ivlOffset may be ivlOffset minus ivlCurrRange, and the value of ivlCurrRange may be ivlLpsRange.

Otherwise (if ivlOffset<ivlCurrRange), the value of the variable binVal may be valMps.

Given the value of binVal, the defined state transition (statetransition) may be performed. The defined renormalization may be performed based on the current value of ivlCurrRange.

Further, present pStateIdx0 and pStateIdx1, and binVal obtained through decoding, may be input to the state transition process. The state transition process may output context variables pStateIdx0 and pStateIdx1 corresponding to updated ctxTable and ctxIdx. Herein, variables shift0 and shift1 may be derived from shiftIdx. Here, a correspondence of shiftIdx to ctxTable and ctxIdx may be defined as follows.

$$shift0 = (shiftIdx >> 2) + 2;$$

$$shift1 = (shiftIdx \& 3) + 3 + shift0.$$

Based on the value of binVal obtained through decoding, two variables pStateIdx0 and pStateIdx1 corresponding to ctxTable and ctxIdx may be updated as follows.

$$pStateIdx0 = pStateIdx0 - (pStateIdx0 >> shift0) + (1023 \times$$

$$binVal >> shift0);$$

$$pStateIdx1 = pStateIdx1 - (pStateIdx1 >> shift1) + (16383 \times$$

$$binVal >> shift1).$$

Further, the variables ivlCurrRange and ivlOffset, and bits in slice data, may be input to the renormalization process of the arithmetic decoding engine. The renormalization process may output updated variables ivlCurrRange and ivlOffset.

Figure 5:
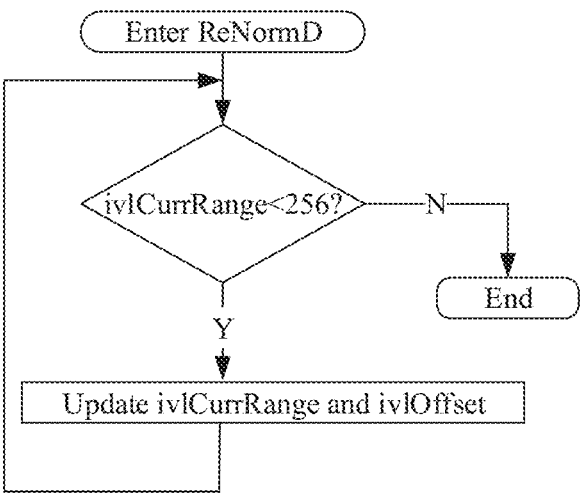
FIG. 5 is a flowchart of renormalization of an arithmetic decoding engine in related art.

FIG. 5 is a flowchart of renormalization of an arithmetic decoding engine in related art. As shown in FIG. 5, the flow may enter a process ReNormD. The current value of ivlCurrRange may preferably be compared to 256. The subsequent operations may be as follows.

If ivlCurrRange is greater than or equal to 256, renormalization is not needed, and the process RenormD terminates.

Otherwise (if ivlCurrRange is less than 256), the flow may enter a renormalization cycle. In the cycle, the value of ivlCurrRange may be multiplied by 2, i.e., moved to the left by one bit. The value of IvlOffset may be multiplied by 2, i.e., moved to the left by one bit. The one bit obtained through read_bits(1) may be moved into ivlOffset, specifically as follows.

$$ivlCurrRange = ivlCurrRange << 1;$$

$$ivlOffset = ivlOffset << 1;$$

$$ivlOffset = ivlOffset \,|\, read\_bits(1).$$

During the entire process, data in the bitstream should not cause ivlOffset to be greater than or equal to ivlCurrRange.

Further, the variables ivlCurrRange and ivlOffset, and bits of the slice data, are input to the bypass decoding process of the binary symbol, and the bypass decoding process of the binary symbol may output the updated variable ivlOffset and the value of binVal obtained through decoding.

Figure 6:
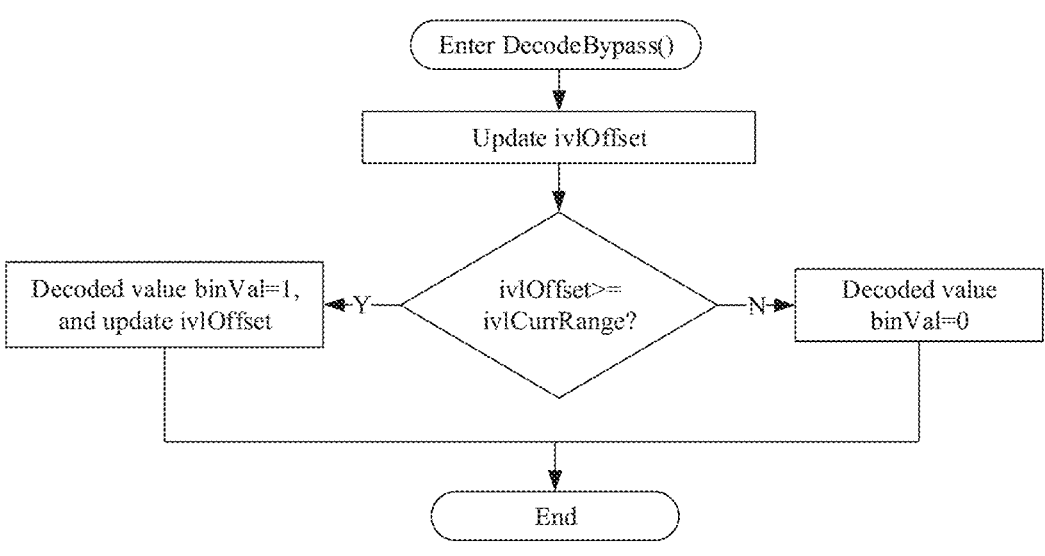
FIG. 6 is a flowchart of a bypass decoding process in related art.

When bypassFlag is 1, the bypass decoding process may be called. FIG. 6 is a flowchart of a bypass decoding process in related art. As shown in FIG. 6, first, the variable ivlOffset may be updated. That is, the value of IvlOffset may be multiplied by 2, i.e., moved to the left by one bit. The one bit obtained through read_bits(1) may be moved into ivlOffset, specifically as follows.

$$ivlOffset = ivlOffset << 1;$$

$$ivlOffset = ivlOffset \,|\, read\_bits(1).$$

Then, the value of ivlOffset may be compared to the value of ivlCurrRange. The subsequent operations may be as follows.

If ivlOffset is greater than or equal to ivlCurrRange, the value of binVal may be set as 1, and ivlOffset is equal to ivlOffset minus ivlCurrRange.

Otherwise (if ivlOffset is less than ivlCurrRange), the value of binVal may be set as 0.

During the entire process, data in the bitstream should not cause ivlOffset to be greater than or equal to ivlCurrRange.

Further note that in an existing video coding standards, one or more transforms and transform skips may usually be supported for the residuals. The transforms may include discrete cosine transform (DCT), etc. A residual block which has been subjected to transform (and quantization) may usually show certain characteristics. For example, after some transforms (and quantizations), most energy is concentrated in a low-frequency region, such that coefficients in a region at the top left corner may be large; while coefficients in a region at the bottom right corner may be small and may even include a lot of coefficients with the value 0. As the name implies, with transform skip, no transform is performed. Transform-skipped coefficients and transformed coefficients may be different in distribution, and therefore may be coded using different coefficient coding methods. For example, in VVC, RRC may be applied to a transformed coefficient, and TSRC may be applied to a transform-skipped coefficient.

Figure 7:
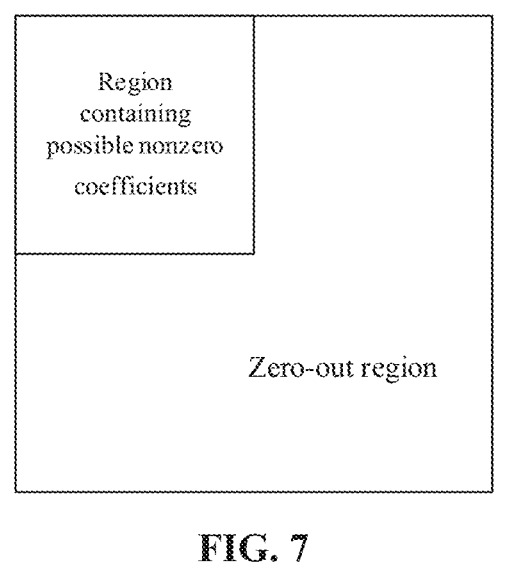

In a block having been subjected to a general transform such as DCT, coefficients located at locations from left to right may represent increasing frequencies and coefficients located at locations from top to bottom may represent increasing frequencies. Coefficients located at the top left corner denote low frequencies. Coefficients located at the lower right corner denote high frequencies. Human eyes are more sensitive to low-frequency information, and are not particularly sensitive to high-frequency information. Using such characteristics, some high-frequency information may be subjected to more processing, or may be removed with less vision impact. With some technologies, such as zero-out, some high-frequency information may be forcibly set to 0. For example, in a 64×64 block, any coefficient with an abscissa greater than or equal to 32 or an ordinate greater than or equal to 32 may be forcibly set to 0. This is just a simple example. A zero-out range may be derived with more complex methods, which is not elaborated here. As shown in FIG. 7, there may be a significant coefficient (or non-zero coefficient) in the part at the top left corner (i.e., a region containing a possible significant coefficient), and all the coefficients in the part at the lower right corner (i.e., a zero-out region) may be set to zero. Accordingly, subsequent coding of any coefficient in the zero-out region is not required, as the coefficient is 0 for sure.

Further, after performing transform (and quantization) on the residual of a common video, it is characterized that large coefficients are distributed in the top left corner and many 0 coefficients are distributed in the lower right corner. Therefore, in coefficient coding, some methods may usually be used, such that coefficients in a certain range at the top left corner are to be coded; and coefficients in a certain range at the lower right corner do not need to be coded, i.e., may be taken as 0 by default. In one method, when coding coefficients of a block, the location of a last significant coefficient of the block in a scanning order may be determined first. After the location has been determined, all the coefficient located below the location of the last significant coefficient in the scanning order may be taken as 0, i.e., do not need to be coded. Just the last significant coefficient and the coefficients located above the location of the last significant coefficient are to be coded. For example, in VVC, the location (LastSignificantCoeffX, LastSignificantCoeffY) of the last significant coefficient is determined based on last_sig_coeff_x_prefix, last_sig_coeff_y_prefix, last_sig_coeff_x_suffix, and last_sig_coeff_y_suffix.

(a) last_sig_coeff_x_prefix specifies the prefix of the horizontal coordinate (or column position) of the last significant coefficient in the scanning order within the current block. The values of last_sig_coeff_x_prefix shall be in the range of 0 to (log 2ZoTbWidth<<1)−1, inclusive.

When last_sig_coeff_x_prefix is not present, it is inferred to be 0.

(b) last_sig_coeff_y_prefix specifies the prefix of the vertical coordinate (or row position) of the last significant coefficient in the scanning order within the current block. The values of last_sig_coeff_y_prefix shall be in the range of 0 to (log 2ZoTbHeight<<1)−1, inclusive.

When last_sig_coeff_y_prefix is not present, it is inferred to be 0.

(c) last_sig_coeff_x_suffix specifies the suffix of the horizontal coordinate (or column position) of the last significant coefficient in the scanning order within the current block. The values of last_sig_coeff_x_suffix shall be in the range of 0 to (1<<((last_sig_coeff_x_prefix>>1)−1))−1, inclusive.

The horizontal coordinate (or column position) LastSignificantCoeffX of the last significant coefficient in the scanning order within the current transform block may be derived as follows.

If last_sig_coeff_x_suffix is not present, the following applies:

LastSignificantCoeffX=last_sig_coeff_x_prefix;

Otherwise (last_sig_coeff_x_suffix is present), the following applies:

$$LastSignificantCoeffX = (1<< ((\text{last\_sig\_coeff\_x\_prefix} >> 1) - 1))*$$
$$(2 + (\text{last\_sig\_coeff\_x\_prefix} \& 1)) + \text{last\_sig\_coeff\_x\_suffix}.$$

(d) last_sig_coeff_y_suffix specifies the suffix of the vertical coordinate (or row position) of the last significant coefficient in the scanning order within the current transform block. The values of last_sig_coeff_y_suffix shall be in the range of 0 to (1<<((last_sig_coeff_y_prefix>>1)−1))−1, inclusive.

The vertical coordinate (or row position) LastSignificantCoeffY of the last significant coefficient in the scanning order within the current transform block may be derived as follows.

If last_sig_coeff_y_suffix is not present, the following applies:

LastSignificantCoeffY=last_sig_coeff_y_prefix;

Otherwise (last_sig_coeff_y_suffix is present), the following applies:

$$LastSignificantCoeffY = (1<< ((\text{last\_sig\_coeff\_y\_prefix} >> 1) - 1))*$$
$$(2 + (\text{last\_sig\_coeff\_y\_prefix} \& 1)) + \text{last\_sig\_coeff\_y\_suffix}.$$

Further, the last significant coefficient and coefficient(s) located above the location of the last significant coefficient are all to be coded. However, in a regular video, even among these coefficients, there is a certain proportion of coefficients that are 0. In VVC, a flag sb_coded_flag (indicating whether a current sub-block is coded) may be used to determine whether coefficients in the current sub-block are to be coded. The coefficients in the current sub-block are all taken as 0, if the coefficients in the current sub-block do not need to be coded. Here, a sub-block in general may be n×n, such as 4×4.

sb_coded_flag[xS][yS] specifies the following for a sub-block at location (xS, yS) within the current transform block, where the sub-block is an array of transform coefficient levels:

When sb_coded_flag[xS][yS] is equal to 0, all transform coefficient levels of the sub-block at location (xS, yS) within the current transform block are inferred to be equal to 0.

When sb_coded_flag[xS][yS] is not present, it is inferred to be equal to 1.

Further, in coefficient coding, compression efficiency may be improved using coefficient characteristics. For example, for a common video, a certain proportion of coefficients among coefficients to be coded are 0. Therefore, a syntax element may be used to indicate whether a current coefficient is 0. The syntax element in general may be a binary symbol. If the current coefficient is 0, it means that coding of the current coefficient has terminated. Otherwise, it is necessary to continue coding the current coefficient. As another example, for a common video, absolute values of a certain proportion of coefficients among significant coefficients (i.e., non-zero coefficients) may be 1. Therefore, a syntax element may be used to indicate whether the absolute value of a current coefficient is greater than 1. The syntax element in general may be a binary symbol. If the absolute value of the current coefficient is not greater than 1, it means that coding of the current coefficient has terminated. Otherwise, it is necessary to continue coding the current coefficient. For example, syntax elements involved in VVC are as follows.

sig_coeff_flag[xC][yC] specifies for the transform coefficient location (xC, yC) within the current transform block whether the corresponding transform coefficient level at the location (xC, yC) is non-zero as follows.

If sig_coeff_flag[xC][yC] is equal to 0, the transform coefficient level at the location (xC, yC) is set equal to 0.

Otherwise (sig_coeff_flag[xC][yC] is equal to 1), the transform coefficient level at the location (xC, yC) has a non-zero value.

When sig_coeff_flag[xC][yC] is not present, it is inferred as follows.

If transform_skip_flag[x0][y0][cIdx] is equal to 0 or sh_ts_residual_coding_disabled_flag is equal to 1, the following applies:

If (xC, yC) is the last significant location (LastSignificantCoeffX, LastSignificantCoeffY) in the scanning order or all of the following conditions are true, sig_coeff_flag[xC][yC] is inferred to be equal to 1:

(xC&((1 log 2SbW)−1), yC& ((1 log 2SbH)−1)) is equal to (0, 0), inferSbDcSigCoeffFlag is equal to 1, and sb_coded_flag[xS][yS] is equal to 1;

Otherwise, sig_coeff_flag[xC][yC] is inferred to be equal to 0;

Otherwise (transform_skip_flag[x0][y0][cldx] is equal to 1 and sh_ts_residual_coding_disabled_flag is equal to 0), the following applies:

If all of the following conditions are true, sig_coeff_flag[xC][yC] is inferred to be equal to 1:

(xC&((1<<log 2SbW)−1), yC&((1<<log 2SbH)−1)) is equal to ((1<<log 2SbW)−1, (1<<log 2SbH)−1), inferSbSigCoeffFlag is equal to 1, and sb_coded_flag[xS][yS] is equal to 1;

Otherwise, sig_coeff_flag[xC][yC] is inferred to be equal to 0.

abs_level_gtx_flag[n][j] specifies whether the absolute value of the transform coefficient (at scanning position n) is greater than (j<<1)+1. When abs_level_gtx_flag[n][j] is not present, it is inferred to be equal to 0.

In this way, if coding of the current coefficient is not done yet after the forementioned flags (also referred to as the syntax elements) have been processed, the remaining value, such as abs_remainder in VVC, of the absolute value of the coefficient, is to be coded.

abs_remainder[n] is the remaining absolute value of a transform coefficient level that is coded with Golomb-Rice code at the scanning position n. When abs_remainder[n] is not present, it is inferred to be equal to 0.

Further, in VVC, the syntax elements such as sig_coeff_flag, abs_level_gtx_flag, etc., may be coded in the context mode, and abs_remainder may be coded in the bypass mode. As mentioned above, context-based coding is more complicated than bypass coding, i.e., involves more time-consuming processing, intuitively speaking. Use of too much context-based coding may impact a speed of decoding, if there are a lot of coefficients to be coded. Therefore, the number of syntax elements to be coded in the context mode may be limited. For example, once the number of binary symbols to be coded in the context mode exceeds a threshold value, subsequent coefficients may be forced to be coded in the bypass mode, such as dec_abs_level in VVC.

dec_abs_level[n] is an intermediate value that is coded with Golomb-Rice code at the scanning position n. ZeroPos[n] is derived during the parsing of dec_abs_level[n]. The absolute value AbsLevel[xC][yC] of a transform coefficient level at the location (xC, yC) may be derived as follows.

If dec_abs_level[n] is not present or equal to ZeroPos[n], AbsLevel[xC][yC] is set equal to 0.

Otherwise, if dec_abs_level[n] is less than ZeroPos[n], AbsLevel[xC][yC] is set equal to dec_abs_level[n]+1.

Otherwise (dec_abs_level[n] is greater than ZeroPos[n]), AbsLevel[xC][yC] is set equal to dec_abs_level[n].

The above relates to the absolute value of the coefficient. The sign of a significant coefficient may be determined using a coefficient sign flag coeff_sign_flag or some sign deriving methods. coeff_sign_flag[n] specifies the sign of a transform coefficient level for the scanning position n as follows.

If coeff_sign_flag[n] is equal to 0, the corresponding transform coefficient level has a positive value.

Otherwise (coeff_sign_flag[n] is equal to 1), the corresponding transform coefficient level has a negative value.

When coeff_sign_flag[n] is not present, it is inferred to be equal to 0. In this case, the value of CoeffSignLevel[xC][yC] specifies the sign of a transform coefficient level at the location (xC, yC) as follows.

If CoeffSignLevel[xC][yC] is equal to 0, the corresponding transform coefficient level is equal to zero.

Otherwise, if CoeffSignLevel[xC][yC] is equal to 1, the corresponding transform coefficient level has a positive value.

Otherwise (CoeffSignLevel[xC][yC] is equal to −1), the corresponding transform coefficient level has a negative value.

Further note that CoeffSignLevel[xC][yC] may further be derived using another method, which is not elaborated here.

In addition, in VVC, a flag par_level_flag of parity of a coefficient level may further be used. One may learn parity of the current coefficient level according to the flag, which may be used in determining the value of the current coefficient level and dependent quantization.

par_level_flag[n] specifies the parity of the transform coefficient level at the the scanning position n. When par_level_flag[n] is not present, it is inferred to be equal to 0.

In addition to determination of the parity of the transform coefficient level, par_level_flag may further be used to determine, together with abs_level_gtx_flag and abs_remainder and the like, the magnitude of the coefficient.

Here, as a context mode needs to be selected, used, and updated in context-based coding, and no context mode needs to be selected, used, and updated in bypass coding, a general practice is to put the syntax elements to be coded by context-based coding together, and put the syntax elements to be coded by bypass coding together, within a certain range. This turns out to be more friendly to hardware design. For example, the syntax elements to be coded by context-based coding in one block are processed first, and then the syntax elements to be coded by bypass coding are processed. the syntax elements to be coded by context-based coding in the current block may further be divided into several groups. The syntax elements to be coded by the bypass mode in one block may further be divided into several groups.

In a specific example, the specific syntax of RRC is as shown in Table 1.

TABLE 1

| | Descriptor |
|---|---|
| residual_coding(x0, y0, log2TbWidth,<br>log2TbHeight, cIdx) {<br>if(sps_mts_enabled_flag && cu_sbt_flag<br>&& cIdx==0 &&<br>   log2TbWidth==5 && log2TbHeight<6)<br>  log2ZoTbWidth=4<br>else<br>  log2ZoTbWidth=Min(log2TbWidth, 5)<br>if(sps_mts_enabled_flag && cu_sbt_flag<br>&& cIdx==0 &&<br>   log2TbWidth<6 && log2TbHeight == 5)<br>  log2ZoTbHeight=4<br>else<br>  log2ZoTbHeight=Min(log2TbHeight, 5)<br>if(log2TbWidth >0) | |
|   last_sig_coeff_x_prefix | ae(v) |
| if(log2TbHeight >0) | |
|   last_sig_coeff_y_prefix | ae(v) |
| if(last_sig_coeff_x_prefix> 3) | |
|   last_sig_coeff_x_suffix | ae(v) |
| if(last_sig_coeff_y_prefix> 3) | |
|   last_sig_coeff_y_suffix | ae(v) |
| log2TbWidth=log2ZoTbWidth<br>log2TbHeight=log2ZoTbHeight<br>remBinsPass1=((1<<(log2TbWidth+<br>log2TbHeight)) ×7) >>2<br>log2SbW=(Min(log2TbWidth, log2TbHeight) < 2 ?1: 2)<br>log2SbH=log2SbW<br>if(log2TbWidth+log2TbHeight>3)<br>  if(log2TbWidth<2) {<br>    log2SbW=log2TbWidth<br>    log2SbH=4−log2SbW<br>  } elseif(log2TbHeight<2) {<br>    log2SbH=log2TbHeight<br>    log2SbW=4−log2SbH<br>  }<br>numSbCoeff=1<<(log2SbW+log2SbH)<br>lastScanPos=numSbCoeff<br>lastSubBlock=(1<<(log2TbWidth+log2TbHeight−<br>(log2SbW+log2SbH)))<br>−1<br>do {<br>  if(lastScanPos ==0) {<br>    lastScanPos=numSbCoeff<br>    lastSubBlock-- | |

TABLE 1-continued

| | Descriptor |
|---|---|

```
        }
        lastScanPos--
        xS=DiagScanOrder[log2TbWidth-
        log2SbW][log2TbHeight-log2SbH]
                [lastSubBlock][0]
        yS=DiagScanOrder[log2TbWidth-
        log2SbW][log2TbHeight-log2SbH]
                [lastSubBlock][1]
        xC=(xS<<log2SbW)
+DiagScanOrder[log2SbW][log2SbH][lastScanPos][0]
        yC=(yS<<log2SbH)
+DiagScanOrder[log2SbW][log2SbH][lastScanPos][1]
    } while((xC != LastSignificantCoeffX) || (yC !=
LastSignificantCoeffY))
    if(lastSubBlock ==0 && log2TbWidth>=2
    && log2TbHeight>=2 &&
            !transform_skip_flag[x0][y0][cIdx]
            && lastScanPos >0)
        LfnstDcOnly=0
    if((lastSubBlock >0 && log2TbWidth>=2
    && log2TbHeight>=2) ||
            (lastScanPos>7 && (log2TbWidth ==
            2 || log2TbWidth == 3) &&
            log2TbWidth == log2TbHeight))
        LfnstZeroOutSigCoeffFlag=0
    if((lastSubBlock >0 || lastScanPos>0) && cIdx==0)
        MtsDcOnly=0
    QState=0
    for(i=lastSubBlock; i >=0; i--) {
        startQStateSb=QState
        xS=DiagScanOrder[log2TbWidth-
        log2SbW][log2TbHeight-log2SbH]
                [i][0]
        yS=DiagScanOrder[log2TbWidth-
        log2SbW][log2TbHeight-log2SbH]
                [i][1]
        inferSbDcSigCoeffFlag=0
        if(i<lastSubBlock && I >0) {
            sb_coded_flag[xS][yS]                    ae(v)
            inferSbDcSigCoeffFlag=1
        }
        if(sb_coded_flag[xS][yS] && (xS>3 ||
        yS>3) && cIdx==0)
            MtsZeroOutSigCoeffFlag=0
        firstSigScanPosSb=numSbCoeff
        lastSigScanPosSb =-1
        firstPosMode0=(i == lastSubBlock ?
        lastScanPos: numSbCoeff-1)
        firstPosMode1=firstPosMode0
        for(n=firstPosMode0; n>=0 &&
        remBinsPass1>=4; n--) {
            xC=(xS<<log2SbW)
+DiagScanOrder[log2SbW][log2SbH][n][0]
            yC=(yS<<log2SbH)
+DiagScanOrder[log2SbW][log2SbH][n][1]
            if(sb_coded_flag[xS][yS] && (n >0 ||
            !inferSbDcSigCoeffFlag) &&
                (xC != LastSignificantCoeffX ||
                yC != LastSignificantCoeffY)) {
                sig_coeff_flag[xC][yC]            ae(v)
                remBinsPass1--
                if(sig_coeff_flag[xC][yC])
                    inferSbDcSigCoeffFlag=0
            }
            if(sig_coeff_flag[xC][yC]) {
                abs_level_gtx_flag[n][0]          ae(v)
                remBinsPass1--
                if(abs_level_gtx_flag[n][0]) {
                    par_level_flag[n]             ae(v)
                    remBinsPass1--
                    abs_level_gtx_flag[n][1]      ae(v)
                    remBinsPass1--
                }
                if(lastSigScanPosSb == -1)
                    lastSigScanPosSb=n
                firstSigScanPosSb=n
            }
            AbsLevelPass1[xC][yC]=sig_coeff_flag
```

TABLE 1-continued

| | Descriptor |
|---|---|

```
                [xC][yC]+par_level_flag[n]+
                abs_level_gtx_flag[n][0]+
                2×abs_level_gtx_flag[n][1]
            if(sh_dep_quant_used_flag)
                QState=QStateTrans Table[QState]
                [AbsLevelPass1[xC][yC]&1]
            firstPosMode1=n-1
        }
        for(n=firstPosMode0; n>firstPosMode1; n--) {
            xC=(xS<<log2SbW)
+DiagScanOrder[log2SbW][log2SbH][n][0]
            yC=(yS<<log2SbH)
+DiagScanOrder[log2SbW][log2SbH][n][1]
            if(abs_level_gtx_flag[n][1])
                abs_remainder[n]                 ae(v)
            AbsLevel[xC][yC]=AbsLevelPass1
            [xC][yC]+2×abs_remainder[n]
        }
        for(n=firstPosMode1; n>=0; n--) {
            xC=(xS<<log2SbW)
+DiagScanOrder[log2SbW][log2SbH][n][0]
            yC=(yS<<log2SbH)
+DiagScanOrder[log2SbW][log2SbH][n][1]
            if(sb_coded_flag[xS][yS])
                dec_abs_level[n]                 ae(v)
            if(AbsLevel[xC][yC]>0) {
                if(lastSigScanPosSb == -1)
                    lastSigScanPosSb=n
                firstSigScanPosSb=n
            }
            if(sh_dep_quant_used_flag)
                QState=QStateTransTable
                [QState][AbsLevel[xC][yC]&1]
        }
        signHiddenFlag=sh_sign_data_hiding_used_flag &&
            (lastSigScanPosSb-firstSigScanPosSb>3 ?1: 0)
        for(n=numSbCoeff-1; n>=0; n--) {
            xC=(xS<<log2SbW)
+DiagScanOrder[log2SbW][log2SbH][n][0]
            yC=(yS<<log2SbH)
+DiagScanOrder[log2SbW][log2SbH][n][1]
            if((AbsLevel[xC][yC]>0) &&
                (!signHiddenFlag || (n != firstSigScanPosSb)))
                coeff_sign_flag[n]               ae(v)
        }
        if(sh_dep_quant_used_flag) {
            QState=startQStateSb
            for(n=numSbCoeff-1; n>=0; n--) {
                xC=(xS<<log2SbW)
+DiagScanOrder[log2SbW][log2SbH][n][0]
                yC=(yS<<log2SbH)
+DiagScanOrder[log2SbW][log2SbH][n][1]
                if(AbsLevel[xC][yC]>0)
                    TransCoeffLevel[x0][y0][cIdx][xC][yC]=
                        (2×AbsLevel[xC][yC]-(QState>1?1: 0)) ×
                        (1-2×coeff_sign_flag[n])
                QState=QStateTransTable
                [QState][AbsLevel[xC][yC]&1]
            }
        } else{
            sumAbsLevel=0
            for(n=numSbCoeff-1; n>=0; n--) {
                xC=(xS<<log2SbW)
+DiagScanOrder[log2SbW][log2SbH][n][0]
                yC=(yS<<log2SbH)
+DiagScanOrder[log2SbW][log2SbH][n][1]
                if(AbsLevel[xC][yC]>0) {
                    TransCoeffLevel[x0][y0][cIdx][xC][yC] =
                        AbsLevel[xC][yC]×(1-
                        2×coeff_sign_flag[n])
                    if(signHiddenFlag) {
                        sumAbsLevel += AbsLevel[xC][yC]
                        if(n == firstSigScanPosSb &&
                        sumAbsLevel % 2 ==1)
                        TransCoeffLevel[x0][y0][cIdx][xC][yC] =
                            -TransCoeffLevel
                            [x0][y0][cIdx][xC][yC]
        }
```

TABLE 1-continued

| Descriptor |
| --- |

```
        }
      }
    }
  }
```

The array AbsLevel[xC][yC] denotes an array of absolute values of transform coefficients of the current transform block. The array AbsLevelPassl[xC][yC] denotes an array of partly reconstructed absolute values of transform coefficients of the current transform block. Array indices xC and yC denote the location (xC, yC) in the current transform block.

Some block size information, such as logarithms log 2ZoTbWidth and log 2ZoTbHeight of a zero-out block size, needs to be determined after the flow has entered the function residual_coding(x0, y0, log 2TbWidth, log 2TbHeight, cldx). A coefficient with an abscissa ranging in [0,(1<<log 2ZoTbWidth) greater than 1, it means that coding of the current coefficient has terminaant coefficient. Here, (1<<log 2ZoTbWidth) may denote the width of the zero-out transform block, and (1<<log 2ZoTbHeight) may denote the height of the zero-out transform block. Then, the location of the last significant coefficient may be determined according to last_sig_coeff_x_prefix, last_sig_coeff_y_prefix, last_sig_coeff_x_suffix, and last_sig_coeff_y_suffix, etc. A coefficient located above the last significant coefficient in the scanning order may be a significant coefficient. Then, the value of remBinsPass1 may be determined, using the formula remBinsPass1=((1<<(log 2TbWidth+log 2TbHeight))×7)>>2. remBinsPass1 may specify the number of syntax elements to be coded by the context-based coding (i.e., the number of syntax elements coded based on the context mode) in the current block. In embodiments of the disclosure, understandably, remBinsPass1 may refer to remaining binaries inpass1, i.e., the number of remaining binary symbols in the first round. Coefficients located above the last significant coefficient in the scanning order need to be coded. For sub-blocks including these coefficients, it may be determined in turn whether each sub-block as the current sub-block needs to be coded. If the current sub-block is to be coded, in RRC, the syntax elements to be coded by context-based coding in the sub-block may be put in the first round, and the syntax elements to be coded by bypass coding (i.e., the syntax elements coded based on the bypass mode) may be put after the first round. Up to 4 syntax elements to be coded by context-based coding, i.e., 1 sig_coeff_flag, 2 abs_level_gtx_flags, and 1 par_level_flag, may need to be processed for each coefficient. In the first round, remBins-Pass1 may be subtracted by 1 each time one syntax element to be coded by context-based coding has been processed. If a coefficient is big enough, the remaining value, i.e., abs_remainder, further needs to be processed, after the several syntax elements to be coded by context-based coding have been processed in the first round. Otherwise if remBinsPass1 is small enough (not meeting remBinsPass1>=4), the first round may terminate. The remaining coefficients may be processed directly using the bypass mode, i.e., dec_abs_level.

In another specific example, the specific syntax of TSRC is as shown in Table 2.

TABLE 2

| | Descriptor |
| --- | --- |
| residual_ts_coding(x0, y0, log2TbWidth, log2TbHeight, cIdx) { | |
| log2SbW=(Min(log2TbWidth, log2TbHeight) <2 ?1: 2) | |
| log2SbH=log2SbW | |
| if(log2TbWidth+log2TbHeight>3) | |
|   if(log2TbWidth<2) { | |
|     log2SbW=log2TbWidth | |
|     log2SbH=4−log2SbW | |
|   } elseif(log2TbHeight<2) { | |
|     log2SbH=log2TbHeight | |
|     log2SbW=4−log2SbH | |
|   } | |
|   numSbCoeff=1<<(log2SbW+log2SbH) | |
|   lastSubBlock=(1<<(log2TbWidth+log2TbHeight− (log2SbW+log2SbH)))−1 | |
|   inferSbCbf=1 | |
|   RemCcbs=((1<<(log2TbWidth+ log2TbHeight)) ×7) >>2 | |
|   for(i =0; i <= lastSubBlock; i++) { | |
|     xS=DiagScanOrder[log2TbWidth− log2SbW][log2TbHeight−log2SbH][i][0] | |
|     yS=DiagScanOrder[log2TbWidth− log2SbW][log2TbHeight−log2SbH][i][1] | |
|     if(i != lastSubBlock ‖ !inferSbCbf) | |
|       sb_coded_flag[xS][yS] | ae(v) |
|     if(sb_coded_flag[xS][yS] && i<lastSubBlock) | |
|       inferSbCbf=0 | |
|     /×Firstscanpass ×/ | |
|     inferSbSigCoeffFlag=1 | |
|     lastScanPosPass1=−1 | |
|     for(n=0; n <= numSbCoeff−1 && RemCcbs>=4; n++) { | |
|       xC=(xS<<log2SbW) +DiagScanOrder[log2SbW][log2SbH][n][0] | |
|       yC=(yS<<log2SbH) +DiagScanOrder[log2SbW][log2SbH][n][1] | |
|       lastScanPosPass1=n | |
|       if(sb_coded_flag[xS][yS] && (n != numSbCoeff−1 ‖ !inferSbSigCoeffFlag)) { | |
|         sig_coeff_flag[xC][yC] | ae(v) |
|         RemCcbs−− | |
|         if(sig_coeff_flag[xC][yC]) | |
|           inferSbSigCoeffFlag=0 | |
|       } | |
|       CoeffSignLevel[xC][yC]=0 | |
|       if(sig_coeff_flag[xC][yC]) { | |
|         coeff_sign_flag[n] | ae(v) |
|         RemCcbs−− | |
|         CoeffSignLevel[xC][yC]= (coeff_sign_flag[n]>0 ?−1: 1) | |
|         abs_level_gtx_flag[n][0] | ae(v) |
|         RemCcbs−− | |
|         if(abs_level_gtx_flag[n][0]) { | |
|           par_level_flag[n] | ae(v) |
|           RemCcbs−− | |
|         } | |
|       } | |
|       AbsLevelPass1[xC][yC]= sig_coeff_flag[xC][yC]+par_level_flag[n]+ abs_level_gtx_flag[n][0] | |
|     } | |
|     /×Greater than Xscanpass(numGtXFlags=5) ×/ | |
|     lastScanPosPass2 =−1 | |
|     for(n=0; n <= numSbCoeff−1 && RemCcbs>=4; n++) { | |
|       xC=(xS<<log2SbW) +DiagScanOrder[log2SbW][log2SbH][n][0] | |
|       yC=(yS<<log2SbH) +DiagScanOrder[log2SbW][log2SbH][n][1] | |
|       AbsLevelPass2[xC][yC]=AbsLevelPass1[xC][yC] | |
|       for(j=1; j<5; j++) { | |
|         if(abs_level_gtx_flag[n][j−1]) { | |
|           abs_level_gtx_flag[n][j] | ae(v) |
|           RemCcbs−− | |
|         } | |
|         AbsLevelPass2[xC][yC]+= | |

17

TABLE 2-continued

| | Descriptor |
|---|---|
| 2×abs_level_gtx_flag[n][j] | |
| } | |
| lastScanPosPass2=n | |
| } | |
| /×remainderscanpass ×/ | |
| for(n=0; n <= numSbCoeff−1; n++) { | |
| xC=(xS<<log2SbW) | |
| +DiagScanOrder[log2SbW][log2SbH][n][0] | |
| yC=(yS<<log2SbH) | |
| +DiagScanOrder[log2SbW][log2SbH][n][1] | |
| if((n <= lastScanPosPass2 && | |
| AbsLevelPass2[xC][yC]>=10)   | | |
| (n>lastScanPosPass2 && n <= | |
| lastScanPosPass1 && | |
| AbsLevelPass1[xC][yC]>= 2)   | | |
| (n>lastScanPosPass1 && | |
| sb_coded_flag[xS][yS])) | |
| abs_remainder[n] | ae(v) |
| if(n <= lastScanPosPass2) | |
| AbsLevel[xC][yC]=AbsLevelPass2[xC][yC]+ | |
| 2×abs_remainder[n] | |
| elseif(n <= lastScanPosPass1) | |
| AbsLevel[xC][yC]=AbsLevelPass1[xC][yC]+ | |
| 2×abs_remainder[n] | |
| else{ /×bypass ×/ | |
| AbsLevel[xC][yC]=abs_remainder[n] | |
| if(abs_remainder[n]) | |
| coeff_sign_flag[n] | ae(v) |
| } | |
| if(BdpcmFlag[x0][y0][cIdx] ==0 && | |
| n <= lastScanPosPass1) { | |
| absLeftCoeff=xC >0 ? AbsLevel[xC−1][yC]: 0 | |
| absAboveCoeff =yC >0 ? AbsLevel[xC][yC−1]: 0 | |
| predCoeff=Max(absLeftCoeff, absAboveCoeff) | |
| if(AbsLevel[xC][yC]==1 && predCoeff >0) | |
| AbsLevel[xC][yC]=predCoeff | |
| elseif(AbsLevel[xC][yC]>0 && | |
| AbsLevel[xC][yC] <= predCoeff) | |
| AbsLevel[xC][yC]−− | |
| } | |
| TransCoeffLevel[x0][y0][cIdx][xC][yC]= | |
| (1−2×coeff_sign_flag[n]) × | |
| AbsLevel[xC][yC] | |
| } | |
| } | |
| } | |
| } | |

Some block size information needs to be determined after the flow has entered the function residual_ts_coding(x0, y0, log 2TbWidth, log 2TbHeight, cIdx). Then, the value of RemCcbs may be determined, using the formula RemCcbs= ((1<<(log 2TbWidth+log 2TbHeight))×7)>>2. RemCcbs may specify the number of syntax elements to be coded by the context-based coding in the current block. In embodiments of the disclosure, understandably, RemCcbs may refer to remaining context coded binaries, i.e., the number of remaining binary symbols to be coded by the context-based coding. For each sub-block, it may be determined whether the sub-block as a current sub-block is to be encoded. If the current sub-block is to be encoded, in TSRC (unlike in RRC), the syntax elements to be coded by context-based coding in the sub-block may be put in two rounds. For each coefficient, up to 4 syntax elements to be coded by context-based coding may need to be processed in each of the first round and the second round. The syntax elements to be coded by bypass coding may be put after the two rounds. In the first round and the second round, remBinsPass1 may be subtracted by 1 each time one syntax element to be coded by context-based coding has been processed. If a coefficient is big enough, the remaining value, i.e., abs_remainder, further needs to be processed, after the several syntax elements to be coded by context-based coding have been processed in the first round and the second round. Otherwise if remBinsPass1 is small enough (not meeting remBinsPass1>=4), the first two rounds may terminate. The remaining coefficients may be processed directly using the bypass mode, where it is still abs_remainder.

In short, in related art, a common video at present, such as a consumer video, may be compressed with excellent compression efficiency using the existing coefficient coding method. In general, a consumer video may require a bit depth of 8 bits or 10 bits per pixel. In general, a bit rate of a consumer video is not overly high, and is in general several megabytes per second (MB/s) or less. However, videos related to some applications require a higher bit depth per pixel, such as a bit depth of 12 bits, 14 bits, 16 bits, or more per pixel. A higher bit depth in general may bring a greater coefficient and a greater number of significant coefficients, thereby bringing a higher bit rate. Videos related to some applications require higher quality. Higher quality in general may also bring a greater coefficient and a greater number of significant coefficients, thereby bringing a higher bit rate. The higher bit rate may put a higher requirement on processing capacity, such as a throughput, of the decoder.

In general, as compared to the case for a low bit-depth, low quality, low bit-rate video (conventional video), a high bit-depth, high quality, high bit-rate video (triple-high video) requires more coefficients to be encoded and decoded, and these coefficients are greater. For example, there are a lot more coefficients to be encoded and decoded in a block in a triple-high video compared to the number of coefficients to be encoded and decoded in a block of the same size in a conventional video. This is because many coefficients in a block of the conventional video all become 0 after being subjected to prediction, transform, and quantization, while many coefficients in a block of the triple-high video may still be non-zero after being subjected to prediction, transform, and quantization. A great proportion of coefficients to be coded among coefficients having been subjected to prediction, transform, and quantization in a block of the conventional video may be 0. Therefore, it may be highly efficient to determine whether a coefficient region is to be coded using the location (LastSignificantCoeffX, LastSignificantCoeffY) of a last significant coefficient. Even a great proportion of coefficients located above the location of the last significant coefficient may still be 0. Therefore, it may be highly efficient to further determine whether a current sub-block is to be coded using a flag sb_coded_flag indicating whether the sub-block is to be coded. However, when there are a lot of significant coefficients in the current block, or even most or all of the coefficients are significant (i.e., non-zero), use of the location of the last significant coefficient and the flag indicating whether a sub-block is to be coded will not exclude too many significant coefficients. Moreover, signalling the significant coefficient location, and the flag indicating whether a sub-block is to be coded, and the like into the bitstream may take up a certain amount of overhead, producing waste.

In another aspect, the location of the last significant coefficient, and the flag indicating whether a sub-block is to be coded, and the like may all be coded in the context mode. Context-based coding is more complicated than bypass coding, and processing these information may further impact the throughput and the speed of encoding and decoding of software and hardware.

In yet another aspect, at present, the method for coding the location (LastSignificantCoeffX, LastSignificantCoeffY) of the last significant coefficient is to code coordinates of the location of the last significant coefficient. In a conventional video, as most of significant coefficients are concentrated in the top left corner and coefficients in a large region at the bottom right corner are 0, values of LastSignificantCoeffX and LastSignificantCoeffY in general may be small. In a triple-high video, a lot of significant coefficients may also appear in the bottom right corner, in general leading to large values of LastSignificantCoeffX and LastSignificantCoeffY, thereby bringing a greater overhead in the bitstream by coding the great values in the bitstream. In addition, another possibility is to apply the method in case of lossless compression. As quantization is not allowed in lossless compression, in general there may be a lot of coefficients, and the coefficients may have large values. In this case, using an existing solution may bring a greater overhead, producing waste, lowering compression efficiency.

Embodiments of the disclosure provide a decoding method. Component identification information of a current slice, and coordinate information of a last significant coefficient of a current block corresponding to a component of the current slice, are determined by parsing a bitstream. When the component identification information indicates that last significant coefficient location reverse is applied to the component of the current slice, a location of the last significant coefficient of the current block is obtained by performing calculation on the coordinate information of the last significant coefficient. Coefficients of the current block are determined by decoding all coefficients located above the location of the last significant coefficient in a preset scanning order.

Embodiments of the disclosure further provide an encoding method. Component identification information of a current slice, and a location of a last significant coefficient of a current block corresponding to a component of the current slice, are determined. Coordinate information of the last significant coefficient of the current block is determined according to the component identification information and the location of the last significant coefficient. All coefficients located above the location of the last significant coefficient are encoded in a preset scanning order. Bit information obtained through encoding, the component identification information, and the coordinate information of the last significant coefficient are signalled into a bitstream.

In this way, in a scenario of high bit-depth, high bit-rate, high quality, or lossless video encoding and decoding, a reasonable mode of deriving the last significant coefficient is set according to a law of distribution of significant coefficients, thereby reducing an overhead brought about by encoding in the bitstream, and improving compression efficiency. In addition, as significant coefficients of respective colour components may be different in the distribution law, it is possible to use respective component identification information for controlling a respective mode of deriving the last significant coefficient, for each colour component, i.e., separately controlling whether last significant coefficient location reverse technology is applied to each colour component, thereby further improving compression efficiency.

Embodiments of the disclosure are elaborated hereinafter with reference to the drawings.

Figure 8A:
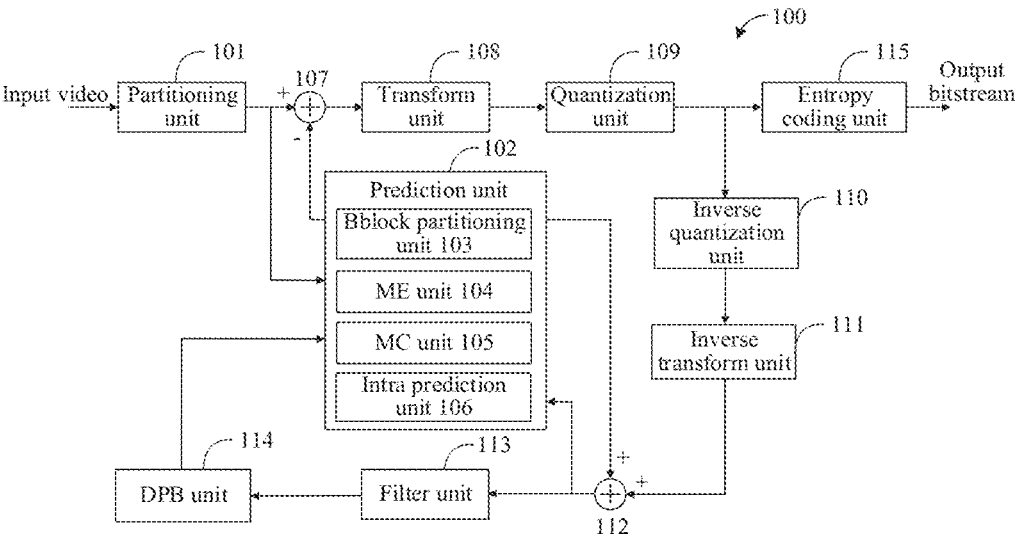
FIG. 8A is a diagram of system composition of an encoder according to embodiments of the disclosure.

FIG. 8A is an illustrative block diagram of system composition of an encoder according to embodiments of the disclosure. As shown in FIG. 8A, an encoder 100 may include a partitioning unit 101, a prediction unit 102, a first adder 107, a transform unit 108, a quantization unit 109, an inverse quantization unit 110, an inverse transform unit 111, a second adder 112, a filter unit 113, a decoded picture buffer (DPB) unit 114, and an entropy coding unit 115. Here, an input of the encoder 100 may be a video consisting of a series of pictures or a static picture. An output of the encoder 100 may be a stream of bits (also referred to as a bitstream) representing a compressed version of the input video.

The partitioning unit 101 may partition a picture of the input video into one or more coding tree units (CTUs). The partitioning unit 101 may divide the picture into one or more picture blocks (also referred to as tiles), and may further divide a tile into one or more bricks. Here, a tile or a brick may include one or more complete and/or partial CTUs. In addition, the partitioning unit 101 may form one or more slices. A slice may include one or more tiles in the picture arranged in a raster order, or one or more tiles covering a rectangular region in the picture. The partitioning unit 101 may further form one or more sub-pictures. A sub-picture may include one or more slices, tiles, or bricks.

In coding process by the encoder 100, the partitioning unit 101 may transmit a CTU to the prediction unit 102. In general, the prediction unit 102 may be composed of a block partitioning unit 103, a motion estimation (ME) unit 104, a motion compensation (MC) unit 105, and an intra prediction unit 106. Specifically, the block partitioning unit 103 further partitions the input CTU into smaller coding units (CUs) by iteratively using quadtree partitioning, binary tree partitioning, and ternary tree partitioning. The prediction unit 102 may obtain an inter prediction block of a CU using the ME unit 104 and the MC unit 105. The intra prediction unit 106 may obtain an intra prediction block of a CU using various intra prediction modes including a matrix weighted intra prediction (MIP) mode. In an example, a motion estimation mode based on rate distortion optimization (RDO) may be called by the ME unit 104 and the MC unit 105 to obtain an inter prediction block. A determination manner of a mode based on RDO may be called by the intra prediction unit 106 to obtain an intra prediction block.

The prediction unit 102 may output a prediction block of a CU. The first adder 107 may calculate a difference between a CU in the output of the partitioning unit 101 and a prediction block of the CU, i.e., residual CU. The transform unit 108 may read the residual CU and perform one or more transforms on the residual CU to obtain coefficients. The quantization unit 109 may quantize the coefficients and output the quantization coefficients (i.e., levels). The inverse quantization unit 110 may scale the quantization coefficients to output reconstructed coefficients. The inverse transform unit 111 may perform one or more inverse transforms corresponding to the one or more transforms in the transform unit 108 and output a reconstructed residual. The second adder 112 may calculate a reconstructed CU by adding the reconstructed residual and the prediction block of the CU from the prediction unit 102. The second adder 112 may further send an output of the second adder to the prediction unit 102 as a reference for intra prediction. After all the CUs in a picture or sub-picture have been reconstructed, the filtering unit 113 may perform in loop filtering on the reconstructed picture or sub-picture. Here, the filter unit 113 may include one or more filters such as a deblocking filter, a sample adaptive offset (SAO) filter, an adaptive loop filter (ALF), a luma mapping with chroma scaling (LMCS) filter, and a filter based on a neural network, and the like. Alternatively, when the filter unit 113 determines that a CU is not used as a reference for coding another CU, the filter unit 113 may perform in loop filtering on one or more target pixels in the CU.

An output of the filter unit 113 may be a decoded picture or sub-picture. The decoded picture or sub-picture may be cached in the DPB unit 114. The DPB unit 114 may output the decoded picture or sub-picture based on timing and control information. Here, a picture stored in the DPB unit 114 may further be used as a reference for inter prediction or intra prediction performed by the prediction unit 102. Finally, the entropy coding unit 115 may convert a parameter (such as a control parameter, supplemental information, etc.) required for decoding a picture from the encoder 100 into a binary form, and signal the binary form into the bitstream according to a syntax structure of each data unit. That is, the encoder 100 outputs a final bitstream.

Further, the encoder 100 may have a first processor and a first memory recording a computer program. When the first processor reads and runs the computer program, the encoder 100 may read an input video and generate a bitstream corresponding to the input video. In addition, the encoder 100 may further be a computing device having one or more chips. Units implemented as integrated circuits on a chip may have functions of connection and data exchange similar to that of respective units in FIG. 8A.

Figure 8B:
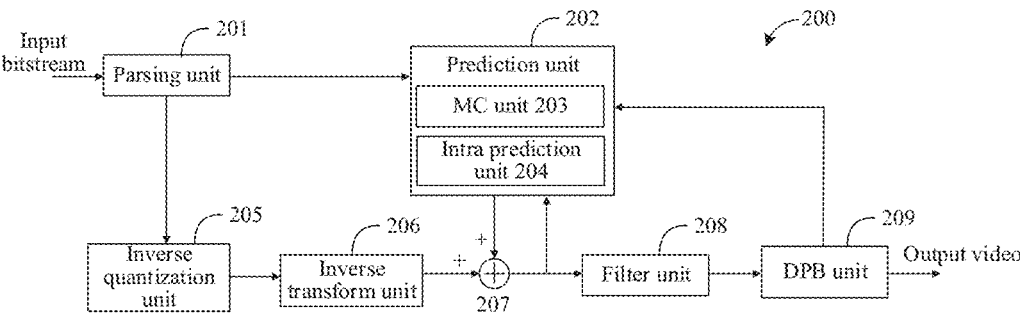
FIG. 8B is a diagram of system composition of a decoder according to embodiments of the disclosure.

FIG. 8B is an illustrative block diagram of system composition of a decoder according to embodiments of the disclosure. As shown in FIG. 8B, the decoder 200 may include a parsing unit 201, a prediction unit 202, an inverse quantization unit 205, an inverse transform unit 206, an adder 207, a filter unit 208, and a DPB unit 209. An input of the decoder 200 may be a bitstream representing a compressed version of a video or a static picture. An output of the decoder 200 may be a decoded video consisting of a series of pictures or a decoded static picture.

The input bitstream of the decoder 200 may be a bitstream generated by the encoder 100. The parsing unit 201 may parse the input bitstream and obtain a value of at least one syntax element from the input bitstream. The parsing unit 201 may convert a binary representation of the syntax element into a numerical value and send the numerical value to a unit in the decoder 200 to obtain one or more decoded pictures. The parsing unit 201 may further parse the input bitstream to obtain one or more syntax elements for displaying a decoded picture.

In decoding process by the decoder 200, the parsing unit 201 may send the value of the at least one syntax element and one or more variables to a unit in the decoder 200. The one or more variables may be set or determined according to the value of the at least one syntax element and configured to obtain one or more decoded pictures.

The prediction unit 202 may determine a prediction block of a current coding block (such as a CU). The prediction unit 202 may include an MC unit 203 and an intra prediction unit 204. Specifically, when it is indicated that an inter prediction mode is used to decode the current coding block, the prediction unit 202 may transmit relevant parameters sent by the parsing unit 201 to the MC unit 203 to obtain an inter prediction block. When it is indicated that an intra prediction mode (including an MIP mode indicated by an MIP mode index) is used to decode the current coding block, the prediction unit 202 may transmit the relevant parameters from the parsing unit 201 to the intra prediction unit 204 to obtain an intra prediction block.

The inverse quantization unit 205 may have a function same as that of the inverse quantization unit 110 in the encoder 100. The inverse quantization unit 205 may scale quantization coefficients (i.e., levels) from the parsing unit 201 to obtain reconstructed coefficients.

The inverse transform unit 206 may have a function same as that of the inverse transform unit 111 in the encoder 100. The inverse transform unit 206 may perform one or more transforms (i.e., the inverse operations of one or more transforms performed by the inverse transform unit 111 in the encoder 100) to obtain a reconstructed residual.

The adder 207 may add its inputs (i.e., the prediction block from the prediction unit 202 and the reconstructed residual from the inverse transform unit 206), to obtain a reconstructed block of the current coding block. The reconstructed block may further be sent to the prediction unit 202 as a reference for another block to be coded in an intra prediction mode.

After all the CUs in a picture or sub-picture have been reconstructed, the filter unit 208 may perform in loop filtering on the reconstructed picture or sub-picture. The filter unit 208 may include one or more filters such as a deblocking filter, an SAO filter, an ALF, an LMCS filter, and a filter based on a neural network, and the like. Alternatively, when the filter unit 208 determines that a reconstructed block is not used as a reference for decoding another block, the filter unit 208 may perform in loop filtering on one or more target pixels in the reconstructed block. Here, an output of the filter unit 208 may be a decoded picture or sub-picture. The decoded picture or sub-picture may be cached in the DPB unit 209. The DPB unit 209 may output the decoded picture or sub-picture according to timing and control information. A picture stored in the DPB unit 209 may further be used as a reference for inter prediction or intra prediction performed by the prediction unit 202.

Further, the decoder 200 may have a second processor and a second memory recording a computer program. When the second processor reads and runs the computer program, the decoder 200 may read an input bitstream and generate a decoded video corresponding to the input bitstream. In addition, the decoder 200 may further be a computing device having one or more chips. Unit implemented as integrated circuits on a chip may have functions of connection and data exchange similar to that of respective units in FIG. 8B.

Further note that when applying embodiments of the disclosure to the encoder 100, a current block specifically refers to a current block to be encoded in a video picture (or a coding block for short). When applying embodiments of the disclosure to the decoder 200, a current block specifically refers to a current block to be decoded in a video picture (or a coding block for short).

In an embodiment of the disclosure, FIG. 9 is a flowchart of a decoding method according to embodiments of the disclosure. As shown in FIG. 9, the method may include operations S901 to S903 as follows.

At an operation S901, component identification information of a current slice, and coordinate information of a last significant coefficient of a current block corresponding to a component of the current slice, are determined by parsing a bitstream.

Note that the decoding method according to embodiments of the disclosure may specifically refer to a method for decoding coefficient(s), which may be performed by a decoder. Based on the structure of the decoder 200 as shown in FIG. 8B, the decoding method is mainly performed by the parsing unit 201 in the decoder 200. The parsing unit 201 may obtain value(s) of related identification information (or syntax element(s)) by performing decoding using an adaptive binary arithmetic coding mode based on a context model or the bypass mode, thereby determining coefficients of the current block.

Further note that in general, coding in a video standard may include encoding and decoding. Therefore, video coding may include an encoding method performed at the encoder side and a decoding method performed at the decoder side. In embodiments of the disclosure, the decoding method performed at the decoder side is described.

In general, for example, for a conventional video, the method for decoding coefficient(s) of the conventional video is the same as the existing method in related art. However, in some cases, such as a scenario of high bit-depth, high quality, high bit-rate, or lossless compression video encoding and decoding, embodiments of the disclosure provide a method capable of modifying a derivation mode of the location of a last significant coefficient.

In embodiments of the disclosure, the component identification information of the current slice is a slice-level flag. The component identification information indicates whether last significant coefficient location reverse is applied to a component of the current slice. If last significant coefficient location reverse is applied to a component of the current slice, it means that last significant coefficient location reverse is applied to a current block corresponding to the component of the current slice. If last significant coefficient location reverse is not applied to the component of the current slice, it means that last significant coefficient location reverse is not applied to the current block corresponding to the component of the current slice.

Understandably, a current sequence may include the current slice, and the current slice may include the current block. In some embodiments, before determining the component identification information of the current slice by parsing the bitstream, the method may further include operations as follows.

First syntax element identification information is determined by parsing the bitstream.

The operation that the component identification information of the current slice is determined by parsing the bitstream is performed, when the first syntax element identification information indicates that last significant coefficient location reverse is enabled for the current sequence.

In embodiments of the disclosure, the method may further include an operation as follows. If a value of the first syntax element identification information is a first value, it is determined that the first syntax element identification information indicates that last significant coefficient location reverse is enabled for the current sequence. Alternatively, if the value of the first syntax element identification information is a second value, it is determined that the first syntax element identification information indicates that last significant coefficient location reverse is disabled for the current sequence.

Note that the first value is different from the second value. The first value and the second value may be parametric or may be numerical. Specifically, the first syntax element identification information may be a parameter signalled in a profile, or may be a value of a flag, which is not limited in any way in embodiments of the disclosure.

For example, the first syntax element identification information is a flag. In this case, the first value may be set to be 1, and the second value may be set to be 0. Alternatively, the first value may be set to be true, and the second value may be set to be false. Alternatively, the first value may be set to be 0, and the second value may be set to be 1. Alternatively, the first value may be set to be false, and the second value may be set to be true. Illustratively, for a flag, in general, the first value may be 1, and the second value may be 0, which however is not limited in any way.

Further note that the first syntax element identification information may be a sequence-level flag, denoted by sps__reverse_last_sig_coeff_flag for indicating whether last significant coefficient location reverse is enabled for the current sequence. In this way, when it is obtained, through decoding, that last significant coefficient location reverse is enabled for the current sequence, slice-level component identification information may further be decoded, so as to determine whether last significant coefficient location reverse is applied to a component of the current slice.

Further, before obtaining the first syntax element identification information through decoding, in a possible embodiment, the method may further include operations as follows.

Second syntax element identification information is determined by parsing the bitstream.

The operation that the first syntax element identification information is determined by parsing the bitstream is performed, when the second syntax element identification information indicates that a standard extension release is applied to the current sequence.

Before obtaining the first syntax element identification information through decoding, in another possible embodiment, the method may further include operations as follows.

Third syntax element identification information is determined by parsing the bitstream.

The operation that the first syntax element identification information is determined by parsing the bitstream is performed, when the third syntax element identification information indicates that range extension is applied to the current sequence.

Before obtaining the first syntax element identification information through decoding, in yet another possible embodiment, the method may further include operations as follows.

Second syntax element identification information is determined by parsing the bitstream.

Third syntax element identification information is determined by parsing the bitstream, when the second syntax element identification information indicates that a standard extension release is applied to the current sequence.

The operation that the first syntax element identification information is determined by parsing the bitstream is performed, when the third syntax element identification information indicates that range extension is applied to the current sequence.

Note that the second syntax element identification information and the third syntax element identification information both are sequence-level flags. The second syntax element identification information is denoted by sps_extension_flag for indicating whether the standard extension release is applied to the current sequence. The third syntax element identification information is denoted by sps_range_extension_flag for indicating whether range extension is applied to the current sequence.

That is to say, before obtaining the first syntax element identification information (sps_reverse_last_sig_coeff_flag) through decoding, the following operations may be performed. sps_extension_flag is obtained by parsing the bitstream; and sps_reverse_last_sig_coeff_flag is obtained through decoding, if sps_extension_flag indicates that the standard extension release is applied to the current sequence. Alternatively, sps_range_extension_flag is obtained by parsing the bitstream; and sps_reverse_last_sig_coeff_flag is obtained through decoding, if sps_range_extension_flag indicates that range extension is applied to the current sequence. Alternatively, sps_extension_flag is obtained by parsing the bitstream; sps_range_extension_flag is obtained by parsing the bitstream if sps_extension_flag indicates that the standard extension release is applied to the current sequence; and sps_reverse_last_sig_coeff_flag is obtained through decoding, if sps_range_extension_flag indicates that range extension is applied to the current sequence. However, these are not limited in any way in embodiments of the disclosure.

Further, in some embodiments, the method may further include an operation as follows. If a value of the second syntax element identification information is a first value, it is determined that the second syntax element identification information indicates that the standard extension release is applied to the current sequence. Alternatively, if the value of the second syntax element identification information is a second value, it is determined that the second syntax element identification information indicates that the standard extension release is not applied to the current sequence.

Further, in some embodiments, the method may further include an operation as follows. If a value of the third syntax element identification information is a first value, it is determined that the third syntax element identification information indicates that range extension is applied to the current sequence. Alternatively, if the value of the third syntax element identification information is a second value, it is determined that the third syntax element identification information indicates that range extension is not applied to the current sequence.

Note that the first value is different from the second value. The first value and the second value may be in parametric form or may be in numerical form. In a specific example, the first value may be set to be 1, and the second value may be set to be 0, which however is not limited in any way.

Further note that the second syntax element identification information is denoted by sps_extension_flag. The third syntax element identification information is denoted by sps_range_extension_flag. Accordingly, at the sequence level, if sps_extension_flag has the value of 1, i.e., the standard extension release is applied to the current sequence, then sps_range_extension_flag needs to be decoded. If sps_range_extension_flag has the value of 1, i.e., range extension is applied to the current sequence, then sps_re-verse_last_sig_coeff_flag needs to be decoded. If sps_re-verse_last_sig_coeff_flag has the value of 1, i.e., last sig-nificant coefficient location reverse is enabled for the current sequence, slice-level component identification information needs to be further decoded, so as to determine whether last significant coefficient location reverse is applied to a com-ponent of the current slice.

In some embodiments, the range extension is applied to the current sequence, which may include that the current sequence is of at least one of a high bit depth, high quality, a high bit rate, a high frame rate, or lossless compression.

That is to say, compared with a conventional video, a video according to embodiments of the disclosure has char-acteristics of a high bit depth, high quality, a high bit rate, a high frame rate, lossless compression, and/or the like.

Further, the first syntax element identification informa-tion, the second syntax element identification information, the third syntax element identification information, and the like may be sequence-level flags, or even higher-level flags, such as video usability information (VUI), supplemental enhancement information (SEI), and the like.

In a specific example, for the current sequence of the video, it is determined whether the standard extension release is applied to the current sequence using the second syntax element identification information (sps_extension-_flag). In other words, it is determined whether the current sequence may be opened in an extension release of the standard, such as an extension release in VVC formulated for coding with high bit-depth and high bit-rate and the like. When sps_extension_flag has the value of 1, the first syntax element identification information (sps_reverse_last_sig-_coeff_flag) needs to be decoded. Otherwise, the first syntax element identification information (sps_reverse_last_sig-_coeff_flag) does not need to be decoded.

In another specific example, for the current sequence of the video, when sps_extension_flag has the value of 1, the third syntax element identification information (sps_range-_extension_flag) for determining whether range extension is applied to the current sequence, such as flag(s) of a high bit depth, a high bit rate, a high frame rate, lossless compres-sion, and/or the like, needs to be further decoded. For example, four cases are described respectively hereinafter.

In a possible implementation, when the third syntax element identification information is high bit-depth identi-fication information, the method may further include an operation as follows. If the high bit-depth identification information indicates that the current sequence is of a high bit depth, it is determined that range extension is applied to the current sequence.

In another possible implementation, when the third syntax element identification information is high bit-rate identifi-cation information, the method may further include an operation as follows. If the high bit-rate identification infor-mation indicates that the current sequence is of a high bit rate, it is determined that range extension is applied to the current sequence.

In yet another possible implementation, when the third syntax element identification information is high quality identification information, the method may further include an operation as follows. If the high quality identification information indicates that the current sequence is of high quality, it is determined that range extension is applied to the current sequence.

In yet another possible implementation, when the third syntax element identification information is lossless com-pression identification information, the method may further include an operation as follows. If the lossless compression identification information indicates that the current sequence is of lossless compression (i.e., is compressed losslessly), it is determined that range extension is applied to the current sequence.

Illustratively, taking the sequence level as an example, the third syntax element identification information may further be high bit-depth identification information (denoted by sps_high_bit_depth_flag) for indicating whether the current sequence is a high bit-depth sequence; or alternatively may be high bit-rate identification information (denoted by sps_high_bit_rate_flag) for indicating whether the current sequence is a high bit-rate sequence; or alternatively may be another identification information for indicating a high bit depth, a high bit rate, high quality, or lossless compression, which is not limited in any way in embodiments of the disclosure.

Further, in some embodiments, in the operation S901, the operation that the coordinate information of the last signifi-cant coefficient of the current block corresponding to the component of the current slice is determined by parsing the bitstream, may include operations as follows.

Prefix information of a horizontal coordinate of the last significant coefficient of the current block, prefix informa-tion of a vertical coordinate of the last significant coefficient, suffix information of the horizontal coordinate of the last significant coefficient, and suffix information of the vertical coordinate of the last significant coefficient are obtained by parsing the bitstream.

The horizontal coordinate of the last significant coefficient is determined according to the prefix information of the horizontal coordinate of the last significant coefficient and the suffix information of the horizontal coordinate of the last significant coefficient.

The vertical coordinate of the last significant coefficient is determined according to the prefix information of the vertical coordinate of the last significant coefficient and the suffix information of the vertical coordinate of the last significant coefficient.

The coordinate information of the last significant coefficient of the current block may be determined according to the horizontal coordinate of the last significant coefficient and the vertical coordinate of the last significant coefficient.

Note that the prefix information of the horizontal coordinate of the last significant coefficient may be denoted by last_sig_coeff_x_prefix, i.e., specifying the prefix of the horizontal coordinate (or column position) of the last significant coefficient in the preset scanning order within the current block. The prefix information of the vertical coordinate of the last significant coefficient may be denoted by last_sig_coeff_y_prefix, i.e., specifying the prefix of the vertical coordinate (or row position) of the last significant coefficient in the preset scanning order within the current block. The suffix information of the horizontal coordinate of the last significant coefficient may be denoted by last_sig_coeff_x_suffix, i.e., specifying the suffix of the horizontal coordinate (or column position) of the last significant coefficient in the preset scanning order within the current block. The suffix information of the vertical coordinate of the last significant coefficient may be denoted by last_sig_coeff_y_suffix, i.e., specifying the suffix of the vertical coordinate (or row position) of the last significant coefficient in the preset scanning order within the current block. That is to say, the coordinate information of the last significant coefficient may be determined based on last_sig_coeff_x_prefix, last_sig_coeff_x_suffix, last_sig_coeff_y_prefix, and last_sig_coeff_y_suffix.

Further note that last_sig_coeff_x_prefix and last_sig_coeff_x_suffix may determine the abscissa (i.e., horizontal coordinate) of the last significant coefficient. last_sig_coeff_y_prefix and last_sig_coeffy_suffix may determine the ordinate (i.e., vertical coordinate) of the last significant coefficient, thus obtaining the coordinate information of the last significant coefficient.

In embodiments of the disclosure, last significant coefficient location reverse identification information may be denoted by reverse_last_sig_coeff_flag. The last significant coefficient location reverse identification information may be at least one of sequence-level identification information, picture-level identification information, slice-level identification information, or block-level identification information; or even higher-level (such as VUI, SEI, etc.) identification information, which is not limited in any way here.

That is to say, reverse_last_sig_coeff_flag may be a sequence-level flag or a higher-level flag, or may be a picture-level flag or a slice-level flag or a block-level flag or a flag of another level. In addition, a block-level flag may include an LCU-level flag or a CTU-level flag or a CU-level flag, or another block-level flag, which is not limited in any way in embodiments of the disclosure.

In embodiments of the disclosure, sequence-level last significant coefficient location reverse identification information may be denoted by sps_reverse_last_sig_coeff_flag. Slice-level last significant coefficient location reverse identification information may be denoted by sh_reverse_last_sig_coeff_flag.

Further note that the slice-level last significant coefficient location reverse identification information may further be referred to as the component identification information of the current slice. In some embodiments, the method may further include an operation as follows.

When a value of the component identification information is a first value, it is determined that the component identification information indicates that last significant coefficient location reverse is applied to the component of the current slice.

Alternatively, when the value of the component identification information is a second value, it is determined that the component identification information indicates that last significant coefficient location reverse is not applied to the component of the current slice.

Note that the first value and the second value may differ. The first value and the second value may be parametric or may be numerical. In a specific example, the first value may be set to be 1, and the second value may be set to be 0, which however is not limited in any way.

Take the first value being 1 and the second value being 0 as an example. If it is obtained through decoding that the value of the component identification information is 1, it may be determined that the component identification information indicates that last significant coefficient location reverse is applied to the component of the current slice. If it is obtained through decoding that the value of the component identification information is 0, it may be determined that the component identification information indicates that no last significant coefficient location reverse is applied to the component of the current slice.

At an operation S902, in response to the component identification information indicates that last significant coefficient location reverse is applied to the component of the current slice, a location of the last significant coefficient of the current block is obtained by performing calculation on the coordinate information of the last significant coefficient.

At an operation S903, coefficients of the current block are determined by decoding all coefficients located above the location of the last significant coefficient in a preset scanning order.

Note that in embodiments of the disclosure, when the component identification information indicates that last significant coefficient location reverse is applied to the component of the current slice, it means that last significant coefficient location reverse is also applied to the current block corresponding to the component of the current slice. In this case, the coordinate information of the last significant coefficient of the current block may be determined to be a horizontal distance and a vertical distance between the location of the last significant coefficient and a bottom right corner of the current block.

In some embodiments, the operation that the location of the last significant coefficient of the current block is obtained by performing calculation on the coordinate information of the last significant coefficient may include operations as follows.

A width and a height of the current block are determined.

A horizontal coordinate of the last significant coefficient is obtained by subtracting the horizontal distance between the location of the last significant coefficient and the bottom right corner of the current block from the width of the current block.

A vertical coordinate of the last significant coefficient is obtained by subtracting the vertical distance between the location of the last significant coefficient and the bottom right corner of the current block from the height of the current block.

The location of the last significant coefficient of the current block is determined according to the horizontal coordinate of the last significant coefficient and the vertical coordinate of the last significant coefficient.

Note that the coordinate information of the last significant coefficient in general is the horizontal distance and the vertical distance between the location of the last significant coefficient and a top left corner of the current block. For a conventional video, most of significant coefficients are concentrated in the top left corner, and coefficients in a large region at the bottom right corner are 0. However, for high bit-depth, high quality, high bit-rate video encoding and decoding, a lot of significant coefficients may also appear in the bottom right corner, such that the coordinate information of the last significant coefficient has a large value. In this case, in order to save overhead, coordinate transform (specifically coordinate reverse, where after the coordinate reverse, the coordinate information of the last significant coefficient is the horizontal distance and the vertical distance between the location of the last significant coefficient and the bottom right corner of the current block) is to be performed in coefficient encoding. Accordingly, in coefficient decoding, coordinate reverse is also to be performed. After coordinate reverse is performed again, the coordinate information of the last significant coefficient may be recovered to be the horizontal distance and the vertical distance between the location of the last significant coefficient and the top left corner of the current block, thereby determining the location of the last significant coefficient, so as to code all the coefficients located above the location of the last significant coefficient in the current block in the preset scanning order.

Further note that a current block corresponding to the component of the current slice may be a block on which no zero-out transform has been performed, or a block on which zero-out transform has been performed. Taking a block on which zero-out transform has been performed as an example, in this case, the width of the current block may be $1<<\log 2ZoTbWidth$, and the height of the current block may be $1<<\log 2ZoTbHeight$. Then in case that the component identification information indicates that last significant coefficient location reverse is applied to the component of the current slice, $$LastSignificantCoeffX = (1<<\log2ZoTbWidth) - 1 - LastSignificantCoeffX;$$

$$LastSignificantCoeffY = (1<<\log2ZoTbWidth) - 1 - LastSignificantCoeffY.$$

Herein, (LastSignificantCoeffX, LastSignificantCoeffY) at the right side of the formula may denote the coordinate information of the last significant coefficient obtained through decoding. (LastSignificantCoeffX, LastSignificantCoeffY) at the left side of the formula may denote the location of the last significant coefficient (which may also be deemed as target coordinate information of the last significant coefficient).

Further, in some embodiments, the method may further include operations as follows.

When the component identification information indicates that last significant coefficient location reverse is not applied to the component of the current slice, the coordinate information of the last significant coefficient of the current block is determined to be a horizontal distance and a vertical distance between the location of the last significant coefficient and a top left corner of the current block.

The location of the last significant coefficient of the current block is determined according to the horizontal distance and the vertical distance between the location of the last significant coefficient and the top left corner of the current block.

Note that if the component identification information indicates that last significant coefficient location reverse is not applied to the component of the current slice, it means that last significant coefficient location reverse is not applied to the current block corresponding to the component of the current slice, either. In this case, the coordinate information of the last significant coefficient obtained through decoding may be deemed as target coordinate information of the last significant coefficient. In embodiments of the disclosure, the target coordinate information of the last significant coefficient is the horizontal distance and the vertical distance between the location of the last significant coefficient and the top left corner of the current block.

Further, in some embodiments, the method may further include operations as follows.

When the component identification information indicates that last significant coefficient location reverse is not applied to the component of the current slice, the location of the last significant coefficient of the current block is determined directly according to the coordinate information of the last significant coefficient.

The coefficients of the current block are determined by decoding all coefficients located above the location of the last significant coefficient in the preset scanning order.

Note that the preset scanning order may be a diagonal scanning order, zigzag scanning order, horizontal scanning order, vertical scanning order, 4 g order scan a scanning order, etc., which is not limited in any way in embodiments of the disclosure.

Further note that after the component identification information of the current slice has been obtained, if the component identification information of the current slice has the value of 1, i.e., last significant coefficient location reverse is applied to the component of the current slice, then for the current block corresponding to the component of the current slice, after the coordinate information of the last significant coefficient has been obtained through decoding, the location of the last significant coefficient of the current block is determined by performing calculation on the coordinate information of the last significant coefficient. Then, the coefficients of the current block are obtained by decoding all coefficients above the location of the last significant coefficient in the preset scanning order. If the component identification information of the current slice has the value of 0, i.e., no last significant coefficient location reverse is applied to the component of the current slice, then for the current block corresponding to the component of the current slice, after the coordinate information of the last significant coefficient has been obtained through decoding, the location of the last significant coefficient of the current block may be determined directly according to the coordinate information of the last significant coefficient. Then, the coefficients of the current block are obtained by decoding all coefficients above the location of the last significant coefficient in the preset scanning order.

Figure 10A:
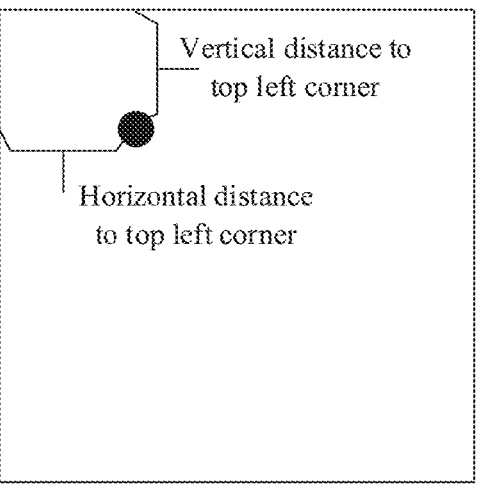
FIG. 10A is a diagram of a location of a last significant coefficient with respect to a top left corner of a current block according to embodiments of the disclosure.
Figure 10B:
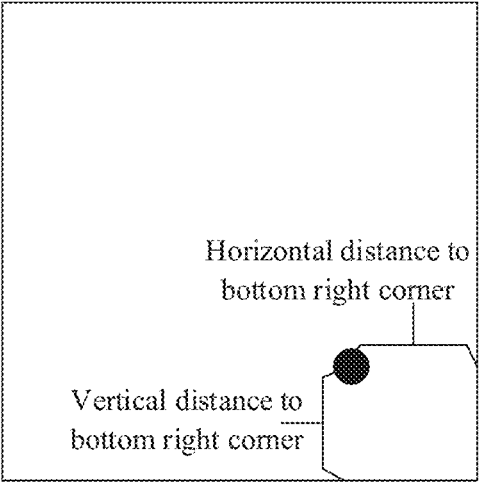
FIG. 10B is a diagram of a location of a last significant coefficient with respect to a lower right corner of a current block according to embodiments of the disclosure.

In this way, in some cases, such as high bit-depth, high quality, high bit-rate, or lossless compression video encoding and decoding, in coefficient coding, embodiments of the disclosure provide a method for modifying a derivation mode of the location of the last significant coefficient. That is to say, in general, a method for coefficient encoding and decoding is still the same as an existing method in related art. In general, last_sig_coeff_x_prefix and last_sig_coeff_x_suffix may be configured to encode the abscissa of the location of the last significant coefficient, i.e., the horizontal distance to the top left corner of the current block; and last_sig_coeff_y_prefix and last_sig_coeff_y_suffix may be configured to encode the ordinate of the location of the last significant coefficient, i.e., the vertical distance to the top left corner of the current block, as shown in FIG. 10A. In high bit-depth, high quality, high bit-rate, or lossless compression video encoding and decoding, the location of the last significant coefficient is generally close to the bottom right corner of a region including all possible nonzero coefficients in the current block. In this case, last_sig_coeff_x_prefix and last_sig_coeff_x_suffix may be configured to encode the horizontal distance between the location of the last significant coefficient and the bottom right corner of the region that includes all possible nonzero coefficients in the current block, and last_sig_coeff_y_prefix and last_sig_coeff_y_suffix may be configured to encode the vertical distance between the location of the last significant coefficient and the bottom right corner of the region that includes all possible nonzero coefficients in the current block, as shown in FIG. 10B. For example, if the region including all possible nonzero coefficients in the current block is a rectangular region defined by (0, 0) and ((1<<log 2ZoTbWidth)−1, (1<<log 2ZoTbHeight)−1), last_sig_coeff_x_prefix and last_ sig_coeff_x_suffix may be configured to encode the horizontal distance between the location of the last significant coefficient and ((1<<log 2ZoTbWidth)−1, (1<<log 2ZoTbHeight)−1) of the current block, and last_sig_coeff_y_prefix and last_sig_coeff_y_suffix may be configured to encode the vertical distance between the location of the last significant coefficient and ((1<<log 2ZoTbWidth)−1, (1 log 2ZoTbHeight)−1) of the current block.

The semantics modification is as follows.

The horizontal coordinate (or column position) LastSignificantCoeffX of the last significant coefficient in the preset scanning order within the current block may be derived as follows.

If last_sig_coeff_x_suffix is not present, the following applies:

LastSignificantCoeffX=last_sig_coeff_x_prefix.

Otherwise (last_sig_coeff_x_suffix is present), the following applies:

$$LastSignificantCoeffX = (1 \ll ((\text{last\_sig\_coeff\_x\_prefix} \gg 1) - 1)) *$$
$$(2 + (\text{last\_sig\_coeff\_x\_prefix} \& 1)) + \text{last\_sig\_coeff\_x\_suffix}.$$

If reverse_last_sig_coeff_flag is equal to 1, the following applies:

$$LastSignificantCoeffX = (1 \ll \text{log2ZoTbWidth}) - 1 - LastSignificantCoeffX.$$

The vertical coordinate (or row position) LastSignificantCoeffY of the last significant coefficient in the scanning order within the current block may be derived as follows.

If last_sig_coeff_y_suffix is not present, the following applies:

LastSignificantCoeffY=last_sig_coeff_y_prefix.

Otherwise (last_sig_coeff_y_suffix is present):

$$LastSignificantCoeffY = (1 \ll ((\text{last\_sig\_coeff\_y\_prefix} \gg 1) - 1)) *$$
$$(2 + (\text{last\_sig\_coeff\_y\_prefix} \& 1)) + \text{last\_sig\_coeff\_y\_suffix}.$$

If reverse_last_sig_coeff_flag is equal to 1, the following applies:

$$LastSignificantCoeffY = (1 \ll \text{log2ZoTbHeight}) - 1 - LastSignificantCoeffY.$$

Herein, reverse_last_sig_coeff_flag is a last significant coefficient location reverse flag, indicating whether the location of the last significant coefficient is to be reversed. If reverse_last_sig_coeff_flag has the value of 1, it indicates that the location of the last significant coefficient is to be reversed. Otherwise, the flag indicates that the location of the last significant coefficient is not to be reversed.

Further note that reverse_last_sig_coeff_flag may be a sequence-level flag or a higher-level flag, or may be a picture-level flag or a slice-level flag or a block-level flag, or a flag of another level. A block-level flag may include an LCU-level flag or a CTU-level flag or a CU-level flag, or another block-level flag. Illustratively, a sequence-level reverse_last_sig_coeff_flag may be denoted by sps_reverse_last_sig_coeff_flag, and a slice-level reverse_last_sig_coeff_flag may be denoted by sh_reverse_last_sig_coeff_flag.

In addition, reverse_last_sig_coeff_flag may depend on some other flags, such as the high bit-depth identification information, the high bit-rate identification information, or the second syntax element identification information (sequence parameter set, SPS, extension flag sps_extension_flag), or the like. The SPS extension flag may be opened in the extension release of the standard, such as an extension release in VVC formulated for high bit-depth coding and high bit-rate coding. That is, reverse_last_sig_coeff_flag is to be decoded when the high bit-depth identification information or the high bit-rate identification information has the value of 1. Otherwise, no reverse_last_sig_coeff_flag is to be decoded.

In a specific example, assuming that sequence-level identification information sps_extension_flag, sps_range_extension_flag, and sps_reverse_last_sig_coeff_flag exist. At the sequence level, if sps_extension_flag has the value of 1, sps_range_extension_flag is to be decoded. If sps_range_extension_flag has the value of 1, sps_reverse_last_sig_coeff_flag is to be decoded. Herein, sps_reverse_last_sig_coeff_flag is a last significant coefficient location reverse flag for the current sequence. If sps_reverse_last_sig_coeff_flag has the value of 1, it is determined that last significant coefficient location reverse is applied to a block in the current sequence. Otherwise (i.e., if sps_reverse_last_sig_coeff_flag has the value of 0), it is determined that last significant coefficient location reverse is not applied to the block in the current sequence. reverse_last_sig_coeff_flag in an existing syntax table is modified to be sps_reverse_last_sig_coeff_flag.

Understandably, sps_extension_flag may indicate whether the extension release of the standard is applied to the current sequence. sps_range_extension_flag may indicate whether range extension (such as a high bit depth, a high bit rate, etc.) is applied to the current sequence.

In an implementation, a table of syntax elements is modified as follows (Sequence parameter set raw byte sequence payload, RBSP, syntax), as shown in Table 3.

TABLE 3

| | Descriptor |
|---|---|
| ...... | |
| sps_extension_flag | u(1) |
| ...... | |
| if( sps_extension_flag) { | |
| sps_range_extension_flag | u(1) |
| ...... | |
| if( sps_range_extension_flag) | |
| sps_range_extension() | |
| } | |
| ...... | |

In another implementation, the table of syntax elements is modified as follows (Sequence parameter set range extension syntax), as shown in Table 4.

TABLE 4

| | Descriptor |
|---|---|
| sps_range_extension() { | |
| ...... | |
| sps_reverse_last_sig_coeff_flag | u(1) |
| ...... | |
| } | |

Based on syntax elements in Table 3 and Table 4, when the value of sps_extension_flag is equal to 1, it means that syntax elements sps_range_extension_flag and sps_extension_7 bits are present in an SPS RBSP syntax structure; and when the value of sps_extension_flag is equal to 0, it means that these syntax elements are not present in the SPS RBSP syntax structure.

Herein, if the value of sps_range_extension_flag is equal to 1, it means that the syntax structure sps_range_extension ( ) is present in the SPS RBSP syntax structure. If sps_range_ extension_flag is not present, it is determined that the value of sps_range_extension_flag is equal to 0.

If the value of sps_reverse_last_sig_coeff_flag is equal to 1, it means that last significant coefficient location reverse is applied to a block in the current sequence. Otherwise (i.e., if the value of sps_reverse_last_sig_coeff_flag is equal to 0), it means that last significant coefficient location reverse is not applied to the block in the current sequence.

In another specific example, assuming that sequence-level identification information sps_extension_flag, sps_range_ extension_flag, and sps_reverse_last_sig_coeff_enabled_ flag exist. At the sequence level, if sps_extension_flag has the value of 1, sps_range_extension_flag is to be decoded. If sps_range_extension_flag has the value of 1, sps_reverse_ last_sig_coeff_enabled_flag is to be decoded. Herein, sps_ reverse_last_sig_coeff_enabled_flag is a last significant coefficient location reverse (technology) enabled flag for the current sequence. If sps_reverse_last_sig_coeff_enabled_ flag has the value of 1, it means that last significant coefficient location reverse is enabled for a block in the current sequence. Otherwise (i.e., if sps_reverse_last_sig_coeff_enabled_flag has the value of 0), it means that last significant coefficient location reverse is disabled for the block in the current sequence. If sps_reverse_last_sig_coeff_enabled_ flag is not present, it is determined that sps_reverse_last_ sig_coeff_enabled_flag has the value of 0. At the slice level, if sps_reverse_last_sig_coeff_enabled_flag has the value of 1, sh_reverse_last_sig_coeff_flag is to be decoded. Herein, sh_reverse_last_sig_coeff_flag is a last significant coefficient location reverse flag for the current slice. If sh_reverse_last_sig_coeff_flag has the value of 1, it means that last significant coefficient location reverse is applied to a block in the current slice. Otherwise (i.e., if sh_reverse_last_sig_coeff_flag has the value of 0), it means that last significant coefficient location reverse is not applied to the block in the current slice. If sh_reverse_last_sig_coeff_flag is not present, it is determined that sh_reverse_last_ sig_coeff_flag has the value of 0. reverse_last_sig_coeff_ flag in an existing syntax table is modified to be sh_reverse_ last_sig_coeff_flag.

Note that at the sequence level, a last significant coefficient location reverse flag may mean "whether the use (of . . . ) is enabled/allowed". At the slice level, a last significant coefficient location reverse flag may mean "determining whether . . . is applied/used".

In yet another implementation, the table of syntax elements is modified as follows (Slice header syntax), as shown in Table 5.

TABLE 5

| | Descriptor |
|---|---|
| ... | |
| if(sps_reverse_last_sig_coeff_enabled_flag) | |
| sh_reverse_last_sig_coeff_flag | u(1) |
| ... | |

Based on the syntax element in Table 5, if the value of sps_reverse_last_sig_coeff_enabled_flag is equal to 1, it means that last significant coefficient location reverse is enabled for a block in the current sequence. Otherwise (i.e., if the value of sps_reverse_last_sig_coeff_enabled_flag is equal to 0), it means that last significant coefficient location reverse is disabled for the block in the current sequence.

If the value of sh_reverse_last_sig_coeff_flag is equal to 1, it means that last significant coefficient location reverse is applied to a block in the current slice. Otherwise (i.e., if the value of sh_reverse_last_sig_coeff_flag is equal to 0), it means that last significant coefficient location reverse is not applied to the block in the current slice. If sh_reverse_last_ sig_coeff_flag is not present, it is determined that the value of sh_reverse_last_sig_coeff_flag is equal to 0.

Understandably, for each of colour components of the current slice, the component identification information (i.e., sh_reverse_last_sig_coeff_flag) of the current slice may allow for separate control over whether last significant coefficient location reverse is applied to the colour component.

In embodiments of the disclosure, the component may include a first colour component, a second colour component, and a third colour component.

In a specific example, the first colour component is a luma component. The second colour component is a first chroma component. The third colour component is a second chroma component. The luma component may be denoted by Y The first chroma component may be denoted by U(Cb). The second chroma component may be denoted by V(Cr).

In another specific example, the first colour component is a red component, the second colour component is a green component, and the third colour component is a blue component. The red component may be denoted by R. The green component may be denoted by G. The blue component may be denoted by B.

Further, in some embodiments, when the component includes a first colour component, a second colour component, and a third colour component, the method may further includes operations as follows.

It is determined whether the first colour component, the second colour component, and the third colour component of the current slice share component identification information based on a relation between properties of the first colour component, the second colour component, and the third colour component.

The number of pieces of component identification information of the current slice is determined according to a determination result. Herein, the number of pieces of component identification information is 1, 2, or 3.

Specifically, the operation that the number of pieces of component identification information is determined, may include an operation as follows.

The number of pieces of component identification information of the current slice is determined to be 1 if one piece of component identification information is shared by the first colour component, the second colour component, and the third colour component of the current slice.

Alternatively, the number of pieces of component identification information of the current slice is determined to be 2 if one piece of component identification information is shared by two of the first colour component, the second colour component, and the third colour component of the current slice.

Alternatively, the number of pieces of component identification information of the current slice is determined to be 3 if each of the first colour component, the second colour component, and the third colour component of the current slice has a separate piece of component identification information.

In embodiments of the disclosure, on one hand, the properties of respective colour components may differ. For example, the colour components are R, G, B of a video of an RGB format, or Y, U, V (Y, Cb, Cr) of a video of a YUV format, or colour components of a video of another possible format. A YUV format may be a format such as YUV444, YUV422, YUV420. Human eye is more sensitive to a change in luma than to a change in chroma. Therefore, sometimes downsampling may be performed on the chroma using a format such as YUV422, YUV420, and/or the like, and in general a quantization step for chroma may be greater than that for luma, lowering the bit rate.

On the other hand, with some cross-component coding techniques, coding efficiency is increased using correlation among components. For example, with a cross-component linear model (CCLM) in cross-component prediction, a chroma component is predicted using a reconstructed luma component and the linear model. With the CCLM, accuracy in chroma component prediction may be improved, thereby reducing the residual of the chroma component. In addition, with some other techniques, information on the luma component and one chroma component is further used to predict another component, thereby further improving compression efficiency. In the in loop filter with the cross-component adaptive loop filter (CCALF), a chroma component is supplemented with some detail from the luma component to improve compression efficiency. The detail of a chroma component may be supplemented with the luma component, allowing a greater distortion in residual coding.

Accordingly, as the properties of respective colour components differ and some cross-component techniques are used, the respective colour components may not always be consistent in residual distribution. For example, in video encoding and decoding with a very high bit rate and a very high quality requirement, significant coefficients of different components may be similar in distribution, such as are all close to the bottom right corner of the region including possible significant coefficients (i.e., nonzero coefficients). However, in some video encoding and decoding with a bit rate that is not particularly high and a quality requirement that is not particularly high, significant coefficients of different components may be different in distribution. For example, significant coefficients of the Y component are all close to the bottom right corner of the region including possible significant coefficients, and significant coefficients of the U/V component are distributed in just the top left corner. Alternatively, significant coefficients of the U component are also close to the bottom right corner, and significant coefficients of the V component are distributed in just the top left corner.

Therefore, in embodiments of the disclosure, one or more pieces of component identification information may be configured to control application of embodiments of the disclosure to different colour components. Illustratively, one piece of component identification information may be configured to control whether the method according to embodiments of the disclosure is applied to the three colour components. For example, one component identification/flag may control whether the method according to embodiments of the disclosure is applied to the three colour components. Alternatively, two pieces of component identification information may be configured to control whether the method according to embodiments of the disclosure is applied to the three colour components. For example, one component identification/flag may control application to the luma component, and the other component identification/flag may control application to the two chroma components. Alternatively, three pieces of component identification information may be configured to control whether the method according to embodiments of the disclosure is applied to each of the three colour components. For example, the three colour components are R, G, and B in the RGB format; or Y, Cb, and Cr (or Y, U, and V) in the YUV format.

In a possible implementation, when the number of pieces of component identification information is 1, the operation that the component identification information of the current slice is determined by parsing the bitstream may include that first component identification information of the current slice is determined by parsing the bitstream.

Accordingly, the method may further include an operation as follows. If a value of the first component identification information is a first value, it is determined that last significant coefficient location reverse is applied to each of the first colour component, the second colour component, and the third colour component of the current slice. Alternatively, if the value of the first component identification information is a second value, it is determined that last significant coefficient location reverse is not applied to any of the first colour component, the second colour component, and the third colour component of the current slice.

In another possible implementation, when the number of pieces of component identification information is 2, the operation that the component identification information of the current slice is determined by parsing the bitstream may include that second component identification information and third component identification information of the current slice are determined by parsing the bitstream.

Accordingly, the method may further include an operation as follows. If a value of the second component identification information is a first value, it is determined that last significant coefficient location reverse is applied to each of two colour components of the first colour component, the second colour component, and the third colour component of the current slice. Alternatively, if the value of the second component identification information is a second value, it is determined that last significant coefficient location reverse is not applied to either of the two colour components of the first colour component, the second colour component, and the third colour component of the current slice.

If a value of the third component identification information is the first value, it is determined that last significant coefficient location reverse is applied to another colour component (i.e., the remaining colour component) of the first colour component, the second colour component, and the third colour component of the current slice other than the two colour components. Alternatively, if the value of the third component identification information is the second value, it is determined that last significant coefficient location reverse is not applied to the another colour component of the first colour component, the second colour component, and the third colour component of the current slice other than the two colour components.

In yet another possible implementation, when the number of pieces of component identification information is 3, the operation that the component identification information of the current slice is determined by parsing the bitstream may include that fourth component identification information, fifth component identification information, and sixth component identification information of the current slice are determined by parsing the bitstream.

Accordingly, the method may further include an operation as follows. If a value of the fourth component identification information is a first value, it is determined that last significant coefficient location reverse is applied to the first colour component of the current slice. Alternatively, if the value of the fourth component identification information is a second value, it is determined that last significant coefficient location reverse is not applied to the first colour component of the current slice.

If a value of the fifth component identification information is the first value, it is determined that last significant coefficient location reverse is applied to the second colour component of the current slice. Alternatively, if the value of the fifth component identification information is the second value, it is determined that last significant coefficient location reverse is not applied to the second colour component of the current slice.

If a value of the sixth component identification information is a first value, it is determined that last significant coefficient location reverse is applied to the third colour component of the current slice. Alternatively, if the value of the sixth component identification information is a second value, it is determined that last significant coefficient location reverse is not applied to the third colour component of the current slice.

Note that the first value and the second value may differ. The first value and the second value may be parametric or may be numerical. In a specific example, the first value may be set to be 1, and the second value may be set to be 0, which however is not limited in any way.

Further note that the component identification information here may be a slice-level flag, and may be denoted by sh_reverse_last_sig_coeff_flag[cIdx]. Herein, cIdx may have the value of 0, 1, or 2. Specifically, when three pieces of component identification information are configured to control the three colour components respectively, the three pieces of component identification information may include sh_reverse_last_sig_coeff_flag[0], sh_reverse_last_sig_coeff_flag[1], and sh_reverse_last_sig_coeff_flag[2]. The fourth component identification information may be denoted by sh_reverse_last_sig_coeff_flag[0] for indicating whether last significant coefficient location reverse is applied to a current block corresponding to the first colour component of the current slice. The fifth component identification information may be denoted by sh_reverse_last_sig_coeff_flag[1] for indicating whether last significant coefficient location reverse is applied to a current block corresponding to the second colour component of the current slice. The sixth component identification information may be denoted by sh_reverse_last_sig_coeff_flag[2] for indicating whether last significant coefficient location reverse is applied to a current block corresponding to the third colour component of the current slice.

In a specific example, a separate piece of component identification information is set for each of the three colour components Y, U, and V for control. Assuming that sequence-level identification information sps_extension_flag, sps_range_extension_flag, and sps_reverse_last_sig_coeff_enabled_flag exist. At the sequence level, sps_extension_flag may be obtained through decoding. sps_range_extension_flag is to be obtained through decoding, if sps_extension_flag has the value of 1. sps_reverse_last_sig_coeff_enabled_flag is to be obtained through decoding, if sps_range_extension_flag has the value of 1. Herein, sps_reverse_last_sig_coeff_enabled_flag is a last significant coefficient location reverse technology enabled flag for the current sequence. If sps_reverse_last_sig_coeff_enabled_flag has the value of 1, it means that last significant coefficient location reverse is enabled for a block in the current sequence. Otherwise (i.e., if sps_reverse_last_sig_coeff_enabled_flag has the value of 0), it means that last significant coefficient location reverse is disabled for the block in the current sequence. If sps_reverse_last_sig_coeff_enabled_flag is not present, sps_reverse_last_sig_coeff_enabled_flag has the value of 0. At the slice level, the component identification information (sh_reverse_last_sig_coeff_flag[0], sh_reverse_last_sig_coeff_flag[1], and sh_reverse_last_sig_coeff_flag[2]) are to be further obtained through decoding, if sps_reverse_last_sig_coeff_enabled_flag has the value of 1. Herein, sh_reverse_last_sig_coeff_flag[cIdx] (where cIdx may have the value of 0, 1, or 2) represents a last significant coefficient location reverse flag for the cIdx-th component of the current slice. If sh_reverse_last_sig_coeff_flag[cIdx] has the value of 1, it means that last significant coefficient location reverse is applied to a block of the cIdx-th component of the current slice. Otherwise (i.e., if sh_reverse_last_sig_coeff_flag[cIdx] has the value of 0), it means that last significant coefficient location reverse is not applied to the block of the cIdx-th component of the current slice. If sh_reverse_last_sig_coeff_flag[cIdx] is not present, sh_reverse_last_sig_coeff_flag[cIdx] has the value of 0.

In a possible implementation, for the YUV format, the 0-th component corresponds to the Y component, the 1-st component corresponds to the U(Cb) component, and the 2-nd component corresponds to the V(Cr) component.

In another possible implementation, for the RGB format, the 0-th component corresponds to the R component, the 1-st component corresponds to the G component, and the 2-nd component corresponds to the B component.

Illustratively, taking the YUV format as an example, if sh_reverse_last_sig_coeff_flag[0] has the value of 1, it may be determined that last significant coefficient location reverse is applied to the first colour component of the current slice (such as the Y component). If sh_reverse_last_sig_coeff_flag[1] has the value of 1, it may be determined that last significant coefficient location reverse is applied to the second colour component of the current slice (such as the U component). If sh_reverse_last_sig_coeff_flag[2] has the value of 1, it may be determined that last significant coefficient location reverse is applied to the third colour component of the current slice (such as the V component).

In an implementation, the table of syntax elements is modified as follows (Sequence parameter set RBSP syntax), as shown in Table 6.

TABLE 6

| | Descriptor |
|---|---|
| ...... | |
| sps_extension_flag | u(1) |
| ...... | |
| if( sps_extension_flag) { | |
| sps_range_extension_flag | u(1) |
| ...... | |
| if( sps_range_extension_flag) | |
| sps_range_extension() | |
| } | |
| ...... | |

In another implementation, the table of syntax elements is modified as follows (Sequence parameter set range extension syntax), as shown in Table 7.

TABLE 7

| | Descriptor |
|---|---|
| sps_range_extension() { | |
| ...... | |
| sps_reverse_last_sig_coeff_enabled_flag | u(1) |
| ...... | |
| } | |

In yet another implementation, the table of syntax elements is modified as follows (Slice header syntax), as shown in Table 8.

TABLE 8

| | Descriptor |
|---|---|
| ... | |
| if(sps_reverse_last_sig_coeff_enabled_flag) | |
| sh_reverse_last_sig_coeff_flag[0] | u(1) |
| sh_reverse_last_sig_coeff_flag[1] | u(1) |
| sh_reverse_last_sig_coeff_flag[2] | u(1) |
| ... | |

In yet another implementation, there may further be another form of modification for Slice header syntax. The table of syntax elements is modified as follows (Slice header syntax), as shown in Table 9.

TABLE 9

| | Descriptor |
|---|---|
| ... | |
| if(sps_reverse_last_sig_coeff_enabled_flag) | |
| for( cIdx = startComp; cIdx < ( startComp + numComps); cIdx++) | |
| sh_reverse_last_sig_coeff_flag[cIdx] | u(1) |
| ... | |

Here, a possible case may be that startComp is equal to 0, and numComps is equal to 3.

The semantics modification is as follows.

The horizontal coordinate (or column position) LastSignificantCoeffX of the last significant coefficient in the preset scanning order within the current block may be derived as follows.

If last_sig_coeff_x_suffix is not present, the following applies:

LastSignificantCoeffX=last_sig_coeff_x_prefix.

Otherwise (last_sig_coeff_x_suffix is present), the following applies:

$$LastSignificantCoeffX = (1 \ll (last\_sig\_coeff\_x\_prefix \gg 1) - 1)) *$$
$$(2 + (last\_sig\_coeff\_x\_prefix \& 1)) + last\_sig\_coeff\_x\_suffix.$$

If sh_reverse_last_sig_coeff_flag[cIdx] is equal to 1, the following applies:

$$LastSignificantCoeffX = (1 \ll \log 2ZoTbWidth) - 1 - LastSignificantCoeffX.$$

The vertical coordinate (or row position) LastSignificantCoeffY of the last significant coefficient in the scanning order within the current block may be derived as follows.

If last_sig_coeff_y_suffix is not present, the following applies:

LastSignificantCoeffY=last_sig_coeff_y_prefix.

Otherwise (last_sig_coeff_y_suffix is present), the following applies:

$$LastSignificantCoeffY = (1 \ll ((last\_sig\_coeff\_y\_prefix \gg 1) - 1)) *$$
$$(2 + (last\_sig\_coeff\_y\_prefix \& 1)) + last\_sig\_coeff\_y\_suffix.$$

If sh_reverse_last_sig_coeff_flag[cIdx] is equal to 1, the following applies:

$$LastSignificantCoeffY = (1 \ll \log 2ZoTbHeight) - 1 - LastSignificantCoeffY.$$

Here, sh_reverse_last_sig_coeff_flag[cIdx] represents a last significant coefficient location reverse flag for the cIdx-th component of the current slice. cIdx may have the value of 0, 1, or 2.

Further note that when the third syntax element identification information indicates that range extension is applied to the current sequence, all possible coefficients to be coded need to be coded by default. That is, the location of the last significant coefficient is no longer used. Instead, all possible nonzero coefficients in the current block are scanned in the preset scanning order. Therefore, the embodiments of the disclosure may also introduce last coefficient enabled identification information for determining whether the last coefficient location is applied to the current block.

In some embodiments, when the third syntax element identification information indicates that range extension is applied to the current sequence, the method may further include operations as follows.

Last coefficient enabled identification information of the current block is determined by parsing the bitstream.

When the last coefficient enabled identification information indicates that a last coefficient location is applied to the current block, the coefficients of the current block are determined by decoding all coefficients located above the last coefficient location in the preset scanning order.

Note that the last coefficient enabled identification information may be denoted by default_last_coeff_enabled_flag. In embodiments of the disclosure, the last coefficient enabled identification information may be at least one of sequence-level identification information, picture-level identification information, slice-level identification information, or block-level identification information, or even identification information of a higher level (such as VUI, SEI, etc.), which is not limited in any way here.

That is, default_last_coeff_enabled_flag may be a sequence-level flag or a higher-level flag, or may be a picture-level flag or a slice-level flag or a block-level flag, or a flag of another level. In addition, a block-level flag may include an LCU-level flag or a CTU-level flag or a CU-level flag, or another block-level flag, which is not limited in any way in embodiments of the disclosure.

In some embodiments, the method may further include an operation as follows.

If a value of the last coefficient enabled identification information is a first value, it is determined that the last coefficient enabled identification information indicates that the last coefficient location is applied to the current block.

Alternatively, if the value of the last coefficient enabled identification information is a second value, it is determined that the last coefficient enabled identification information indicates that the last coefficient location is not applied to the current block.

Note that the first value and the second value may differ. The first value and the second value may be parametric. The first value and the second value may be numerical. In a specific example, the first value may be set to be 1, and the second value may be set to be 0, which however is not limited in any way.

Accordingly, take the first value being 1 and the second value being 0 as an example. If default_last_coeff_enabled_flag has the value of 1, it may be determined that default_last_coeff_enabled_flag indicates that the last coefficient location is applied to the current block. Alternatively, if default_last_coeff_enabled_flag has the value of 0, it may be determined that default_last_coeff_enabled_flag indicates that the last coefficient location is not applied to the current block.

When the last coefficient location is applied to the current block, the coefficients of the current block may be determined by decoding all coefficients located above the last coefficient location in the preset scanning order.

Further, when the last coefficient location is not applied to the current block, i.e., the value of the last coefficient enabled identification information is 0, in some embodiments, the method may further include operations as follows.

Prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient are obtained by parsing the bitstream.

The location of the last significant coefficient is determined according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient.

The coefficients of the current block are determined by decoding all coefficients located above the location of the last significant coefficient in the preset scanning order.

Note that if the last coefficient location is not applied to the current block, the location of the last significant coefficient is to be obtained through decoding. Specifically, last_sig_coeff_x_prefix, last_sig_coeff_x_suffix, last_sig_coeff_y_prefix, and last_sig_coeff_y_suffix are obtained by parsing the bitstream. Then, the location of the last significant coefficient may be determined according to last_sig_coeff_x_prefix, last_sig_coeff_x_suffix, last_sig_coeff_y_prefix, and last_sig_coeff_y_suffix. Otherwise if the last coefficient location is applied to the current block, the location of the last significant coefficient no longer need to be determined, in which case last_sig_coeff_x_prefix, last_sig_coeff_x_suffix, last_sig_coeff_y_prefix, and last_sig_coeff_y_suffix no longer need to be obtained through decoding.

Further note that if the last coefficient location is applied to the current block, all the coefficients located above the last coefficient location may be decoded in the preset scanning order. If the last coefficient location is not applied to the current block, all the coefficients located above the location of the last significant coefficient may be decoded in the preset scanning order. Here, the preset scanning order may be a diagonal scanning order, zigzag scanning order, horizontal scanning order, vertical scanning order, 4 g order scans scanning order, etc., which is not limited in any way in embodiments of the disclosure.

Further, in some embodiments, the last coefficient location is a bottom right corner of a matrix formed by all possible nonzero coefficients within the current block. Alternatively, the last coefficient location is a last location of all possible nonzero coefficients in the preset scanning order within the current block.

Note that in embodiments of the disclosure, the last coefficient location does not represent the location of the last significant coefficient. This is because a coefficient on the last coefficient location may be 0, while a coefficient on the location of the last significant coefficient is not 0 for certain.

In a specific example, the method may further include an operation as follows. The location of the last significant coefficient is set at the last coefficient location.

That is, in embodiments of the disclosure, the location of the last significant coefficient may still be used. In this case, the location of the last significant coefficient needs to be placed at the last location of all possible nonzero coefficients in the preset scanning order within the current block.

Further, the last coefficient location may be denoted by (LastCoeffX, LastCoeffY), i.e., the last location of all possible nonzero coefficients in the preset scanning order within the current block. In some embodiments, the method may further include operations as follows.

A width and a height of a transform block obtained by performing a preset operation on the current block are determined.

Coordinate information of a bottom right corner of the transform block is calculated according to the width and the height of the transform block.

The last coefficient location is determined according to the coordinate information of the bottom right corner of the transform block.

Here, the preset operation includes at least a zero-out operation.

Note that (LastCoeffX, LastCoeffY) may denote the coordinate information of the bottom right corner of the transform block obtained after zero-out. (LastCoeffX, LastCoeffY) may be derived as follows.

$$LastCoeffX = (1 \ll \log2ZoTbWidth) - 1.$$

$$LastCoeffY = (1 \ll \log2ZoTbHeight) - 1.$$

Accordingly, the last coefficient location may be determined according to (LastCoeffX, LastCoeffY), if default_last_coeff_enabled_flag has the value of 1.

In a specific example, the location of the last significant coefficient is still used. In this case, the location of the last significant coefficient may be placed at the last location of all possible nonzero coefficients in the preset scanning order within the current block. In some embodiments, the method may further include an operation as follows.

When the location of the last significant coefficient is set at the last coefficient location, the location of the last significant coefficient is determined according to the coordinate information of the bottom right corner of the transform block.

That is, the location of the last significant coefficient may be denoted by (LastSignificantCoeffX, LastSignificantCoeffY). (LastSignificantCoeffX, LastSignificantCoeffY) may be derived as follows.

$$LastSignificantCoeffX = (1 \ll \log2ZoTbWidth) - 1.$$

$$LastSignificantCoeffY = (1 \ll \log2ZoTbHeight) - 1.$$

Herein, (LastSignificantCoeffX, LastSignificantCoeffY) may denote the coordinate information of the bottom right corner of the transform block obtained after zero-out. The location of the last significant coefficient may be determined according to (LastSignificantCoeffX, LastSignificantCoeffY), if default_last_coeff_enabled_flag has the value of 1.

In this way, in some cases, such as high bit-depth, high quality, high bit-rate, or lossless compression video encoding and decoding, all possible coefficients to be coded need to be coded by default in coefficient coding. In general, a method for coefficient encoding and decoding is still the same as an existing method in related art. All possible coefficients to be coded need to be coded by default, that is, the location of the last significant coefficient is no longer used, instead all possible nonzero coefficients in the current block are scanned in the preset scanning order. In other words, the location of the last coefficient to be coded is put at the last location of all possible nonzero coefficients in the preset scanning order within the current block. This location usually may refer to the bottom right corner of the matrix formed by all possible nonzero coefficients in the current block. Here, the location of the last coefficient to be coded, instead of the location of the last significant coefficient, may be used. This is because the coefficient on the location of the last coefficient to be coded may be 0, while the coefficient on the location of the last significant coefficient is not 0 for certain.

In a specific example, the location of the last significant coefficient is still used. In this case, the location of the last significant coefficient may be placed at the last location of all possible nonzero coefficients in the preset scanning order within the current block.

In addition, the reasons why it is called all possible nonzero coefficients in the preset scanning order within the current block, is because some coefficients in a block may be taken as 0 by default using some techniques (such as zero-out mentioned hereinabove), other than the last significant coefficient.

The semantics modification is as shown in Table 10.

TABLE 10

|  | Descriptor |
|---|---|
| ... | |
| if(!default_last_coeff_enabled_flag) { | |
| if( log2TbWidth > 0) | |
| last_sig_coeff_x_prefix | ae(v) |
| if( log2TbHeight > 0) | |
| last_sig_coeff_y_prefix | ae(v) |
| if( last_sig_coeff_x_prefix > 3) | |
| last_sig_coeff_x_suffix | ae(v) |
| if( last_sig_coeff_y_prefix > 3) | |
| last_sig_coeff_y_suffix | ae(v) |
| } | |
| ... | |

In embodiments of the disclosure, a condition may need to be met before decoding information required for the last significant coefficient. That is, syntax elements such as last_sig_coeff_x_prefix, last_sig_coeff_y_prefix, last_sig_coeff_x_suffix, last_sig_coeff_y_suffix, etc., are obtained through decoding, if default_last_coeff_enabled_flag is not true (i.e., default_last_coeff_enabled_flag equals to 0). Syntax elements such as last_sig_coeff_x_prefix, last_sig_coeff_y_prefix, last_sig_coeff_x_suffix, and last_sig_coeff_y_suffix, a syntax element such as etc., do not need to be obtained through decoding, if default_last_coeff_enabled_flag is true (i.e., default_last_coeff_enabled_flag equals to 1).

Here, default_last_coeff_enabled_flag may be a default last coefficient enabled flag for indicating whether to use/apply a default last coefficient. If default_last_coeff_enabled_flag has the value of 1, it means that a default last coefficient location is used/applied. That is, the location of the last coefficient to be coded is put at the last location of all possible nonzero coefficients in the preset scanning order within the current block. Otherwise, the flag indicates that the default last coefficient location is not used/applied.

The default last coefficient location (LastCoeffX, LastCoeffY) is the last location of all possible nonzero coefficients in the preset scanning order within the current block, if default_last_coeff_enabled_flag has the value of 1. Coefficients located above (LastCoeffX, LastCoeffY) all need to be scanned in the preset scanning order. In embodiments of the disclosure, (LastCoeffX, LastCoeffY) may be derived as follows.

$$LastCoeffX = (1 \ll \log2ZoTbWidth) - 1.$$

$$LastCoeffY = (1 \ll \log2ZoTbHeight) - 1.$$

Herein, (LastCoeffX, LastCoeffY) is the coordinate information of the bottom right corner of the transform block obtained after zero-out.

In a specific example, the location of the last significant coefficient is still used. The location of the last significant coefficient is placed at the last location of all possible nonzero coefficients in the preset scanning order within the current block. In embodiments of the disclosure, the location (LastSignificantCoeffX, LastSignificantCoeffY) of the last significant coefficient may be derived as follows.

$$LastSignificantCoeffX = (1 \ll log2ZoTbWidth) - 1.$$

$$LastSignificantCoeffY = (1 \ll log2ZoTbHeight) - 1.$$

Herein, (LastSignificantCoeffX, LastSignificantCoeffY) is the coordinate information of the bottom right corner of the transform block obtained after zero-out.

Further note that default_last_coeff_enabled_flag may be a sequence-level flag or a higher-level flag, or may be a picture-level flag or a slice-level flag or a block-level flag, or a flag of another level. A block-level flag may include an LCU-level flag or a CTU-level flag or a CU-level flag, or another block-level flag.

In addition, default_last_coeff_enabled_flag may depend on some other flags, such as the high bit-depth identification information, the high bit-rate identification information, and the like. That is, default_last_coeff_enabled_flag needs to be decoded when the high bit-depth identification information or the high bit-rate identification information has the value of 1. Otherwise, default_last_coeff_enabled_flag does not need to be decoded.

In a specific example, taking the sequence level as an example, assume that the sequence-level flag sps_high_bit_depth_flag indicates whether a current video sequence is a high bit-depth sequence. If sps_high_bit_depth_flag has the value of 1, it means that the current video sequence is a high bit-depth sequence. Otherwise, the flag indicates that the current video sequence is not a high bit-depth sequence. At the sequence level, sps_default_last_coeff_enabled_flag needs to be obtained through decoding, if sps_high_bit_depth_flag has the value of 1. Here, sps_default_last_coeff_enabled_flag may be the default last coefficient enabled flag of the current sequence. If sps_default_last_coeff_enabled_flag has the value of 1, it means that the default last coefficient is used in a block in the current sequence. Otherwise (i.e., if sps_default_last_coeff_enabled_flag has the value of 0), it means that the default last coefficient is not used in the block in the current sequence. default_last_coeff_enabled_flag in the syntax table above may be modified to be sps_default_last_coeff_enabled_flag.

In implementation, the table of syntax elements is modified as follows (Sequence parameter set RBSP syntax), as shown in Table 11.

TABLE 11

| | Descriptor |
|---|---|
| ... | |
| sps_high_bit_depth_flag | u(1) |
| if( sps_high_bit_depth_flag) | |
|     sps_default_last_coeff_enabled_flag | u(1) |
| ... | |

In another specific example, taking the slice level as an example, assume that the sequence-level flag sps_high_bit_depth_flag indicates whether a current video sequence is a high bit-depth sequence. If sps_high_bit_depth_flag has the value of 1, it means that the current video sequence is a high bit-depth sequence. Otherwise, the flag indicates that the current video sequence is not a high bit-depth sequence. At the slice level, sh_default_last_coeff_enabled_flag needs to be obtained through decoding, if sps_high_bit_depth_flag has the value of 1. Here, sh_default_last_coeff_enabled_flag may be the default last coefficient enabled flag of the current slice. If sh_default_last_coeff_enabled_flag has the value of 1, it means that the default last coefficient is used in a block in the current slice. Otherwise (i.e., if sh_default_last_coeff_enabled_flag has the value of 0), it means that the default last coefficient is not used in the block in the current slice. default_last_coeff_enabled_flag in the syntax table above may be modified to be sh_default_last_coeff_enabled_flag.

In implementation, the table of syntax elements is modified as follows (Slice header syntax), as shown in Table 12.

TABLE 12

| | Descriptor |
|---|---|
| ... | |
| if( sps_high_bit_depth_flag) | |
|     sh_default_last_coeff_enabled_flag | u(1) |
| ... | |

In embodiments of the disclosure, for each colour component of the current slice, default last coefficient enabled identification information (i.e., sh_default_last_coeff_enabled_flag) of the current slice may allow for separate control over whether the default last coefficient is applied to the colour component.

Specifically, the default last coefficient enabled identification information of the current slice may also be denoted by sh_default_last_coeff_enabled_flag[cIdx]. Herein, cIdx may have the value of 0, 1, or 2. Specifically, when three pieces of component identification information are configured to control the three colour components respectively, the three pieces of component identification information may include sh_default_last_coeff_enabled_flag[0], sh_default_last_coeff_enabled_flag[1], and sh_default_last_coeff_enabled_flag[2]. sh_default_last_coeff_enabled_flag[0] may indicate whether the default last coefficient is applied to a current block corresponding to the first colour component of the current slice. sh_default_last_coeff_enabled_flag[1] may indicate whether the default last coefficient is applied to a current block corresponding to the second colour component of the current slice. sh_default_last_coeff_enabled_flag[2] may indicate whether the default last coefficient is applied to a current block corresponding to the third colour component of the current slice.

Here, in embodiments of the disclosure, one or more pieces of component identification information may also be configured to control application of embodiments of the disclosure to different colour components. Illustratively, one piece of component identification information may be configured to control whether the method according to embodiments of the disclosure is applied to the three colour components. For example, one component identification may control whether the method according to embodiments of the disclosure is applied to the three colour components. Alternatively, two pieces of component identification information may be configured to control whether the method according to embodiments of the disclosure is applied to the three colour components.

For example, one component identification may control application to the luma component, and the other component identification may control application to the two chroma components. Alternatively, three pieces of component identification information may be configured to control whether the method according to embodiments of the disclosure is applied to each of the three colour components. For example, the three colour components are R, G, and B in the RGB format; or Y, Cb, and Cr (or Y, U, and V) in the YUV format.

Illustratively, taking the YUV format as an example, three pieces of component identification information may be configured to control whether the method according to embodiments of the disclosure is applied to each of the three colour components. If sh_default_last_coeff_enabled_flag [0] has the value of 1, it may be determined that the default last coefficient is applied to a block corresponding to the first colour component of the current slice (such as the Y component). If sh_default_last_coeff_enabled_flag[1]has the value of 1, it may be determined that the default last coefficient is applied to a block corresponding to the second colour component of the current slice (such as the U component). If sh_default_last_coeff_enabled_flag[2] has the value of 1, it may be determined that the default last coefficient is applied to a block corresponding to the third colour component of the current slice (such as the V component).

Further note that when the third syntax element identification information indicates that range extension is applied to the current sequence, sub-blocks scanned need to be coded by default. In this case, sb_coded_flag does not need to be signalled into the bitstream, that is, neither the encoder nor the decoder needs to process this flag, thereby accelerating encoding and decoding. Therefore, the embodiments of the disclosure may further introduce sub-block default coded identification information for determining whether a sub-block to be decoded in the current block is coded by default.

In some embodiments, when the third syntax element identification information indicates that range extension is applied to the current sequence, the method may further include operations as follows.

Sub-block default coded identification information of the current block is determined by parsing the bitstream.

When the sub-block default coded identification information indicates that a sub-block to be decoded in the current block is coded by default, all coefficients in the sub-block to be decoded are decoded.

Note that if the sub-block default coded identification information indicates that the sub-block to be decoded in the current block is coded by default, it may be determined that a value of the sub-block default coded identification information is a first value, in which case all the coefficients in the sub-block to be decoded need to be decoded.

Further note that the sub-block default coded identification information may be denoted by default_sb_coded_flag. In embodiments of the disclosure, the sub-block default coded identification information is at least one of sequence-level identification information, picture-level identification information, slice-level identification information, or block-level identification information, or even identification information of a higher level (such as VUI, SEI, etc.), which is not limited in any way here.

That is, default_sb_coded_flag may be a sequence-level flag or a higher-level flag, or may be a picture-level flag or a slice-level flag or a block-level flag, or a flag of another level. In addition, a block-level flag may include an LCU-level flag or a CTU-level flag or a CU-level flag, or another block-level flag, which is not limited in any way in embodiments of the disclosure.

In some embodiments, the method may further include an operation as follows. If a value of the sub-block default coded identification information is a first value, it is determined that the sub-block default coded identification information indicates that the sub-block to be decoded in the current block is coded by default. Alternatively, if the value of the sub-block default coded identification information is a second value, it is determined that the sub-block default coded identification information indicates that the sub-block to be decoded in the current block is not coded by default.

Note that the first value and the second value may differ. The first value and the second value may be parametric. The first value and the second value may be numerical. Specifically, the first syntax element identification information may be a parameter signalled in a profile, or may be a value of a flag, which is not limited in any way in embodiments of the disclosure.

For example, the first syntax element identification information is a flag. In this case, the first value may be set to be 1, and the second value may be set to be 0. Alternatively, the first value may be set to be true, and the second value may be set to be false. Alternatively, the first value may be set to be 0, and the second value may be set to be 1. Alternatively, the first value may be set to be false, and the second value may be set to be true, which is not limited in any way here.

In this way, take the first value being 1 and the second value being 0 as an example. If default_sb_coded_flag has the value of 1, it may be determined that default_sb_coded_flag indicates that the sub-block to be decoded is to be coded by default. Alternatively, if default_sb_coded_flag has the value of 0, it may be determined that default_sb_coded_flag indicates that the sub-block to be decoded is not to be coded by default.

When the sub-block to be decoded is to be coded by default, default_sb_coded_flag has the value of 1, meaning that sb_coded_flag has the value of 1, i.e., sb_coded_flag does not need to be decoded, in which case, all coefficients in the sub-block to be decoded need to be decoded by default.

Further, when the sub-block to be decoded is not to be coded by default, i.e., default_sb_coded_flag has the value of 0, in some embodiments, the method may further include operations as follows.

Sub-block coded identification information of the sub-block to be decoded is determined by parsing the bitstream.

All coefficients in the sub-block to be decoded are decoded when a value of the sub-block coded identification information is a first value.

Note that if the sub-block to be decoded is not to be coded by default, the sub-block coded identification information needs to be obtained though decoding, and it is determined according to the sub-block coded identification information whether to decode all the coefficients in the sub-block to be decoded.

The method may further include an operation as follows. It is determined that all the coefficients in the sub-block to be decoded are decoded if the value of the sub-block coded identification information is a first value. Alternatively, it is determined that all the coefficients in the sub-block to be decoded are zero if the value of the sub-block coded identification information is a second value.

In embodiments of the disclosure, the sub-block coded identification information may be denoted by sb_coded_flag. Take the first value being 1 and the second value being 0 as an example. If sb_coded_flag has the value of 1, it may be determined that all the coefficients in the sub-block to be decoded need to be decoded. Alternatively, if sb_coded_flag has the value of 0, it may be determined that any coefficient in the sub-block to be decoded does not need to be decoded, in which case all the coefficients in the sub-block to be decoded are zero.

In this way, for a certain situation, in coefficient coding, sub-blocks scanned need to be coded by default or sub-blocks scanned include significant coefficients by default. In general, a method for coefficient encoding and decoding is still the same as an existing method in related art. The certain situation may be, for example, high bit-depth, high quality, high bit-rate, or lossless compression video encoding and decoding. In this situation, there are a lot of significant coefficients, and almost all of sub-blocks scanned need to be coded or almost all of sub-blocks scanned include significant coefficients. In this case, sb_coded_flag does not need to be signalled into the bitstream. Thus, neither the encoder nor the decoder needs to process this flag, thereby accelerating encoding and decoding. Removal of an almost nonexistent flag further improves compression performance.

The semantics modification is as shown in Table 13.

TABLE 13

|  | Descriptor |
|---|---|
| ... | |
| if( i<lastSubBlock && i>0) { | |
| if(!default_sb_coded_flag) { | |
| sb_coded_flag[xS][yS] | ae(v) |
| } | |
| inferSbDcSigCoeffFlag = 1 | |
| } | |
| ... | |

Herein, default_sb_coded_flag is a sub-block default coded flag. If default_sb_coded_flag has the value of 1, it may be determined that the value of sb_coded_flag[xS][yS] is 1, which then does not need to be decoded from the bitstream. Otherwise (if default_sb_coded_flag has the value of 0), sb_coded_flag[xS][yS] further needs to be decoded from the bitstream.

Further note that default_sb_coded_flag may be a sequence-level flag or a higher-level flag, or may be a picture-level flag or a slice-level flag or a block-level flag, or a flag of another level. A block-level flag may include an LCU-level flag or a CTU-level flag or a CU-level flag, or another block-level flag.

In addition, default_sb_coded_flag may depend on some other flags, such as the high bit-depth identification information, the high bit-rate identification information, and the like. That is, default_sb_coded_flag needs to be decoded when the high bit-depth identification information or the high bit-rate identification information has the value of 1. Otherwise, default_sb_coded_flag does not need to be decoded.

In a specific example, taking the sequence level as an example, assume that the sequence-level flag sps_high_bit_depth_flag indicates whether a current video sequence is a high bit-depth sequence. If sps_high_bit_depth_flag has the value of 1, it means that the current video sequence is a high bit-depth sequence. Otherwise, the flag indicates that the current video sequence is not a high bit-depth sequence. At the sequence level, sps_default_sb_coded_flag is to be obtained through decoding, if sps_high_bit_depth_flag has the value of 1. Here, sps_default_sb_coded_flag is the sub-block default coded flag of the current sequence. If sps_default_sb_coded_flag has the value of 1, it means that a sub-block of a block in the current sequence is by default coded. Otherwise (i.e., if sps_default_sb_coded_flag has the value of 0), it means that the sub-block of the block in the current sequence is not by default coded. default_sb_coded_flag in the syntax table above may be modified to be sps_default_sb_coded_flag.

In implementation, the table of syntax elements is modified as follows (Sequence parameter set RBSP syntax), as shown in Table 14.

TABLE 14

|  | Descriptor |
|---|---|
| ... | |
| sps_high_bit_depth_flag | u(1) |
| if( sps_high_bit_depth_flag) | |
| sps_default_sb_coded_flag | u(1) |
| ... | |

In another specific example, taking the slice level as an example, assume that the sequence-level flag sps_high_bit_depth_flag indicates whether a current video sequence is a high bit-depth sequence. If sps_high_bit_depth_flag has the value of 1, it means that the current video sequence is a high bit-depth sequence. Otherwise, the flag indicate that the current video sequence is not a high bit-depth sequence. At the slice level, sh_default_sb_coded_flag is to be obtained through decoding, if sps_high_bit_depth_flag has the value of 1. Here, sh_default_sb_coded_flag is the sub-block default coded flag of the current slice. If sh_default_sb_coded_flag has the value of 1, it means that a sub-block of a block in the current slice is by default coded. Otherwise (i.e., if sh_default_sb_coded_flag has the value of 0), it means that the sub-block of the block in the current slice is not by default coded. default_sb_coded_flag in the syntax table above may be modified to be sh_default_sb_coded_flag.

In implementation, the table of syntax elements is modified as follows (Slice header syntax), as shown in Table 15.

TABLE 15

|  | Descriptor |
|---|---|
| ... | |
| if( sps_high_bit_depth_flag) | |
| sh_default_sb_coded_flag | u(1) |
| ... | |

Note that the sequence-level flag sps_high_bit_depth_flag may be a flag indicating whether the current sequence is a high bit-depth sequence; or alternatively may be replaced by sps_high_bit_rate_flag indicating whether the current sequence is a high bit-rate sequence; or even be replaced by another flag indicating a high bit depth, a high bit rate, high quality, or lossless encoding, etc., which is not limited in any way here.

In embodiments of the disclosure, for each colour component of the current slice, sub-block default coded identification information (i.e., sh_default_sb_coded_flag) of the current slice may allow for separate control over whether sub-block-by-default-coded is applied to the colour component.

Specifically, the sub-block default coded identification information of the current slice may also be denoted by sh_default_sb_coded_flag[cIdx]. cIdx may have the value of 0, 1, or 2. Specifically, when three pieces of component identification information are configured to control the three colour components respectively, the three pieces of component identification information may include sh_default_sb_coded_flag[0], sh_default_sb_coded_flag[1], and sh_default_sb_coded_flag[2]. sh_default_sb_coded_flag[0] may indicate whether a sub-block of a current block corresponding to the first colour component of the current slice is by default coded. sh_default_sb_coded_flag[1] may indicate whether a sub-block of a current block corresponding to the second colour component of the current slice is by default coded. sh_default_sb_coded_flag[2] may indicate whether a sub-block of a current block corresponding to the third colour component of the current slice is by default coded.

Here, in embodiments of the disclosure, one or more pieces of component identification information may also be configured to control application of embodiments of the disclosure to different colour components. Illustratively, one piece of component identification information may be configured to control whether the method according to embodiments of the disclosure is applied to the three colour components. For example, one component identification may control whether the method according to embodiments of the disclosure is applied to the three colour components. Alternatively, two pieces of component identification information may be configured to control whether the method according to embodiments of the disclosure is applied to the three colour components.

For example, one component identification may control application to the luma component, and the other component identification may control application to the two chroma components. Alternatively, three pieces of component identification information may be configured to control whether the method according to embodiments of the disclosure is applied to each of the three colour components. For example, the three colour components are R, G, and B in the RGB format; or Y, Cb, and Cr (or Y, U, and V) in the YUV format.

Illustratively, taking the YUV format as an example, three piece of component identification information may be configured to control whether the method according to embodiments of the disclosure is applied to each of the three colour components. If sh_default_sb_coded_flag[0] has the value of 1, it may be determined that a sub-block of a block corresponding to the first colour component of the current slice (such as the Y component) is by default coded. If sh_default_sb_coded_flag[1] has the value of 1, it may be determined that a sub-block of a block corresponding to the second colour component of the current slice (such as the U component) is by default coded. If sh_default_sb_coded_flag[2] has the value of 1, it may be determined that a sub-block of a block corresponding to the third colour component of the current slice (such as the V component) is by default coded.

In short, for all colour components in a video, one piece of identification information may be adopted to control all the colour components to use the method according to embodiments of the disclosure. Alternatively, different pieces of identification information may be adopted to separately control respective colour components to use the method according to embodiments of the disclosure. Alternatively, two pieces of identification information may be adopted to control all the colour components to use the method according to embodiments of the disclosure. That is to say, more than one piece of identification information may be adopted to control different colour components to use the method according to embodiments of the disclosure. Herein, all the colour components may be R, G, and B of a video of an RGB format, or Y, U, and V (Y, Cb, and Cr) of a video of a YUV format, or the like.

The embodiment provides a decoding method, performed by a decoder. In the method, component identification information of a current slice, and coordinate information of a last significant coefficient of a current block corresponding to a component of the current slice, are determined by parsing a bitstream. When the component identification information indicates that last significant coefficient location reverse is applied to the component of the current slice, a location of the last significant coefficient of the current block is obtained by performing calculation on the coordinate information of the last significant coefficient. Coefficients of the current block are determined by decoding coefficients located above the location of the last significant coefficient in a preset scanning order. In this way, in a scenario of high bit-depth, high bit-rate, high quality, or lossless video encoding and decoding, a reasonable deriving mode of the last significant coefficient is set according to a law of distribution of significant coefficients, reducing an overhead brought about by coding in the bitstream, improving compression efficiency. In addition, as respective colour components may be different in distribution of significant coefficients, it is also possible to refinedly control a respective deriving mode of the last significant coefficient for each colour component, i.e., separately controlling whether last significant coefficient location reverse technology is applied to each colour component, thereby further improving compression efficiency.

In another embodiment of the disclosure, FIG. 11 is a flowchart of an encoding method according to embodiments of the disclosure. As shown in FIG. 11, the method includes operations S1101 to S1103 as follows.

At an operation S1101, component identification information of a current slice, and a location of a last significant coefficient of a current block corresponding to a component of the current slice, are determined.

At an operation S1102, coordinate information of the last significant coefficient of the current block is determined according to the component identification information and the location of the last significant coefficient.

At S1103, all coefficients located above the location of the last significant coefficient are encoded in a preset scanning order. Bit information obtained through encoding, the component identification information, and the coordinate information of the last significant coefficient are signalled into a bitstream.

Note that the encoding method according to embodiments of the disclosure may specifically refer to a method for encoding coefficient(s), which may be performed by an encoder. Based on the structure of the encoder 100 as shown in FIG. 8A, the encoding method is mainly performed by the entropy coding unit 115 in the encoder 100. The entropy coding unit 115 may perform entropy coding on related identification information (or syntax element(s)) using an adaptive binary arithmetic coding mode based on a context model or the bypass mode, and may signal the result of the entropy coding into the bitstream.

Further note that in general, coding in a video standard may include encoding and decoding. Therefore, video coding may include an encoding method performed at the encoder side and a decoding method performed at the decoder side. In embodiments of the disclosure, the encoding method performed at the encoder side is described.

In general, for example, for a conventional video, the method for encoding coefficient(s) of the conventional video is the same as the existing method in related art. However, in some cases, such as high bit-depth, high quality, high bit-rate, or lossless compression video encoding and decoding, embodiments of the disclosure provide a method capable of modifying a derivation mode of the location of a last significant coefficient. In this case, the embodiments of the disclosure introduce component identification information for determining whether last significant coefficient location reverse is applied to a component of the current slice.

In embodiments of the disclosure, the component identification information may be a slice-level flag. The component identification information may indicate whether last significant coefficient location reverse is applied to a component of the current slice. If last significant coefficient location reverse is applied to a component of the current slice, it means that last significant coefficient location reverse is applied to a current block corresponding to the component of the current slice. If last significant coefficient location reverse is not applied to the component of the current slice, it means that last significant coefficient location reverse is not applied to the current block corresponding to the component of the current slice.

Understandably, a current sequence may include the current slice, and the current slice may include the current block. In some embodiments, before the component identification information of the current slice is determined, the method may further include operations as follows.

First syntax element identification information is determined.

The operation that component identification of the current slice is determined is performed, when the first syntax element identification information indicates that last significant coefficient location reverse is enabled for the current sequence.

In embodiments of the disclosure, the operation that the first syntax element identification information is determined may include an operation as follows. If last significant coefficient location reverse is enabled for the current sequence, a value of the first syntax element identification information is determined to be a first value. Alternatively, if last significant coefficient location reverse is disabled for the current sequence, the value of the first syntax element identification information is determined to be a second value.

The method may further include an operation as follows. The first syntax element identification information is signalled into the bitstream.

Note that the first value and the second value may differ. The first value and the second value may be parametric or may be numerical. Specifically, the first syntax element identification information may be a parameter signalled in a profile, or may be a value of a flag, which is not limited in any way in embodiments of the disclosure.

For example, the first syntax element identification information is a flag. In this case, the first value may be set to be 1, and the second value may be set to be 0. Alternatively, the first value may be set to be true, and the second value may be set to be false. Alternatively, the first value may be set to be 0, and the second value may be set to be 1. Alternatively, the first value may be set to be false, and the second value may be set to be true. Illustratively, for a flag, in general, the first value may be 1, and the second value may be 0, which however is not limited in any way.

Further note that the first syntax element identification information may be a sequence-level flag, denoted by sps_reverse_last_sig_coeff_flag for indicating whether last significant coefficient location reverse is enabled for the current sequence. Accordingly, when it is determined that last significant coefficient location reverse is enabled for the current sequence, slice-level component identification information may further be determined, so as to determine whether last significant coefficient location reverse is applied to a component of the current slice.

Further, before determining the first syntax element identification information, in a possible embodiment, the method may further include operations as follows.

Second syntax element identification information is determined.

The first syntax element identification information is determined, when the second syntax element identification information indicates that a standard extension release is applied to the current sequence.

Before determining the first syntax element identification information, in another possible embodiment, the method may further include operations as follows.

Third syntax element identification information is determined.

The first syntax element identification information is determined, when the third syntax element identification information indicates that range extension is applied to the current sequence.

Before determining the first syntax element identification, in yet another possible embodiment, the method may further include operations as follows.

Second syntax element identification information is determined.

Third syntax element identification information is determined, when the second syntax element identification information indicates that a standard extension release is applied to the current sequence.

The first syntax element identification information is determined, when the third syntax element identification information indicates that range extension is applied to the current sequence.

Note that the second syntax element identification information and the third syntax element identification information both are sequence-level flags. The second syntax element identification information may be denoted by sps_extension_flag for indicating whether the standard extension release is applied to the current sequence. The third syntax element identification information may be denoted by sps_range_extension_flag for indicating whether range extension is applied to the current sequence.

That is to say, before determining the first syntax element identification information (sps_reverse_last_sig_coeff_flag), the following operations may be performed. sps_extension_flag is determined; and sps_reverse_last_sig_coeff_flag is determined, if sps_extension_flag indicates that the standard extension release is applied to the current sequence. Alternatively, sps_range_extension_flag is determined; and sps_reverse_last_sig_coeff_flag is determined, if sps_range_ extension_flag indicates that range extension is applied to the current sequence. Alternatively, sps_extension_flag is determined; sps_range_extension_flag is determined, if sps_extension_flag indicates that the standard extension release is applied to the current sequence; and sps_reverse_ last_sig_coeff_flag is determined, if sps_range_extension_ flag indicates that range extension is applied to the current sequence, which however is not limited in any way in embodiments of the disclosure.

In embodiments of the disclosure, the operation that the second syntax element identification information is determined may include an operation as follows. If the standard extension release is applied to the current sequence, a value of the second syntax element identification information is determined to be a first value. Alternatively, if the standard extension release is not applied to the current sequence, the value of the second syntax element identification information may be determined to be a second value.

The method may further include an operation as follows. The second syntax element identification information is signalled into the bitstream.

In embodiments of the disclosure, the operation that the third syntax element identification information is determined may include an operation as follows. If range extension is applied to the current sequence, a value of the third syntax element identification information is determined to be a first value. Alternatively, if range extension is not applied to the current sequence, the value of the third syntax element identification information is determined to be a second value.

The method may further include an operation as follows. The third syntax element identification information is signalled into the bitstream.

Note that the first value and the second value may differ. The first value and the second value may be parametric or may be numerical. In a specific example, the first value is set to be 1, and the second value is set to be 0, which however is not limited in any way.

Further note that the second syntax element identification information may be denoted by sps_extension_flag. The third syntax element identification information may be denoted by sps_range_extension_flag. Accordingly, at the sequence level, if sps_extension_flag has the value of 1, i.e., the standard extension release is applied to the current sequence, then sps_range_extension_flag needs to be determined. If sps_range_extension_flag has the value of 1, i.e., range extension is applied to the current sequence, then sps_reverse_last_sig_coeff_flag needs to be determined. if sps_reverse_last_sig_coeff_flag has the value of 1, i.e., last significant coefficient location reverse is enabled for the current sequence, slice-level component identification information needs to be further determined, so as to determine whether last significant coefficient location reverse is applied to a component of the current slice.

In some embodiments, the range extension is applied to the current sequence that may include: the current sequence is of at least one of a high bit depth, high quality, a high bit rate, a high frame rate, or lossless compression. For example, four cases are described respectively hereinafter.

In a possible implementation, when the third syntax element identification information is high bit-depth identification information, the method may further include an operation as follows. If the high bit-depth identification information indicates that the current sequence is of a high bit depth, it is determined that range extension is applied to the current sequence.

In another possible implementation, when the third syntax element identification information is high bit-rate identification information, the method may further include an operation as follows. If the high bit-rate identification information indicates that the current sequence is of a high bit rate, it is determined that range extension is applied to the current sequence.

In yet another possible implementation, when the third syntax element identification information is high quality identification information, the method may further include an operation as follows. If the high quality identification information indicates that the current sequence is of high quality, it is determined that range extension is applied to the current sequence.

In yet another possible implementation, when the third syntax element identification information is lossless compression identification information, the method may further include an operation as follows. If the lossless compression identification information indicates that the current sequence is compressed losslessly, it is determined that range extension is applied to the current sequence.

Illustratively, taking the sequence level as an example, the third syntax element identification information may further be high bit-depth identification information (denoted by sps_high_bit_depth_flag) for indicating whether the current sequence is a high bit-depth sequence; or alternatively may be high bit-rate identification information (denoted by sps_high_bit_rate_flag) for indicating whether the current sequence is a high bit-rate sequence; or alternatively may be another identification information for indicating a high bit depth, a high bit rate, high quality, or lossless compression, which is not limited in any way in embodiments of the disclosure.

In embodiments of the disclosure, the first syntax element identification information, the second syntax element identification information, the third syntax element identification information, and the like may be sequence-level flags, or even higher-level flags, such as video usability information (VUI), supplemental enhancement information (SEI), and the like.

Further, last significant coefficient location reverse identification information may be denoted by reverse_last_sig_coeff_flag. The last significant coefficient location reverse identification information may be at least one of sequence-level identification information, picture-level identification information, slice-level identification information, or block-level identification information, or even identification information of a higher level (such as VUI, SEI, etc.), which is not limited in any way here.

That is, reverse_last_sig_coeff_flag may be a sequence-level flag or a higher-level flag, or may be a picture-level flag or a slice-level flag or a block-level flag, or a flag of another level. In addition, a block-level flag may include an LCU-level flag or a CTU-level flag or a CU-level flag, or another block-level flag, which is not limited in any way in embodiments of the disclosure.

In embodiments of the disclosure, sequence-level last significant coefficient location reverse identification information may be denoted by sps_reverse_last_sig_coeff_flag, and slice-level last significant coefficient location reverse identification information may be denoted by sh_reverse_last_sig_coeff_flag.

Further note that the slice-level last significant coefficient location reverse identification information may further be referred to as the component identification information of the current slice. In some embodiments, the operation that the component identification information of the current slice is determined may include operations as follows.

If last significant coefficient location reverse is applied to the component of the current slice, a value of the component identification information is determined to be a first value.

Alternatively, if last significant coefficient location reverse is not applied to the component of the current slice, the value of the component identification information is determined to be a second value.

Note that the first value and the second value may differ. The first value and the second value may be parametric or may be numerical. In a specific example, the first value is set to be 1, and the second value is set to be 0, which however is not limited in any way.

Take the first value being 1 and the second value being 0 as an example. If last significant coefficient location reverse is applied to the component of the current slice, i.e., last significant coefficient location reverse is applied to a current block corresponding to the component of the current slice, it may be determined that the value of the component identification information is 1. If last significant coefficient location reverse is not applied to the component of the current slice, i.e., last significant coefficient location reverse is not applied to the current block corresponding to the component of the current slice, either, it may be determined that the value of the component identification information is 0.

Further, the location of the last significant coefficient of the current block corresponding to the component of the current slice includes an initial horizontal coordinate and an initial vertical coordinate of the last significant coefficient. When the initial horizontal coordinate and the initial vertical coordinate are a horizontal distance and a vertical distance between the location of the last significant coefficient and a top left corner of the current block, respectively, the operation that the coordinate information of the last significant coefficient of the current block is determined according to the component identification information and the location of the last significant coefficient, may include an operation as follows.

If the value of the component identification is the first value, the coordinate information of the last significant coefficient is determined by performing calculation on the initial horizontal coordinate and the initial vertical coordinate of the last significant coefficient.

Alternatively, if the value of the component identification is the second value, the coordinate information of the last significant coefficient is determined directly according to the initial horizontal coordinate and the initial vertical coordinate of the last significant coefficient.

In other words, in some embodiments, the method may further include an operation as follows.

If the value of the component identification is the first value, the coordinate information of the last significant coefficient is determined to be a horizontal distance and a vertical distance between the location of the last significant coefficient and a bottom right corner of the current block.

Alternatively, if the value of the component identification is the second value, the coordinate information of the last significant coefficient is determined to be the horizontal distance and the vertical distance between the location of the last significant coefficient and the top left corner of the current block.

That is, the coordinate information of the last significant coefficient in general is the horizontal distance and the vertical distance between the location of the last significant coefficient and the top left corner of the current block. For a conventional video, most of significant coefficients are concentrated in the top left corner, and coefficients in a large region at the bottom right corner are 0. However, for high bit-depth, high quality, high bit-rate video encoding and decoding, a lot of significant coefficients may also appear in the bottom right corner, such that the coordinate information of the last significant coefficient has a large value. In this case, in order to save overhead, coordinate transform (specifically coordinate reverse, where after the coordinate reverse, the coordinate information of the last significant coefficient is the horizontal distance and the vertical distance between the location of the last significant coefficient and the bottom right corner of the current block) is to be performed in coefficient encoding. Accordingly, in subsequent coefficient decoding in a decoder, coordinate reverse is also to be performed. After the coordinate reverse is performed again, the coordinate information of the last significant coefficient may be recovered to be the horizontal distance and the vertical distance between the location of the last significant coefficient and the top left corner of the current block, thereby determining the location of the last significant coefficient.

Further, in some embodiments, the operation that the coordinate information of the last significant coefficient is determined by performing calculation on the initial horizontal coordinate and the initial vertical coordinate of the last significant coefficient, may include operations as follows.

A width and a height of the current block are determined.

A horizontal coordinate of the last significant coefficient is obtained by subtracting the initial horizontal coordinate of the last significant coefficient from the width of the current block;

A vertical coordinate of the last significant coefficient is obtained by subtracting the initial vertical coordinate of the last significant coefficient from the height of the current block.

The coordinate information of the last significant coefficient is determined according to the horizontal coordinate of the last significant coefficient and the vertical coordinate of the last significant coefficient.

Note that a current block corresponding to the component of the current slice may be a block on which no zero-out transform has been performed, or a block on which zero-out transform has been performed. Taking a block on which zero-out transform has been performed as an example, in this case, the width of the current block may be $1 <<\log 2ZoTbWidth$, and the height of the current block may be $1 <<\log 2ZoTbHeight$. Then in case that the component identification information indicates that last significant coefficient location reverse is applied, $$LastSignificantCoeffX = (1 <<\log 2ZoTbWidth) - 1 - LastSignificantCoeffX;$$

$$LastSignificantCoeffY = (1 <<\log 2ZoTbHeight) - 1 - LastSignificantCoeffY.$$

Herein, (LastSignificantCoeffX, LastSignificantCoeffY) at the right side of the formula may denote the coordinate information of the last significant coefficient determined directly (i.e., the initial horizontal coordinate and the initial vertical coordinate of the last significant coefficient). (LastSignificantCoeffX, LastSignificantCoeffY) at the left side of the formula may denote the coordinate information of the last significant coefficient obtained by coordinate reverse (i.e., the coordinate information of the last significant coefficient signalled into the bitstream in case that last significant coefficient location reverse is applied to the current block).

In some embodiments, the operation that the coordinate information of the last significant coefficient is signalled into the bitstream may include operations as follows.

Prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient are determined according to the coordinate information of the last significant coefficient.

The prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient are signalled into the bitstream.

Note that the prefix information of the horizontal coordinate of the last significant coefficient may be denoted by last_sig_coeff_x_prefix. The prefix information of the vertical coordinate of the last significant coefficient may be denoted by last_sig_coeff_y_prefix. The suffix information of the horizontal coordinate of the last significant coefficient may be denoted by last_sig_coeff_x_suffix. The suffix information of the vertical coordinate of the last significant coefficient may be denoted by last_sig_coeff_y_suffix. Then, last_sig_coeff_x_prefix, last_sig_coeff_x_suffix, last_sig_coeff_y_prefix, and last_sig_coeff_y_suffix may be signalled into the bitstream, such that the decoder determines the coordinate information of the last significant coefficient by parsing the bitstream.

In embodiments of the disclosure, the preset scanning order may be a diagonal scanning order, zigzag scanning order, horizontal scanning order, vertical scanning order, 4 g order scan a scanning order, etc., which is not limited in any way here.

In this way, in some cases, such as high bit-depth, high quality, high bit-rate, or lossless compression video encoding and decoding, embodiments of the disclosure provide a method for modifying a derivation mode of the location of a last significant coefficient. That is, in general, a method for coefficient encoding and decoding is still the same as an existing method in related art. In general, last_sig_coeff_x_prefix and last_sig_coeff_x_suffix may be configured to encode the abscissa of the location of the last significant coefficient, i.e., the horizontal distance to the top left corner of the current block; and last_sig_coeff_y_prefix and last_sig_coeffy_suffix may be configured to encode the ordinate of the location of the last significant coefficient, i.e., the vertical distance to the top left corner of the current block, as shown in FIG. 10A. In high bit-depth, high quality, high bit-rate, or lossless compression video encoding and decoding, the location of the last significant coefficient is generally close to the bottom right corner of a region including all possible nonzero coefficients in the current block. In this case, last_sig_coeff_x_prefix and last_sig_coeff_x_suffix may be configured to encode the horizontal distance between the location of the last significant coefficient and the bottom right corner of the region that includes all possible nonzero coefficients in the current block, and last_sig_coeff_y_prefix and last_sig_coeff_y_suffix may be configured to encode the vertical distance between the location of the last significant coefficient and the bottom right corner of the region that includes all possible nonzero coefficients in the current block, as shown in FIG. 10B. Therefore, in embodiments of the disclosure, reverse_last_sig_coeff_flag is introduced, thereby solving the problem of increased overhead caused by coding greater values in the bitstream.

Further, for each of colour components of the current slice, slice-level reverse_last_sig_coeff_flag (i.e., the component identification information sh_reverse_last_sig_coeff_flag of the current slice) may allow for separate control over whether last significant coefficient location reverse is applied to the colour component.

In embodiments of the disclosure, the component may include a first colour component, a second colour component, and a third colour component.

In a specific example, the first colour component is a luma component. The second colour component is a first chroma component. The third colour component is a second chroma component. The luma component may be denoted by Y The first chroma component may be denoted by U(Cb). The second chroma component may be denoted by V(Cr).

In another specific example, the first colour component is a red component, the second colour component is a green component, and the third colour component is a blue component. The red component may be denoted by R. The green component may be denoted by G. The blue component may be denoted by B.

Further, in some embodiments, when the component includes a first colour component, a second colour component, and a third colour component, the method may further include operations as follows.

It is determined whether the first colour component, the second colour component, and the third colour component of the current slice share component identification information based on a relation between properties of the first colour component, the second colour component, and the third colour component.

The number of pieces of component identification information of the current slice is determined according to a determination. The number of pieces of component identification information may be 1, 2, or 3.

Specifically, the operation that the number of pieces of component identification information is determined may include an operation as follows.

The number of pieces of component identification information of the current slice is determined to be 1 if one piece of component identification information is shared by the first colour component, the second colour component, and the third colour component of the current slice.

Alternatively, the number of pieces of component identification information of the current slice is determined to be 2 if one piece of component identification information is shared by two of the first colour component, the second colour component, and the third colour component of the current slice.

Alternatively, the number of pieces of component identification information of the current slice is determined to be 3 if each of the first colour component, the second colour component, and the third colour component of the current slice has a separate piece of component identification information.

In embodiments of the disclosure, as the properties of respective colour components may differ and some cross-component techniques are used, the respective colour components may not always be consistent in residual distribution. For example, in video encoding and decoding with a very high bit rate and a very high quality requirement, significant coefficients of different components may be similar in distribution, such as are all close to the bottom right corner of the region including possible significant coefficients. However, in some video encoding and decoding with a bit rate that is not particularly high and a quality requirement that is not particularly high, significant coefficients of different components may be different in distribution. For example, significant coefficients of the Y component are all close to the bottom right corner of the region including possible significant coefficients, and significant coefficients of the U/V component are distributed in just the top left corner. Alternatively, significant coefficients of the U component are also close to the bottom right corner, and significant coefficients of the V component are distributed in just the top left corner.

Therefore, in embodiments of the disclosure, one or more pieces of component identification information may be configured to control application of embodiments of the disclosure to different colour components. Illustratively, one piece of component identification information may be configured to control whether the method according to embodiments of the disclosure is applied to the three colour components. For example, one component identification may control whether the method according to embodiments of the disclosure is applied to the three colour components. Alternatively, two pieces of component identification information may be configured to control whether the method according to embodiments of the disclosure is applied to the three colour components. For example, one component identification may control application to the luma component, and the other component identification may control application to the two chroma components. Alternatively, three pieces of component identification information may be configured to control whether the method according to embodiments of the disclosure is applied to each of the three colour components. For example, the three colour components are R, G, and B in the RGB format; or Y, Cb, and Cr (or Y, U, and V) in the YUV format.

In a possible implementation, when the number of pieces of component identification information is 1, the operation that the component identification information of the current slice is determined may include that first component identification information of the current slice is determined.

Accordingly, the method may further include an operation as follows. If a value of the first component identification information is a first value, it is determined that last significant coefficient location reverse is applied to each of the first colour component, the second colour component, and the third colour component of the current slice. Alternatively, if the value of the first component identification information is a second value, it is determined that last significant coefficient location reverse is not applied to any of the first colour component, the second colour component, and the third colour component of the current slice.

In another possible implementation, when the number of pieces of component identification information is 2, the operation that the component identification information of the current slice is determined may include that second component identification information and third component identification information of the current slice are determined.

Accordingly, the method may further include an operation as follows. If a value of the second component identification information is a first value, it is determined that last significant coefficient location reverse is applied to each of two colour components of the first colour component, the second colour component, and the third colour component of the current slice. Alternatively, if the value of the second component identification information is a second value, it is determined that last significant coefficient location reverse is not applied to either of the two colour components of the first colour component, the second colour component, and the third colour component of the current slice.

If a value of the third component identification information is the first value, it is determined that last significant coefficient location reverse is applied to another colour component of the first colour component, the second colour component, and the third colour component of the current slice other than the two colour components. Alternatively, if the value of the third component identification information is the second value, it is determined that last significant coefficient location reverse is not applied to the another colour component of the first colour component, the second colour component, and the third colour component of the current slice other than the two colour components.

In yet another possible implementation, when the number of pieces of component identification information is 3, the operation that the component identification information of the current slice is determined may include that fourth component identification information, fifth component identification information, and sixth component identification information of the current slice are determined.

Accordingly, the method may further include an operation as follows. If a value of the fourth component identification information is a first value, it is determined that last significant coefficient location reverse is applied to the first colour component of the current slice. Alternatively, if the value of the fourth component identification information is a second value, it is determined that last significant coefficient location reverse is not applied to the first colour component of the current slice.

If a value of the fifth component identification information is the first value, it is determined that last significant coefficient location reverse is applied to the second colour component of the current slice. Alternatively, if the value of the fifth component identification information is the second value, it is determined that last significant coefficient location reverse is not applied to the second colour component of the current slice.

If a value of the sixth component identification information is the first value, it is determined that last significant coefficient location reverse is applied to the third colour component of the current slice. Alternatively, if the value of the sixth component identification information is the second value, it is determined that last significant coefficient location reverse is not applied to the third colour component of the current slice.

Note that the first value and the second value may differ. The first value and the second value may be parametric or may be numerical. In a specific example, the first value is set to be 1, and the second value is set to be 0, which however is not limited in any way.

Further note that the component identification information here may be a slice-level flag, and may be denoted by sh_reverse_last_sig_coeff_flag[cIdx]. cIdx may have the value of 0, 1, or 2. Specifically, when three pieces of component identification information are configured to control the three colour components respectively, the three pieces of component identification information may include sh_reverse_last_sig_coeff_flag[0], sh_reverse_last_sig_coeff_flag[1], and sh_reverse_last_sig_coeff_flag[2]. The fourth component identification information may be denoted by sh_reverse_last_sig_coeff_flag[0] for indicating whether last significant coefficient location reverse is applied to a current block corresponding to the first colour component of the current slice. The fifth component identification information may be denoted by sh_reverse_last_sig_coeff_flag [1] for indicating whether last significant coefficient location reverse is applied to a current block corresponding to the second colour component of the current slice. The sixth component identification information may be denoted by sh_reverse_last_sig_coeff_flag[2] for indicating whether last significant coefficient location reverse is applied to a current block corresponding to the third colour component of the current slice.

Illustratively, taking the YUV format as an example, three pieces of component identification information may be configured to control whether the method according to embodiments of the disclosure is applied to each of the three colour components. If sh_reverse_last_sig_coeff_flag[0] has the value of 1, it may be determined that last significant coefficient location reverse is applied to a block corresponding to the first colour component of the current slice (such as the Y component). If sh_reverse_last_sig_coeff_flag[1] has the value of 1, it may be determined that last significant coefficient location reverse is applied to a block corresponding to the second colour component of the current slice (such as the U component). If sh_reverse_last_sig_coeff_flag[2] has the value of 1, it may be determined that last significant coefficient location reverse is applied to a block corresponding to the third colour component of the current slice (such as the V component).

Further note that when the third syntax element identification information indicates that range extension is applied to the current sequence, all possible coefficients to be coded need to be coded by default. That is, the location of the last significant coefficient is no longer used. Instead, all possible nonzero coefficients in the current block are scanned in the preset scanning order. Therefore, in the embodiments of the disclosure may also introduce last coefficient enabled identification information for determining whether the last coefficient location is applied to the current block.

In some embodiments, when the third syntax element identification information indicates that range extension is applied to the current sequence, the method may further include operations as follows.

Last coefficient enabled identification information of the current block is determined.

When the last coefficient enabled identification information indicates that a last coefficient location is applied to the current block, all coefficients located above the last coefficient location are encoded in the preset scanning order. The last coefficient enabled identification information, video identification information, and bit information obtained through encoding are signalled into the bitstream.

Note that the last coefficient enabled identification information may be denoted by default_last_coeff_enabled_flag. In embodiments of the disclosure, the last coefficient enabled identification information may be at least one of sequence-level identification information, picture-level identification information, slice-level identification information, or block-level identification information, or even identification information of a higher level (such as VUI, SEI, etc.), which is not limited in any way here.

Further note that in some embodiments, the operation that the last coefficient enabled identification information of the current block is determined may include an operation as follows.

A value of the last coefficient enabled identification information is determined to be a first value if the last coefficient location is applied to the current block.

Alternatively, the value of the last coefficient enabled identification information is determined to be a second value if the last coefficient location is not applied to the current block.

That is to say, take the first value being 1 and the second value being 0 as an example. If it is determined that the last coefficient location is applied to the current block, default_last_coeff_enabled_flag has the value of 1. Alternatively, if it is determined that the last coefficient location is not applied to the current block, default_last_coeff_enabled_flag has the value of 0.

Further, in some embodiments, the last coefficient location is a bottom right corner of a matrix formed by all possible nonzero coefficients within the current block. Alternatively, the last coefficient location is a last location of all possible nonzero coefficients in the preset scanning order within the current block.

Note that in embodiments of the disclosure, the last coefficient location does not represent the location of the last significant coefficient. This is because a coefficient on the last coefficient location may be 0, while a coefficient on the location of the last significant coefficient is not 0 for certain.

In a specific example, the method may further include an operation as follows. The location of the last significant coefficient is set at the last coefficient location.

That is, in embodiments of the disclosure, the location of the last significant coefficient may still be used. In this case, the location of the last significant coefficient needs to be placed at the last location of all possible nonzero coefficients in the preset scanning order within the current block.

Further, the last coefficient location may be denoted by (LastCoeffX, LastCoeffY), i.e., the last location of all possible nonzero coefficients in the preset scanning order within the current block. In some embodiments, the method may further include operations as follows.

A width and a height of a transform block obtained by performing a preset operation on the current block are determined.

Coordinate information of a bottom right corner of the transform block is calculated according to the width and the height of the transform block.

The last coefficient location is determined according to the coordinate information of the bottom right corner of the transform block.

Here, the preset operation includes at least a zero-out operation.

Note that (LastCoeffX, LastCoeffY) may denote the coordinate information of the bottom right corner of the transform block obtained after zero-out. (LastCoeffX, LastCoeffY) may be derived as follows.

$$LastCoeffX = (1 \ll log2ZoTbWidth) - 1.$$

$$LastCoeffY = (1 \ll log2ZoTbHeight) - 1.$$

Accordingly, the last coefficient location may be determined according to (LastCoeffX, LastCoeffY), if default_last_coeff_enabled_flag has the value of 1.

In a specific example, the location of the last significant coefficient is still used. In this case, the location of the last significant coefficient may be placed at the last location of all possible nonzero coefficients in the preset scanning order within the current block. In some embodiments, the method may further include an operation as follows.

When the location of the last significant coefficient is set at the last coefficient location, the location of the last significant coefficient is determined according to the coordinate information of the bottom right corner of the transform block.

That is, the location of the last significant coefficient may be denoted by (LastSignificantCoeffX, LastSignificantCoeffY). (LastSignificantCoeffX, LastSignificantCoeffY) may be derived as follows.

$$LastSignificantCoeffX = (1 \ll log2ZoTbWidth) - 1.$$

$$LastSignificantCoeffY = (1 \ll log2ZoTbHeight) - 1.$$

Herein, (LastSignificantCoeffX, LastSignificantCoeffY) may denote the coordinate information of the bottom right corner of the transform block obtained after zero-out. The location of the last significant coefficient may be determined according to (LastSignificantCoeffX, LastSignificantCoeffY), if default_last_coeff_enabled_flag has the value of 1.

Further, when the last coefficient enabled identification information indicates that the last coefficient location is not applied to the current block, i.e., the last coefficient enabled identification information has the value of 0, in some embodiments, the method may further include operations as follows.

Prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient are determined.

The location of the last significant coefficient is determined according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient;

All the coefficients located above the location of the last significant coefficient are encoded in the preset scanning order. The prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient are signalled into the bitstream.

Note that if the last coefficient location is not applied to the current block, the location of the last significant coefficient needs to be determined. Specifically, last_sig_coeff_x_prefix, last_sig_coeff_x_suffix, last_sig_coeff_y_prefix, and last_sig_coeff_y_suffix need to be determined, and signalled into the bitstream.

In this way, in some cases, such as high bit-depth, high quality, high bit-rate, or lossless compression video encoding and decoding, all possible coefficients to be coded need to be coded by default in coefficient coding. In general, a method for coefficient encoding and decoding is still the same as an existing method in related art. All possible coefficients to be coded need to be coded by default, that is, the location of the last significant coefficient is no longer used, instead all possible nonzero coefficients in the current block are scanned in the preset scanning order. In other words, the location of the last coefficient to be coded is put at the last location of all possible nonzero coefficients in the preset scanning order within the current block. This location usually may refer to the bottom right corner of the matrix composed of all possible nonzero coefficients in the current block. Therefore, in embodiments of the disclosure, default_last_coeff_enabled_flag is introduced, thereby reducing or even eliminating syntax elements associated with the location of the last significant coefficient, saving overhead, avoiding waste.

Further, for each colour component of the current slice, default last coefficient enabled identification information (i.e., sh_default_last_coeff_enabled_flag) of the current slice may allow for separate control over whether the default last coefficient is applied to the colour component.

Specifically, the default last coefficient enabled identification information of the current slice may also be denoted by sh_default_last_coeff_enabled_flag[cIdx]. cIdx may have the value of 0, 1, or 2. Specifically, when three pieces of component identification information are configured to control the three colour components respectively, the three pieces of component identification information may include sh_default_last_coeff_enabled_flag[0], sh_default_last_coeff_enabled_flag[1], and sh_default_last_coeff_enabled_flag[2]. sh_default_last_coeff_enabled_flag[0] may indicate whether the default last coefficient is applied to a current block corresponding to the first colour component of the current slice. sh_default_last_coeff_enabled_flag[1] may indicate whether the default last coefficient is applied to a current block corresponding to the second colour component of the current slice. sh_default_last_coeff_enabled_flag[2] may indicate whether the default last coefficient is applied to a current block corresponding to the third colour component of the current slice.

Here, in embodiments of the disclosure, one or more pieces of component identification information may also be configured to control application of embodiments of the disclosure to different colour components. Illustratively, one piece of component identification information may be configured to control whether the method according to embodiments of the disclosure is applied to the three colour components. Alternatively, two pieces of component identification information may be configured to control whether the method according to embodiments of the disclosure is applied to the three colour components. Alternatively, three pieces of component identification information may be configured to control whether the method according to embodiments of the disclosure is applied to each of the three colour components.

Illustratively, taking the YUV format as an example, three pieces of component identification information may be configured to control whether the method according to embodiments of the disclosure is applied to each of the three colour components. If sh_default_last_coeff_enabled_flag[0] has the value of 1, it may be determined that the default last coefficient is applied to a block corresponding to the first colour component of the current slice (such as the Y component). If sh_default_last_coeff_enabled_flag[1] has the value of 1, it may be determined that the default last coefficient is applied to a block corresponding to the second colour component of the current slice (such as the U component). If sh_default_last_coeff_enabled_flag[2] has the value of 1, it may be determined that the default last coefficient is applied to a block corresponding to the third colour component of the current slice (such as the V component).

Further note that when the third syntax element identification information indicates that range extension is applied to the current sequence, sub-blocks scanned need to be coded by default. In this case, sb_coded_flag does not need to be signalled into the bitstream. That is, neither the encoder nor the decoder needs to process this flag, thereby accelerating encoding and decoding. Therefore, the embodiments of the disclosure may further introduce sub-block default coded identification information for determining whether a sub-block to be encoded in the current block is coded by default.

In some embodiments, when the third syntax element identification information indicates that range extension is applied to the current sequence, the method may further include operations as follows.

Sub-block default coded identification information of a sub-block to be encoded in the current block is determined.

When the sub-block default coded identification information indicates that the sub-block to be encoded is coded by default, all coefficients in the sub-block to be encoded are encoded. The sub-block default coded identification information, and bit information obtained through encoding, are signalled into the bitstream.

Note that the sub-block default coded identification information may be denoted by default_sb_coded_flag. In embodiments of the disclosure, the sub-block default coded identification information is at least one of sequence-level identification information, picture-level identification information, slice-level identification information, or block-level identification information, or even identification information of a higher level (such as VUI, SEI, etc.), which is not limited in any way here.

Further note that in some embodiments, the operation that the sub-block default coded identification information of the sub-block to be encoded is determined may include an operation as follows. A value of the sub-block default coded identification information is determined to be a first value if the sub-block to be encoded is coded by default. Alternatively, the value of the sub-block default coded identification information is determined to be a second value if the sub-block to be encoded is not coded by default.

Accordingly, taking the first value being 1 and the second value being 0 as an example, default_sb_coded_flag has the value of 1, if it is determined that the sub-block to be encoded is to be coded by default. Alternatively, default_sb_coded_flag has the value of 0, if it is determined that the sub-block to be encoded is not to be coded by default.

When the sub-block to be encoded is to be coded by default, default_sb_coded_flag has the value of 1, meaning that sb_coded_flag has the value of 1, i.e., sb_coded_flag does not need to be encoded. However, when the sub-block to be encoded is not to be coded by default, i.e., the sub-block default coded identification information indicates that the sub-block to be encoded is not to be coded by default, in some embodiments, the method may further include an operation as follows. Sub-block coded identification information of the sub-block to be encoded is determined, and the sub-block coded identification information is signalled into the bitstream.

Further, in some embodiments, the operation that the sub-block coded identification information of the sub-block to be encoded is determined may include an operation as follows. A value of the sub-block coded identification information is determined to be a first value, if coding is required for the sub-block to be encoded. Alternatively, the value of the sub-block coded identification information is determined to be a second value, if coefficients in the sub-block to be encoded are all zero.

In embodiments of the disclosure, the sub-block coded identification information may be denoted by sb_coded_flag. Take the first value being 1 and the second value being 0 as an example. If it is determined that the sub-block to be encoded needs to be coded, it means that the sub-block to be encoded includes significant coefficients to be encoded. In this case, sb_coded_flag has the value of 1. Alternatively, if it is determined that the sub-block to be encoded does not need to be coded, it means that coefficients in the sub-block to be encoded are all zero. In this case, sb_coded_flag has the value of 0.

In this way, for a certain situation, in coefficient coding, sub-blocks scanned need to be coded by default or sub-blocks scanned include significant coefficients by default. In general, a method for coefficient coding is still the same as an existing method in related art. The certain situation may be, for example, high bit-depth, high quality, high bit-rate, or lossless compression video encoding and decoding. In this situation, there are a lot of significant coefficients, and almost all of sub-blocks scanned need to be coded or almost all of sub-blocks scanned include significant coefficients. In this case, sb_coded_flag does not need to be signalled into the bitstream. Thus, the encoder does not need to process this flag, thereby accelerating encoding and decoding. Removal of an almost nonexistent flag further improves compression performance.

Further, each colour component of the current slice, sub-block default coded identification information (i.e., sh_default_sb_coded_flag) of the current slice may allow for separate control over whether sub-block-by-default-coded is applied to the colour component.

Specifically, the sub-block default coded identification information of the current slice may also be denoted by sh_default_sb_coded_flag[cIdx]. cIdx may have the value of 0, 1, or 2. Specifically, when three pieces of component identification information are configured to control the three colour components respectively, the three pieces of component identification information may include sh_default_sb_coded_flag[0], sh_default_sb_coded_flag[1], and sh_default_sb_coded_flag[2]. sh_default_sb_coded_flag[0] may indicate whether a sub-block of a current block corresponding to the first colour component of the current slice is by default coded. sh_default_sb_coded_flag[1] may indicate whether a sub-block of a current block corresponding to the second colour component of the current slice is by default coded. sh_default_sb_coded_flag[2] may indicate whether a sub-block of a current block corresponding to the third colour component of the current slice is by default coded.

Here, in embodiments of the disclosure, one or more pieces of component identification information may also be configured to control application of embodiments of the disclosure to different colour components. Illustratively, one piece of component identification information may be configured to control whether the method according to embodiments of the disclosure is applied to the three colour components. Alternatively, two pieces of component identification information may be configured to control whether the method according to embodiments of the disclosure is applied to the three colour components. Alternatively, three pieces of component identification information may be configured to control whether the method according to embodiments of the disclosure is applied to each of the three colour components.

In a specific example, taking the YUV format as an example, three pieces of component identification information may be configured to control whether the method according to embodiments of the disclosure is applied to each of the three colour components. If sh_default_sb_coded_flag[0] has the value of 1, it may be determined that a sub-block of a block corresponding to the first colour component of the current slice (such as the Y component) is by default coded. If sh_default_sb_coded_flag[1] has the value of 1, it may be determined that a sub-block of a block corresponding to the second colour component of the current slice (such as the U component) is by default coded. If sh_default_sb_coded_flag[2] has the value of 1, it may be determined that a sub-block of a block corresponding to the third colour component of the current slice (such as the V component) is by default coded.

In short, for all colour components in a video, one piece of identification information may be adopted to all the colour components to use the method according to embodiments of the disclosure. Alternatively, different pieces of identification information may be adopted to separately control the respective colour components to use the method according to embodiments of the disclosure. Alternatively, two pieces of identification information may be adopted to control all the colour components to use the method according to embodiments of the disclosure. That is to say, more than one piece of identification information may be adopted to control different colour components to use the method according to embodiments of the disclosure. Herein, all the colour components may be R, G, and B of a video of an RGB format, or Y, U, and V (Y, Cb, and Cr) of a video of a YUV format, or the like.

The disclosure further provides an encoding method, performed by an encoder. In the method, component identification information of a current slice, and a location of a last significant coefficient of a current block corresponding to a component of the current slice, are determined. Coordinate information of the last significant coefficient of the current block is determined according to the component identification information and the location of the last significant coefficient. Coefficients located above the location of the last significant coefficient are encoded in a preset scanning order. Bit information obtained through encoding, the component identification information, and the coordinate information of the last significant coefficient are signalled into a bitstream. In this way, in a scenario of high bit-depth, high bit-rate, high quality, or lossless video encoding and decoding, a reasonable deriving mode of the last significant coefficient is set according to a law of distribution of significant coefficients, reducing an overhead brought about by coding in the bitstream, improving compression efficiency. In addition, as respective colour components may be different in distribution of significant coefficients, it is also possible to refinedly control a respective deriving mode of the last significant coefficient for each colour component, i.e., separately controlling whether last significant coefficient location reverse technology is applied to each colour component, thereby further improving compression efficiency.

In yet another embodiment of the disclosure, embodiments of the disclosure provide a bitstream. The bitstream may be generated by performing bit coding on to-be-encoded information. The to-be-encoded information includes at least one of first syntax element identification information, second syntax element identification information, third syntax element identification information, component identification information, last coefficient enabled identification information, or sub-block default coded identification information.

The first syntax element identification information indicates whether last significant coefficient location reverse is enabled for a current sequence. The second syntax element identification information indicates whether a standard extension release is applied to the current sequence. The third syntax element identification information indicates whether range extension is applied to the current sequence. The component identification information indicates whether last significant coefficient location reverse is applied to a component of a current slice. The last coefficient enabled identification information indicates whether a last coefficient location is applied to a current block. The sub-block default coded identification information indicates whether a sub-block to be encoded in the current block is coded by default. The current sequence includes the current slice. The current slice includes the current block.

Embodiments of the disclosure further provide a coding system. The coding system may include an encoder and a decoder. The encoder generates a bitstream, and transmits the bitstream to the decoder, such that the decoder parse the bitstream to obtain relevant decoded information, such as first syntax element identification information, second syntax element identification information, third syntax element identification information, component identification information, last coefficient enabled identification information, sub-block default coded identification information, coordinate information of a last significant coefficient of a current block, and the like.

Figure 12:
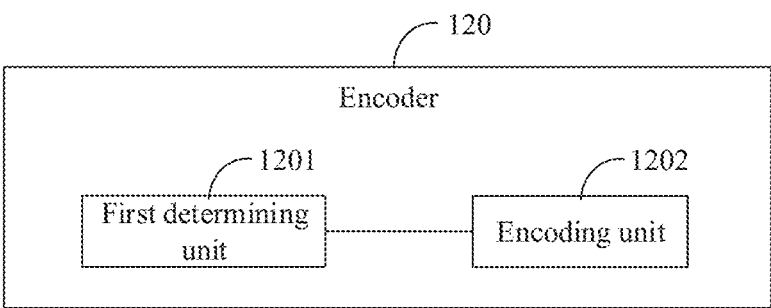
FIG. 12 is a diagram of a structure of an encoder according to embodiments of the disclosure.

In yet another embodiment of the disclosure, based on inventive concepts same as that of the foregoing embodiments, FIG. 12 is a diagram of a structure of an encoder 120 according to embodiments of the disclosure. As shown in FIG. 12, the encoder 120 includes a first determining unit 1201 and an encoding unit 1202.

The first determining unit 1201 is configured to determine component identification information of a current slice, and a location of a last significant coefficient of a current block corresponding to a component of the current slice.

The first determining unit 1201 is further configured to determine coordinate information of the last significant coefficient of the current block according to the component identification information and the location of the last significant coefficient.

The encoding unit 1202 is configured to encode coefficients located above the location of the last significant coefficient in a preset scanning order, and signal, into a bitstream, bit information obtained through encoding, the component identification information, and the coordinate information of the last significant coefficient.

In some embodiments, the first determining unit 1201 is further configured to determine first syntax element identification information, and determine the component identification information of the current slice in response to the first syntax element identification information indicating that last significant coefficient location reverse is enabled for a current sequence. The current sequence includes the current slice.

In some embodiments, the first determining unit 1201 is further configured to determine second syntax element identification information, determine third syntax element identification information in response to the second syntax element identification information indicating that a standard extension release is applied to the current sequence, and determine the first syntax element identification information in response to the third syntax element identification information indicating that range extension is applied to the current sequence.

In some embodiments, the first determining unit 1201 is further configured to, in response to the standard extension release being applied to the current sequence, determine a value of the second syntax element identification information to be a first value; or, in response to the standard extension release not being applied to the current sequence, determine the value of the second syntax element identification information to be a second value.

In some embodiments, the encoding unit 1202 is further configured to signal the second syntax element identification information into the bitstream.

In some embodiments, the first determining unit 1201 is further configured to, in response to range extension being applied to the current sequence, determine a value of the third syntax element identification information to be a first value; or, in response to range extension not being applied to the current sequence, determine the value of the third syntax element identification information to be a second value.

In some embodiments, the encoding unit 1202 is further configured to signal the third syntax element identification information into the bitstream.

In some embodiments, the range extension being applied to the current sequence includes that the current sequence is of at least one of a high bit depth, high quality, a high bit rate, a high frame rate, or lossless compression.

In some embodiments, the first determining unit 1201 is further configured to, in response to last significant coefficient location reverse being enabled for the current sequence, determine a value of the first syntax element identification information to be a first value; or, in response to last significant coefficient location reverse being disabled for the current sequence, determine the value of the first syntax element identification information to be a second value.

In some embodiments, the encoding unit 1202 is further configured to signal the first syntax element identification information into the bitstream.

In some embodiments, the first determining unit 1201 is further configured to, in response to last significant coefficient location reverse being applied to the component of the current slice, determine a value of the component identification information to be a first value; or, in response to last significant coefficient location reverse not being applied to the component of the current slice, determine the value of the component identification information to be a second value.

In some embodiments, the component includes at least one of a first colour component, a second colour component, or a third colour component.

The first colour component is a luma component, the second colour component is a first chroma component, and the third colour component is a second chroma component.

Alternatively, the first colour component is a red component, the second colour component is a green component, and the third colour component is a blue component.

In some embodiments, the first determining unit 1201 is further configured to, when the component includes the first colour component, the second colour component, and the third colour component, determine a number of pieces of component identification information of the current slice to be 1 in response to one piece of component identification information being shared by the first colour component, the second colour component, and the third colour component of the current slice; or determine the number of pieces of component identification information of the current slice to be 2 in response to one piece of component identification information being shared by two colour components of the first colour component, the second colour component, and the third colour component of the current slice; or determine the number of pieces of component identification information of the current slice to be 3 in response to each of the first colour component, the second colour component, and the third colour component of the current slice having a separate piece of component identification information.

In some embodiments, the first determining unit 1201 is further configured to determine first component identification information of the current slice.

Accordingly, the first determining unit 1201 is further configured to determine a value of the first component identification information to be a first value in response to that last significant coefficient location reverse is applied to each of the first colour component, the second colour component, and the third colour component of the current slice.

In some embodiments, the first determining unit 1201 is further configured to determine second component identification information and third component identification information of the current slice.

Accordingly, the first determining unit 1201 is further configured to determine a value of the second component identification information to be a first value in response to that last significant coefficient location reverse is applied to each of two colour components of the first colour component, the second colour component, and the third colour component of the current slice; and determine a value of the third component identification information to be the first value in response to that last significant coefficient location reverse is applied to another colour component other than the two colour components of the first colour component, the second colour component, and the third colour component of the current slice.

In some embodiments, the first determining unit 1201 is further configured to determine fourth component identification information, fifth component identification information, and sixth component identification information of the current slice.

Accordingly, the first determining unit 1201 is further configured to determine a value of the fourth component identification information to be a first value in response to that last significant coefficient location reverse is applied to the first colour component of the current slice; determine a value of the fifth component identification information to be the first value in response to that last significant coefficient location reverse is applied to the second colour component of the current slice; and determine a value of the sixth component identification information to be the first value in response to that last significant coefficient location reverse is applied to the third colour component of the current slice.

In some embodiments, the location of the last significant coefficient includes an initial horizontal coordinate and an initial vertical coordinate of the last significant coefficient. The initial horizontal coordinate and the initial vertical coordinate are a horizontal distance and a vertical distance between the location of the last significant coefficient and a top left corner of the current block, respectively.

Accordingly, the first determining unit 1201 is further configured to, in response to the value of the component identification information being the first value, determine the coordinate information of the last significant coefficient by performing calculation on the initial horizontal coordinate and the initial vertical coordinate of the last significant coefficient; or, in response to the value of the component identification information being the second value, determine the coordinate information of the last significant coefficient directly according to the initial horizontal coordinate and the initial vertical coordinate of the last significant coefficient.

In some embodiments, the first determining unit 1201 is further configured to determine a width and a height of the current block; obtain a horizontal coordinate of the last significant coefficient by subtracting the initial horizontal coordinate of the last significant coefficient from the width of the current block; obtain a vertical coordinate of the last significant coefficient by subtracting the initial vertical coordinate of the last significant coefficient from the height of the current block; and determine the coordinate information of the last significant coefficient according to the horizontal coordinate of the last significant coefficient and the vertical coordinate of the last significant coefficient.

In some embodiments, the first determining unit 1201 is further configured to, in response to the value of the component identification information being the first value, determine the coordinate information of the last significant coefficient to be a horizontal distance and a vertical distance between the location of the last significant coefficient and a bottom right corner of the current block; or, in response to the value of the component identification information being the second value, determine the coordinate information of the last significant coefficient to be the horizontal distance and the vertical distance between the location of the last significant coefficient and the top left corner of the current block.

In some embodiments, the first determining unit 1201 is further configured to determine prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient according to the coordinate information of the last significant coefficient.

The encoding unit 1202 is further configured to signal the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into the bitstream.

In some embodiments, the first determining unit 1201 is further configured to determine last coefficient enabled identification information of the current block in response to the third syntax element identification information indicating that range extension is applied to the current sequence.

The encoding unit 1202 is further configured to, in response to the last coefficient enabled identification information indicating that a last coefficient location is applied to the current block, encode coefficients located above the last coefficient location in the preset scanning order, and signal bit information obtained through encoding and the last coefficient enabled identification information into the bitstream.

In some embodiments, the first determining unit 1201 is further configured to determine a value of the last coefficient enabled identification information to be a first value in response to that the last coefficient location is applied to the current block; or determine the value of the last coefficient enabled identification information to be a second value in response to that the last coefficient location is not applied to the current block.

In some embodiments, the last coefficient location is a bottom right corner of a matrix composed of all possible nonzero coefficients within the current block. Alternatively, the last coefficient location is a last location of all possible nonzero coefficients in the preset scanning order within the current block.

In some embodiments, the first determining unit 1201 is further configured to set the location of the last significant coefficient at the last coefficient location.

In some embodiments, the first determining unit 1201 is further configured to determine a width and a height of a transform block obtained by performing a preset operation on the current block; calculate coordinate information of a bottom right corner of the transform block according to the width and the height of the transform block; and determine the last coefficient location according to the coordinate information of the bottom right corner of the transform block.

In some embodiments, the preset operation includes at least a zero-out operation.

In some embodiments, the first determining unit 1201 is further configured to, in response to setting the location of the last significant coefficient at the last coefficient location, determine the location of the last significant coefficient according to the coordinate information of the bottom right corner of the transform block.

In some embodiments, the first determining unit 1201 is further configured to, in response to that the last coefficient enabled identification information indicates that the last coefficient location is not applied to the current block, determine prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient; and determine the location of the last significant coefficient according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient.

The encoding unit 1202 is further configured to encode the coefficients located above the location of the last significant coefficient in the preset scanning order, and signal the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into the bitstream.

In some embodiments, the first determining unit 1201 is further configured to determine sub-block default coded identification information of a sub-block to be encoded in the current block, in response to third syntax element identification information indicating that range extension is applied to a current sequence.

The encoding unit 1202 is further configured to, in response to the sub-block default coded identification information indicating that the sub-block to be encoded is coded by default, encode coefficients in the sub-block to be encoded, and signal the sub-block default coded identification information and bit information obtained through encoding into the bitstream.

In some embodiments, the first determining unit 1201 is further configured to determine sub-block coded identification information of the sub-block to be encoded in response to the sub-block default coded identification information indicating that the sub-block to be encoded is not by default coded.

The encoding unit 1202 is further configured to signal the sub-block coded identification information into the bitstream.

In some embodiments, the first determining unit 1201 is further configured to determine a value of the sub-block default coded identification information to be a first value in response to that the sub-block to be encoded is coded by default, or determine the value of the sub-block default coded identification information to be a second value in response to that the sub-block to be encoded is not by default coded.

In some embodiments, the first determining unit 1201 is further configured to determine a value of the sub-block coded identification information to be the first value in response to that the sub-block to be encoded is to be coded, or determine the value of the sub-block coded identification information to be the second value in response to that coefficients in the sub-block to be encoded are all zero.

In some embodiments, the first value is 1, and the second value is 0.

Understandably, in embodiments of the disclosure, a "unit" may be a part of a circuit, a part of a processor, a part of a program or software, and/or the like. Of course, a unit may be a module, or may be non-modularized. In addition, components in the embodiments may be integrated in one processing part, or exist as separate physical units respectively. Alternatively, two or more units may be integrated in one unit. The integrated unit may be implemented in form of hardware or software functional unit(s).

When implemented in form of a software functional module and sold or used as an independent product, an integrated module herein may also be stored in a computer-readable storage medium. Based on such an understanding, the essential part or a part contributing to prior art of the technical solution of an embodiment of the disclosure, or all or part of the technical solution, may appear in form of a software product, which software product is stored in storage media, and includes a number of instructions for allowing a computer device (such as a personal computer, a server, a network device, and/or the like) or a processor to execute all or part of the method in embodiments of the disclosure. The storage media include various media that can store program codes, such as a U disk, a mobile hard disk, read only memory (ROM), random access memory (RAM), a magnetic disk, a CD, and/or the like.

Therefore, embodiments of the disclosure provide a computer storage medium, implemented at the encoder 120. The computer storage medium stores thereon a computer program which, when executed by the first processor, implements the method according to any foregoing embodiment.

Figure 13:
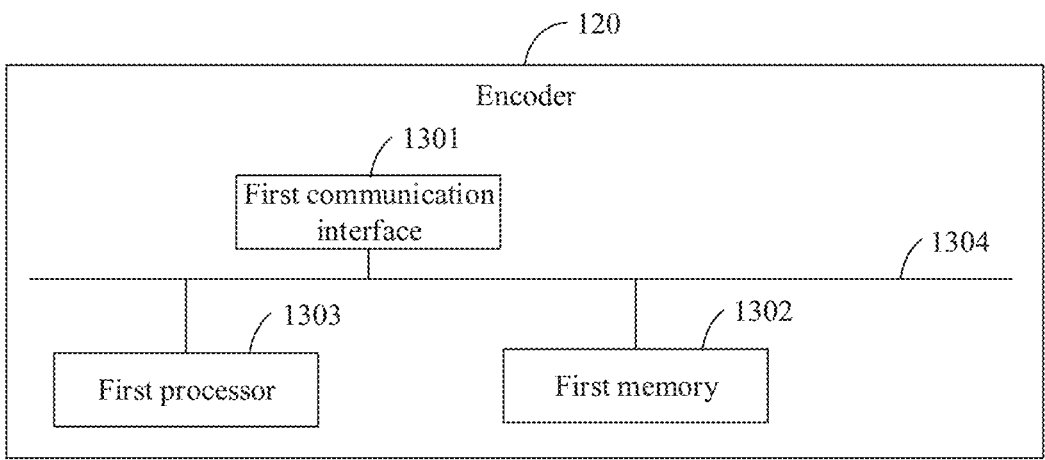
FIG. 13 is a diagram of a hardware structure of an encoder according to embodiments of the disclosure.

Based on the composition of the encoder 120 and the computer storage medium, FIG. 13 is a diagram of a hardware structure of the encoder 120 according to embodiments of the disclosure. As shown in FIG. 13, the encoder may include a first communication interface 1301, a first memory 1302, and a first processor 1303. Various components may be coupled together through a first bus equipment 1304. Understandably, the first bus equipment 1304 is configured to implement connection and communication among these components. In addition to a data bus, the first bus equipment 1304 may further include a power bus, a control bus, and a status signal bus. However, for clarity of description, various buses are marked as the first bus equipment 1304 in FIG. 13.

The first communication interface 1301 may be configured to perform signal sending and receiving while performing information sending and receiving with another external network element.

The first memory 1302 is configured to store thereon a computer program executable on the first processor 1303.

The first processor 1303 is configured to execute the computer program to perform the following operations.

Component identification information of a current slice, and a location of a last significant coefficient of a current block corresponding to a component of the current slice are determined.

Coordinate information of the last significant coefficient of the current block is determined according to the component identification information and the location of the last significant coefficient.

Coefficients located above the location of the last significant coefficient are encoded in a preset scanning order; and bit information obtained through encoding, the component identification information, and the coordinate information of the last significant coefficient are signalled into a bitstream.

Understandably, the first memory 1302 according to embodiments of the disclosure may be a volatile and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be random access memory (RAM) serving as an external cache. By way of illustrative instead of restrictive description, there may be many forms of RAM available, such as static random access memory (SRAM), dynamic random access memory (DRAM), synchronous dynamic random access memory (SDRAM), double data rate synchronous dynamic random access memory (DDRS-DRAM), enhanced synchronous dynamic random access memory (ESDRAM), synclink dynamic random access memory (synchlink DRAM, SLDRAM), direct rambus random access memory (DRRAM), and the like. The first memory 1302 used in systems and methods according to the disclosure is intended to include, but is not limited to, these and any other memory of suitable types.

The first processor 1303 may be an integrated circuit chip capable of signal processing. In implementation, operations of a method embodiment herein may be carried out via an integrated logic circuit of hardware in the first processor 1303 or instructions in form of software. The first processor 1303 may be a general-purpose processor, a digital signal processor (DSP), an application specific integrated circuit (ASIC), a field programmable gate array (FPGA), or another programmable logic device, a discrete gate, or a transistor logic device, a discrete hardware component, and the like. The first processor may implement or execute various methods, operations, and logical block diagrams according to embodiments of the disclosure. A general-purpose processor may be a microprocessor or any conventional processor. The operations of the method described in embodiments of the disclosure may be directly embodied as being carried out by a hardware coding processor, or by a combination of hardware and software modules in the coding processor. A software module may be located in a mature storage medium in the art, such as a random access memory (RAM), a flash memory, a read only memory (ROM), a programmable read-only memory (PROM), an electrically rewritable programmable memory, a register, and the like. The storage medium may be located in the first memory 1302. The first processor 1303 may read information in the first memory 1302, and perform the operation of the method herein through hardware of the processor.

Understandably, the embodiments according to the disclosure may be implemented by hardware, software, firmware, middleware, a microcode, or a combination of the listed items. For hardware implementation, the processing unit may be implemented in one or more application specific integrated circuits (ASICs), DSPs, digital signal processing devices (DSPDs), programmable logic devices (PLDs), field-programmable gate arrays (FPGAs), general-purpose processors, controllers, micro controller units (MCUs), microprocessors, and other electronic units for implementing the function of the disclosure, or a combination thereof. For software implementation, technology according to the disclosure may be implemented by a module, such as a process, a function, etc., that implements the function of the disclosure. A software code may be stored in the memory and executed by the processor. The memory may be implemented internal or external to the processor.

Alternatively, as another embodiment, the first processor 1303 may further be configured to execute the method according to the embodiment above when executing the computer program.

The embodiment provides an encoder. The encoder may include the first determining unit and the encoding unit.

Accordingly, in a scenario of high bit-depth, high bit-rate, high quality, or lossless video encoding and decoding, a reasonable deriving mode of the last significant coefficient is set according to a law of distribution of significant coefficients, thereby reducing an overhead brought about by encoding in the bitstream, and improving compression efficiency. In addition, as respective colour components may be different in distribution of significant coefficients, it is possible to refinedly control a respective deriving mode of the last significant coefficient for each colour component, i.e., separately controlling whether last significant coefficient location reverse technology is applied to each colour component, thereby further improving compression efficiency.

Figure 14:
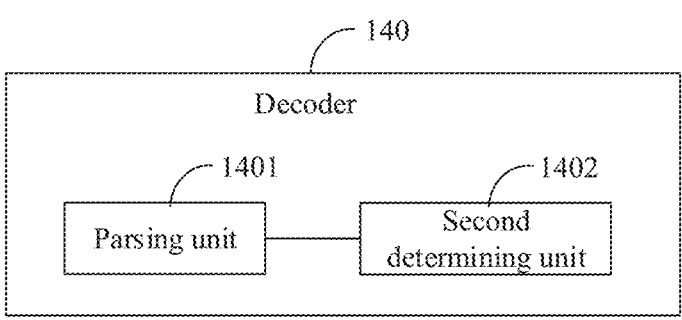
FIG. 14 is a diagram of a structure of a decoder according to embodiments of the disclosure.

In yet another embodiment of the disclosure, based on inventive concepts same as that of the foregoing embodiments, FIG. 14 is a diagram of a structure of a decoder 140 according to embodiments of the disclosure. As shown in FIG. 14, the decoder 140 may include a parsing unit 1401 and a second determining unit 1402.

The parsing unit 1401 is configured to determine, by parsing a bitstream, component identification information of a current slice, and coordinate information of a last significant coefficient of a current block corresponding to a component of the current slice.

The second determining unit 1402 is configured to, in response to the component identification information indicating that last significant coefficient location reverse is applied to the component of the current slice, obtain a location of the last significant coefficient of the current block by performing calculation on the coordinate information of the last significant coefficient.

The parsing unit 1401 is further configured to determine coefficients of the current block by decoding coefficients located above the location of the last significant coefficient in a preset scanning order.

In some embodiments, the parsing unit 1401 is further configured to determine first syntax element identification information by parsing the bitstream.

The second determining unit 1402 is further configured to determine the component identification information of the current slice by parsing the bitstream in response to the first syntax element identification information indicating that last significant coefficient location reverse is enabled for a current sequence. The current sequence may include the current slice.

In some embodiments, the parsing unit 1401 is further configured to determine second syntax element identification information by parsing the bitstream; determine third syntax element identification information by parsing the bitstream in response to the second syntax element identification information indicating that a standard extension release is applied to the current sequence; and determine the first syntax element identification information by parsing the bitstream in response to the third syntax element identification information indicating that range extension is applied to the current sequence.

In some embodiments, the second determining unit 1402 is further configured to determine that the second syntax element identification information indicates that the standard extension release is applied to the current sequence in response to a value of the second syntax element identification information being a first value; or determine that the second syntax element identification information indicates that the standard extension release is not applied to the current sequence in response to the value of the second syntax element identification information being a second value.

In some embodiments, the second determining unit 1402 is further configured to determine that the third syntax element identification information indicates that range extension is applied to the current sequence in response to a value of the third syntax element identification information being a first value; or, determine that the third syntax element identification information indicates that range extension is not applied to the current sequence in response to the value of the third syntax element identification information being a second value.

In some embodiments, range extension being applied to the current sequence may include that the current sequence is of at least one of a high bit depth, high quality, a high bit rate, a high frame rate, or lossless compression.

In some embodiments, the second determining unit 1402 is further configured to determine that the first syntax element identification information indicates that last significant coefficient location reverse is enabled for the current sequence in response to a value of the first syntax element identification information being a first value; or, determine that the first syntax element identification information indicates that last significant coefficient location reverse is disabled for the current sequence in response to the value of the first syntax element identification information being a second value.

In some embodiments, the second determining unit 1402 is further configured to determine that the component identification information indicates that last significant coefficient location reverse is applied to the component of the current slice in response to a value of the component identification information being a first value; or, determine that the component identification information indicates that last significant coefficient location reverse is not applied to the component of the current slice in response to the value of the component identification information being a second value.

In some embodiments, the second determining unit 1402 is further configured to, in response to the component identification information indicating that last significant coefficient location reverse is not applied to the component of the current slice, determine the location of the last significant coefficient of the current block directly according to the coordinate information of the last significant coefficient.

The parsing unit 1401 is further configured to determine the coefficients of the current block by decoding the coefficients located above the location of the last significant coefficient in the preset scanning order.

In some embodiments, the component includes at least one of a first colour component, a second colour component, or a third colour component.

The first colour component is a luma component, the second colour component is a first chroma component, and the third colour component is a second chroma component.

Alternatively, the first colour component is a red component, the second colour component is a green component, and the third colour component is a blue component.

In some embodiments, the second determining unit 1402 is further configured to, when the component includes a first colour component, a second colour component, and a third colour component, determine a number of pieces of component identification informations of the current slice to be 1 in response to one piece of component identification information being shared by the first colour component, the second colour component, and the third colour component of the current slice; or, determine the number of pieces of component identification information of the current slice to be 2 in response to one piece of component identification information being shared by two colour components of the first colour component, the second colour component, and the third colour component of the current slice; or, determine the number of pieces of component identification information of the current slice to be 3 in response to each of the first colour component, the second colour component, and the third colour component of the current slice having a separate piece of component identification information.

In some embodiments, the parsing unit 1401 is further configured to determine first component identification information of the current slice by parsing the bitstream.

Accordingly, the second determining unit 1402 is further configured to, in response to a value of the first component identification information being a first value, determine that last significant coefficient location reverse is applied to each of the first colour component, the second colour component, and the third colour component of the current slice.

In some embodiments, the parsing unit 1401 is further configured to determine second component identification information and third component identification information of the current slice by parsing the bitstream.

Accordingly, the second determining unit 1402 is further configured to, in response to a value of the second component identification information being a first value, determine that last significant coefficient location reverse is applied to each of two colour components of the first colour component, the second colour component, and the third colour component of the current slice; and in response to a value of the third component identification information being the first value, determine that last significant coefficient location reverse is applied to another colour component other than the two colour components of the first colour component, the second colour component, and the third colour component of the current slice.

In some embodiments, the parsing unit 1401 is further configured to determine fourth component identification information, fifth component identification information, and sixth component identification information of the current slice by parsing the bitstream, Accordingly, the second determining unit 1402 is further configured to, in response to a value of the fourth component identification information being the first value, determine that last significant coefficient location reverse is applied to the first colour component of the current slice; in response to a value of the fifth component identification information being the first value, determine that last significant coefficient location reverse is applied to the second colour component of the current slice; and in response to a value of the sixth component identification information being the first value, determine that last significant coefficient location reverse is applied to the third colour component of the current slice.

In some embodiments, the parsing unit 1401 is further configured to obtain prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient by parsing the bitstream.

The second determining unit 1402 is further configured to determine the horizontal coordinate of the last significant coefficient according to the prefix information of the horizontal coordinate of the last significant coefficient and the suffix information of the horizontal coordinate of the last significant coefficient; determine the vertical coordinate of the last significant coefficient according to the prefix information of the vertical coordinate of the last significant coefficient and the suffix information of the vertical coordinate of the last significant coefficient; and determine coordinate information of the last significant coefficient of the current block according to the horizontal coordinate of the last significant coefficient and the vertical coordinate of the last significant coefficient.

In some embodiments, the second determining unit 1402 is further configured to, in response to the component identification information indicating that last significant coefficient location reverse is applied to the component of the current slice, determine the coordinate information of the last significant coefficient of the current block to be a horizontal distance and a vertical distance between the location of the last significant coefficient and a bottom right corner of the current block.

Accordingly, the second determining unit 1402 is further configured to determine a width and a height of the current block; obtain a horizontal coordinate of the last significant coefficient by subtracting the horizontal distance between the location of the last significant coefficient and the bottom right corner of the current block from the width of the current block; obtain a vertical coordinate of the last significant coefficient by subtracting the vertical distance between the location of the last significant coefficient and the bottom right corner of the current block from the height of the current block; and determine the location of the last significant coefficient of the current block according to the horizontal coordinate of the last significant coefficient and the vertical coordinate of the last significant coefficient.

In some embodiments, the second determining unit 1402 is further configured to, in response to the component identification information indicating that last significant coefficient location reverse is not applied to the component of the current slice, determine the coordinate information of the last significant coefficient of the current block to be a horizontal distance and a vertical distance between the location of the last significant coefficient and a top left corner of the current block; and determine the location of the last significant coefficient of the current block according to the horizontal distance and the vertical distance between the location of the last significant coefficient and the top left corner of the current block.

In some embodiments, the parsing unit 1401 is further configured to determine last coefficient enabled identification information of the current block by parsing the bitstream in response to the third syntax element identification information indicating that range extension is applied to the current sequence; and determine the coefficients of the current block by decoding coefficients located above the last coefficient location in the preset scanning order, in response to the last coefficient enabled identification information indicating that a last coefficient location is applied to the current block.

In some embodiments, the second determining unit 1402 is further configured to determine that the last coefficient enabled identification information indicates that the last coefficient location is applied to the current block, in response to a value of the last coefficient enabled identification information being a first value; or determine that the last coefficient enabled identification information indicates that the last coefficient location is not applied to the current block, in response to the value of the last coefficient enabled identification information being a second value.

In some embodiments, the parsing unit 1401 is further configured to, in response to the value of the last coefficient enabled identification information being the second value, obtain prefix information of a horizontal coordinate of the last significant coefficient of the current block, prefix information of a vertical coordinate of the last significant coefficient, suffix information of the horizontal coordinate of the last significant coefficient, and suffix information of the vertical coordinate of the last significant coefficient by parsing the bitstream.

The second determining unit 1402 is further configured to determine the location of the last significant coefficient according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient.

The parsing unit 1401 is further configured to determine the coefficients of the current block by decoding the coefficients located above the location of the last significant coefficient in the preset scanning order.

In some embodiments, the last coefficient location is a bottom right corner of a matrix composed of all possible nonzero coefficients within the current block. Alternatively, the last coefficient location is a last location of all possible nonzero coefficients in the preset scanning order within the current block.

In some embodiments, the second determining unit 1402 is further configured to set the location of the last significant coefficient at the last coefficient location.

In some embodiments, the second determining unit 1402 is further configured to determine a width and a height of a transform block obtained by performing a preset operation on the current block; calculate coordinate information of a bottom right corner of the transform block according to the width and the height of the transform block; and determine the last coefficient location according to the coordinate information of the bottom right corner of the transform block.

In some embodiments, the preset operation includes at least a zero-out operation.

In some embodiments, the second determining unit 1402 is further configured to, in response to setting the location of the last significant coefficient at the last coefficient location, determine the location of the last significant coefficient according to the coordinate information of the bottom right corner of the transform block.

In some embodiments, the parsing unit 1401 is further configured to determine sub-block default coded identification information of the current block by parsing the bitstream, in response to the third syntax element identification information indicating that range extension is applied to the current sequence; and decode coefficients in the sub-block to be decoded in response to the sub-block default coded identification information indicating that a sub-block to be decoded in the current block is coded by default.

In some embodiments, the parsing unit 1401 is further configured to determine sub-block coded identification information of the sub-block to be decoded by parsing the bitstream in response to the sub-block default coded identification information indicating that the sub-block to be decoded in the current block is not by default coded; and decode the coefficients in the sub-block to be decoded in response to a value of the sub-block coded identification information being a first value.

In some embodiments, the second determining unit 1402 is further configured to determine that the sub-block default coded identification information indicates that the sub-block to be decoded in the current block is coded by default, in response to a value of the sub-block default coded identification information being a first value; or determine that the sub-block default coded identification information indicates that the sub-block to be decoded in the current block is not by default coded, in response to the value of the sub-block default coded identification information being a second value.

In some embodiments, the second determining unit 1402 is further configured to determine to decode the coefficients in the sub-block to be decoded in response to the value of the sub-block coded identification information being the first value; or determine the coefficients in the sub-block to be decoded to be zero in response to the value of the sub-block coded identification information being a second value.

In some embodiments, the first value is 1, and the second value is 0.

Understandably, in the embodiment, a "unit" may be a part of a circuit, a part of a processor, a part of a program or software, and/or like. Of course, a unit may be a module, or may be non-modularized. In addition, components in the embodiments may be integrated in one processing part, or exist as separate physical units respectively. Alternatively, two or more units may be integrated in one unit. The integrated unit may be implemented in form of hardware or software functional unit(s).

When implemented in form of a software functional module and sold or used as an independent product, an integrated module herein may also be stored in a computer-readable storage medium. Based on such an understanding, the embodiment provides a computer storage medium, implemented at the decoder 140. The computer storage medium stores thereon a computer program which, when executed by the second processor, implements the method according to any foregoing embodiment.

Figure 15:
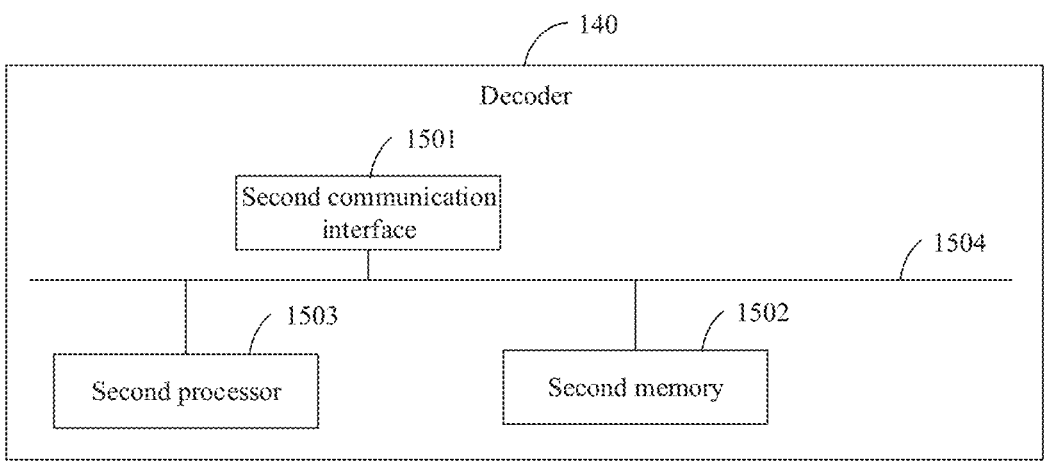
FIG. 15 is a diagram of a hardware structure of a decoder according to embodiments of the disclosure.

Based on the composition of the decoder 140 and the computer storage medium, FIG. 15 is a diagram of a hardware structure of the decoder 140 according to embodiments of the disclosure. As shown in FIG. 15, the decoder may include a second communication interface 1501, a second memory 1502, and a second processor 1503. Various components may be coupled together through a second bus equipment 1504. Understandably, the second bus equipment 1504 is configured to implement connection and communication among these components. In addition to a data bus, the second bus equipment 1504 may further include a power bus, a control bus, and a status signal bus. However, for clarity of description, various buses are marked as the second bus equipment 1504 in FIG. 15.

The second communication interface 1501 may be configured to perform signal sending and receiving while performing information sending and receiving with another external network element.

The second memory 1502 is configured to store thereon a computer program executable on the second processor 1503.

The second processor 1503 is configured to execute the computer program to perform the following operations.

Component identification information of a current slice, and coordinate information of a last significant coefficient of a current block corresponding to a component of the current slice, are determined by parsing a bitstream;

In response to the component identification information indicating that last significant coefficient location reverse is applied to the component of the current slice, a location of the last significant coefficient of the current block is obtained by performing calculation on the coordinate information of the last significant coefficient; and Coefficients of the current block are determined by decoding coefficients located above the location of the last significant coefficient in a preset scanning order.

Alternatively, as another embodiment, the second processor 1503 may further be configured to execute the computer program to implement the method according to any one of the foregoing embodiments.

Understandably, the second memory 1502 is similar to the first memory 1302 in terms of hardware function, and the second processor 1503 is similar to the first processor 1303 in terms of hardware function, which is not elaborated here.

The embodiment provides a decoder. The decoder may include the parsing unit and the second determining unit. In this way, in a scenario of high bit-depth, high bit-rate, high quality, or lossless video encoding and decoding, a reasonable deriving mode of the last significant coefficient is set according to a law of distribution of significant coefficients, thereby reducing an overhead brought about by encoding in the bitstream, and improving compression efficiency. In addition, as respective colour components may be different in distribution of significant coefficients, it is possible to refinedly control a respective deriving mode of the last significant coefficient for each colour component, i.e., separately controlling whether last significant coefficient location reverse technology is applied to each colour component, thereby further improving compression efficiency.

Note that in the disclosure, a term such as "including/comprising", "containing", or any other variant of the term is intended to cover a non-exclusive inclusion, such that a process, method, article, or device including a series of elements not only includes the elements, but also includes other element(s) not explicitly listed, or element(s) inherent to such a process, method, article, or device. Given no more limitation, an element defined by a phrase "including a . . . " does not exclude existence of another identical element in a process, method, article, or device that includes the element.

Numbering of embodiments of the disclosure is merely for illustration and does not indicate preference of one embodiment over another.

Methods disclosed in method embodiments of the disclosure may be combined with each other as needed to obtain a new method embodiment, as long as no conflict results from the combination.

Features disclosed in product embodiments of the disclosure may be combined with each other as needed to obtain a new product embodiment, as long as no conflict results from the combination.

Features disclosed in method or device embodiments of the disclosure may be combined with each other as needed to obtain a new method or device embodiment, as long as no conflict results from the combination.

What described is just embodiments of the disclosure and is not intended to limit the scope of the disclosure. Any modification, equivalent replacement, and/or the like made within the technical scope of the disclosure, as may occur to a person having ordinary skill in the art, shall be included in the scope of the disclosure. Therefore, the scope of the disclosure should be determined by the claims.

The invention claimed is:

1. A decoding method, performed by a decoder, the method comprising:
determining, by parsing a bitstream, last significant coefficient location reverse identification information, and coordinate information of a last significant coefficient of a current block;

obtaining a location of the last significant coefficient of the current block by performing calculation on the coordinate information of the last significant coefficient;

wherein in response to the last significant coefficient location reverse identification information indicating that the last significant coefficient location reverse is applied, determining the coordinate information of the last significant coefficient of the current block to be a horizontal distance and a vertical distance between the location of the last significant coefficient and a location of a bottom right sample of the current block; and determining coefficients of the current block by decoding coefficients located ahead of the location of the last significant coefficient in a preset scanning order.

2. The decoding method of claim 1, further comprising:
determining first syntax element identification information by parsing the bitstream; and performing the operation of determining the last significant coefficient location reverse identification information by parsing the bitstream, in response to the first syntax element identification information indicating that the last significant coefficient location reverse is enabled for a current sequence, wherein the current sequence comprises a current slice.

3. The decoding method of claim 1, wherein a component comprises at least one of a first colour component, a second colour component, or a third colour component,
wherein the first colour component is a luma component, the second colour component is a first chroma component, and the second colour component is a second chroma component, or wherein the first colour component is a red component, the second colour component is a green component, and the third colour component is a blue component, wherein determining the last significant coefficient location reverse identification information by parsing the bitstream comprises: determining first last significant coefficient location reverse identification information by parsing the bitstream, wherein the method further comprises:
in response to a value of the first last significant coefficient location reverse identification information being a first value, determining that the last significant coefficient location reverse is applied to each of the first colour component, the second colour component, and the third colour component.

4. An encoding method, performed by an encoder, the method comprising:
determining last significant coefficient location reverse identification information, and a location of a last significant coefficient of a current block;

determining coordinate information of the last significant coefficient of the current block according to the last significant coefficient location reverse identification information and the location of the last significant coefficient; and encoding coefficients located ahead of the location of the last significant coefficient in a preset scanning order, and signalling, into a bitstream, bit information obtained through the encoding, the last significant coefficient location reverse identification information, and the coordinate information of the last significant coefficient, wherein the location of the last significant coefficient comprises an initial horizontal coordinate and an initial vertical coordinate of the last significant coefficient, the initial horizontal coordinate and the initial vertical coordinate being a horizontal distance and a vertical distance between the location of the last significant coefficient and a location of a top left sample of the current block, respectively, wherein determining the coordinate information of the last significant coefficient of the current block according to the last significant coefficient location reverse identification information and the location of the last significant coefficient comprises:

in response to a value of the last significant coefficient location reverse identification information being a first value, determining the coordinate information of the last significant coefficient by performing calculation on the initial horizontal coordinate and the initial vertical coordinate of the last significant coefficient, wherein the method further comprises:

in response to the value of the last significant coefficient location reverse identification information being the first value, determining the coordinate information of the last significant coefficient to be a horizontal distance and a vertical distance between the location of the last significant coefficient and a location of a bottom right sample of the current block.

5. The encoding method of claim 4, further comprises: before determining the last significant coefficient location reverse identification information, determining first syntax element identification information; and performing the operation of determining the last significant coefficient location reverse identification information of in response to the first syntax element identification information indicating that the last significant coefficient location reverse is enabled for a current sequence, wherein the current sequence comprises a current slice.

6. The encoding method of claim 4, wherein a component comprises at least one of a first colour component, a second colour component, or a third colour component, wherein the first colour component is a luma component, the second colour component is a first chroma component, and the second colour component is a second chroma component, or wherein the first colour component is a red component, the second colour component is a green component, and the third colour component is a blue component, wherein determining the last significant coefficient location reverse identification information comprises: determining first last significant coefficient location reverse identification information, wherein the method further comprises:

determining a value of the first last significant coefficient location reverse identification information to be a first value in response to that the last significant coefficient location reverse is applied to each of the first colour component, the second colour component, and the third colour component.

7. An encoder, comprising a first memory and a first processor, wherein the first memory is configured to store thereon a computer program executable on the first processor; and the first processor is configured to execute the computer program to perform:

determining last significant coefficient location reverse identification information, and a location of a last significant coefficient of a current block;

determining coordinate information of the last significant coefficient of the current block according to the last significant coefficient location reverse identification information and the location of the last significant coefficient; and encoding coefficients located ahead of the location of the last significant coefficient in a preset scanning order, and signalling, into a bitstream, bit information obtained through the encoding, the last significant coefficient location reverse identification information, and the coordinate information of the last significant coefficient, wherein the location of the last significant coefficient comprises an initial horizontal coordinate and an initial vertical coordinate of the last significant coefficient, the initial horizontal coordinate and the initial vertical coordinate being a horizontal distance and a vertical distance between the location of the last significant coefficient and a location of a top left sample of the current block, respectively, wherein determining the coordinate information of the last significant coefficient of the current block according to the last significant coefficient location reverse identification information and the location of the last significant coefficient comprises:

in response to a value of the last significant coefficient location reverse identification information being a first value, determining the coordinate information of the last significant coefficient by performing calculation on the initial horizontal coordinate and the initial vertical coordinate of the last significant coefficient, the first processor is further configured to execute the computer program to perform:

in response to the value of the last significant coefficient location reverse identification information being the first value, determining the coordinate information of the last significant coefficient to be a horizontal distance and a vertical distance between the location of the last significant coefficient and a location of a bottom right corner sample of the current block.

8. A decoder, comprising a memory and a processor, wherein the memory is configured to store thereon a computer program executable on the processor; and the processor is configured to execute the computer program to perform:

determining, by parsing a bitstream, last significant coefficient location reverse identification information, and coordinate information of a last significant coefficient of a current block;

obtaining a location of the last significant coefficient of the current block by performing calculation on the coordinate information of the last significant coefficient;

in response to the last significant coefficient location reverse identification information indicating that the last significant coefficient location reverse is applied, determining the coordinate information of the last significant coefficient of the current block to be a horizontal distance and a vertical distance between the location of the last significant coefficient and a location of a bottom right sample of the current block; and determining coefficients of the current block by decoding coefficients located ahead of the location of the last significant coefficient in a preset scanning order.

9. A non-transitory computer-readable storage medium, having a computer program and a bitstream stored thereon, wherein the computer program, when executed by a processor, enables the processor to perform the steps of the encoding method of claim 4 to generate the bitstream.

\* \* \* \* \*